(12) United States Patent
Takei et al.

(10) Patent No.: US 9,531,894 B2
(45) Date of Patent: Dec. 27, 2016

(54) SYSTEM, METHOD, AND NON-TRANSITORY COMPUTER READABLE MEDIUM

(71) Applicant: FUJI XEROX CO., LTD., Tokyo (JP)

(72) Inventors: Takeshi Takei, Kanagawa (JP);
Tsubasa Nishino, Kanagawa (JP);
Yasuko Yamamoto, Kanagawa (JP);
Yoko Nozaki, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/729,869

(22) Filed: Jun. 3, 2015

(65) Prior Publication Data

US 2016/0182741 A1    Jun. 23, 2016

(51) Int. Cl.
*H04N 1/00* (2006.01)
*H04N 1/32* (2006.01)

(52) U.S. Cl.
CPC ........ *H04N 1/0044* (2013.01); *H04N 1/00482* (2013.01); *H04N 1/32101* (2013.01)

(58) Field of Classification Search
USPC .......................................................... 358/1.6
See application file for complete search history.

(56) References Cited

U.S. PATENT DOCUMENTS 5,334,822 A    8/1994  Sanford
5,742,039 A *  4/1998  Sato ...................... G06K 17/00
                                              235/375
6,515,563 B2   2/2003  Koga
2006/0197984 A1* 9/2006 Komatsu ................ B41J 3/4075
                                              358/1.18
2008/0092055 A1  4/2008  Silverbrook et al.
2009/0087243 A1* 4/2009  Niiyama ................ G06K 17/00
                                              400/76
2009/0190987 A1  7/2009  Vleurinck et al.
2012/0249305 A1* 10/2012 Shidara ............. G06K 17/0025
                                              340/10.1

FOREIGN PATENT DOCUMENTS

JP    09-274630 A    10/1997
JP    2002-16326 A    1/2002
JP    2004-234076 A   8/2004

OTHER PUBLICATIONS

Office Action (Patent Examination Report) dated May 4, 2016, issued by the Australian Patent Office in counterpart Australian Application No. 2015204337.

* cited by examiner

*Primary Examiner* — Ngon Nguyen
(74) *Attorney, Agent, or Firm* — Sughrue Mion, PLLC

(57) ABSTRACT

A system includes a storage unit, a display control unit, and an output unit. The storage unit stores label information used for book management, the label information being obtained on the basis of information for specifying a publication. The display control unit causes a display unit to display a screen for receiving a user operation conducted after the label information is obtained but before a label image expressing the label information is formed on a medium. The output unit responds to an instruction based on the user operation received while the screen is displayed, and outputs data for forming the label image on a medium.

16 Claims, 51 Drawing Sheets

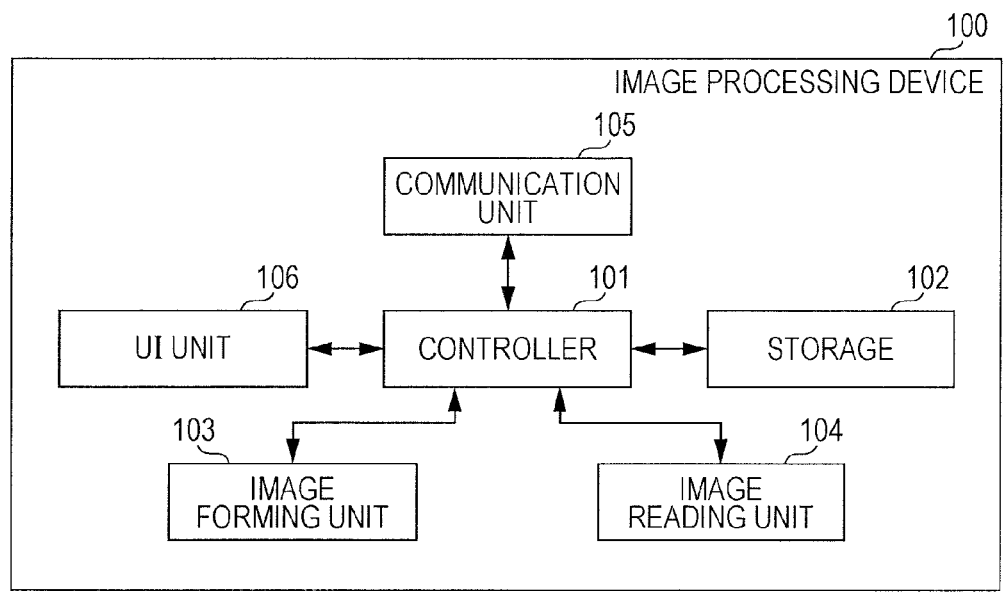
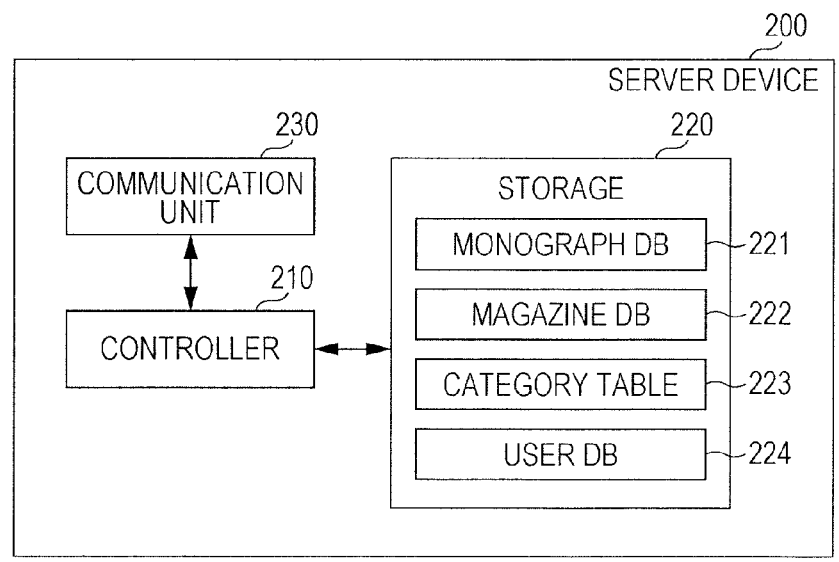

FIG. 4

| MANAGEMENT NUMBER | TITLE | ISBN | LIBRARY CLASSIFICATION CODE | CALL NUMBER (1) | CALL NUMBER (3) | BORROW FLAG | BORROW DATE | USER ID |
|---|---|---|---|---|---|---|---|---|
| | | | | | | | | |
| | | | | | | | | |
| | | | | | | | | |
| | | | | | | | | |

221

| MANAGEMENT NUMBER | TITLE | ISSN | SERIES | RESTRICTED PERIOD | BORROW FLAG | BORROW DATE | USER ID |
|---|---|---|---|---|---|---|---|
| | | | | | | | |
| | | | | | | | |
| | | | | | | | |
| | | | | | | | |

222

| LIBRARY CLASSIFICATION CODE | CALL NUMBER (1) |
|---|---|
| | |
| | |
| | |
| | |

| CONFIRMATION/CORRECTION SCREEN |
|---|

BOOK TITLE: XXXXXXXXXX

CALL NUMBER (1): [ 09 ] ~A1

CALL NUMBER (3): [ 18 ] ~A2

| LABEL IMAGE PREPARATION STATUS SCREEN |
|---|

NUMBER OF PREPARED LABELS: [ 2 ] ~A11

DO YOU WANT TO START IMAGE FORMATION?

[ OK ] ~A12

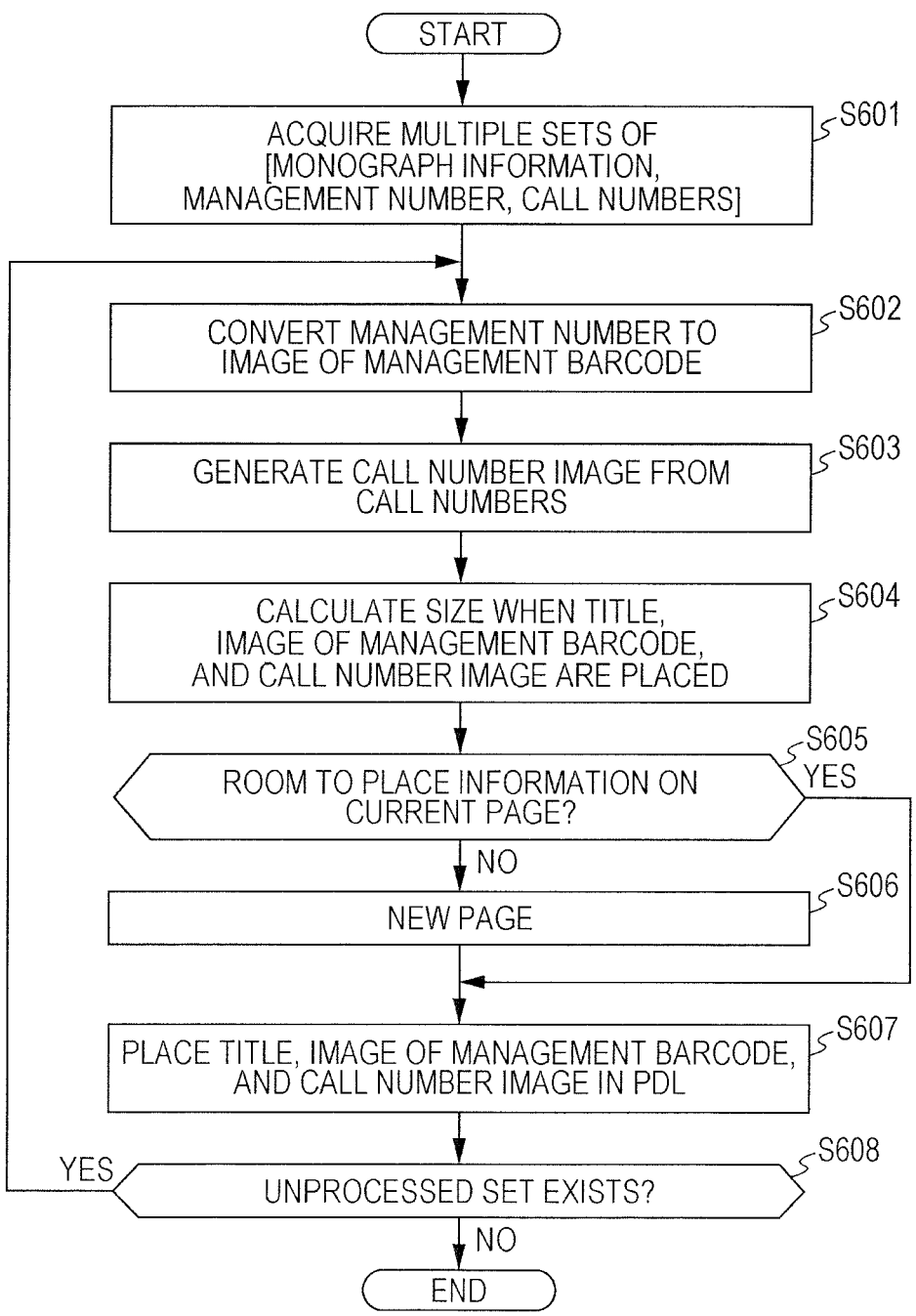

FIG. 41

| MENU | LABEL | TYPE | URL/COMMAND | PLUGIN |
|---|---|---|---|---|
| LIBRARY MANAGEMENT | BORROW BOOK | EXTERNAL | http://libsvr.co.jp/lend | — |
| LIBRARY MANAGEMENT | RETURN BOOK | EXTERNAL | http://libsvr.co.jp/return | — |
| LIBRARY MANAGEMENT | REGISTER BOOK | EXTERNAL | http://libsvr.co.jp/register | — |
| LIBRARY MANAGEMENT | DUPLICATE DOCUMENT | INTERNAL | copy_proc | Libcopy_coinkit.zip |

| MENU | LABEL | TYPE | URL/COMMAND | PLUGIN |
|---|---|---|---|---|
| LIBRARY SERVICE | BORROW BOOK | EXTERNAL | http://libsvr.co.jp/lend | — |
| LIBRARY SERVICE | RETURN BOOK | EXTERNAL | http://libsvr.co.jp/return | — |
| LIBRARIAN FUNCTION | REGISTER BOOK | EXTERNAL | http://libsvr.co.jp/register | — |
| LIBRARY SERVICE | DUPLICATE DOCUMENT | INTERNAL | copy_proc | Libcopy_coinkit.zip |

| MENU | ROLE | LINK |
|---|---|---|
| LIBRARY SERVICES | NONE | LIBRARIAN FUNCTIONS, STANDARD FUNCTIONS |
| LIBRARIAN FUNCTIONS | LIBRARIAN | COPY, SCAN, PRINT, FACSIMILE, LOGOUT |
| STANDARD FUNCTIONS | USER OF STANDARD FUNCTIONS | COPY, SCAN, PRINT, FACSIMILE |

SYSTEM, METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2014-255279 filed Dec. 17, 2014.

BACKGROUND

The present invention relates to a system, a method, and a non-transitory computer readable medium.

SUMMARY

According to an aspect of the invention, there is provided a system including a storage unit, a display control unit, and an output unit. The storage unit stores label information used for book management, the label information being obtained on the basis of information for specifying a publication. The display control unit causes a display unit to display a screen for receiving a user operation conducted after the label information is obtained but before a label image expressing the label information is formed on a medium. The output unit responds to an instruction based on the user operation received while the screen is displayed, and outputs data for forming the label image on a medium.

BRIEF DESCRIPTION OF THE DRAWINGS

Exemplary embodiments of the present invention will be described in detail based on the following figures, wherein:

FIG. 2 is a block diagram illustrating a configuration of an image processing device according to an exemplary embodiment;

FIG. 3 is a block diagram illustrating a configuration of a server device according to an exemplary embodiment;

FIG. 4 is a diagram illustrating an example of data stored by a server device;

FIG. 8 is a diagram illustrating an example of a screen for receiving a first operation;

FIG. 9 is a diagram illustrating an example of a screen for receiving a second operation;

FIG. 21 is a flowchart illustrating operation of an image processing device;

FIG. 41 is a diagram illustrating an additional function configuration file;

FIGS. 49A and 49B are diagrams illustrating an additional function configuration file and a menu configuration file;

DETAILED DESCRIPTION

Exemplary Embodiment

Configuration

Figure 1:
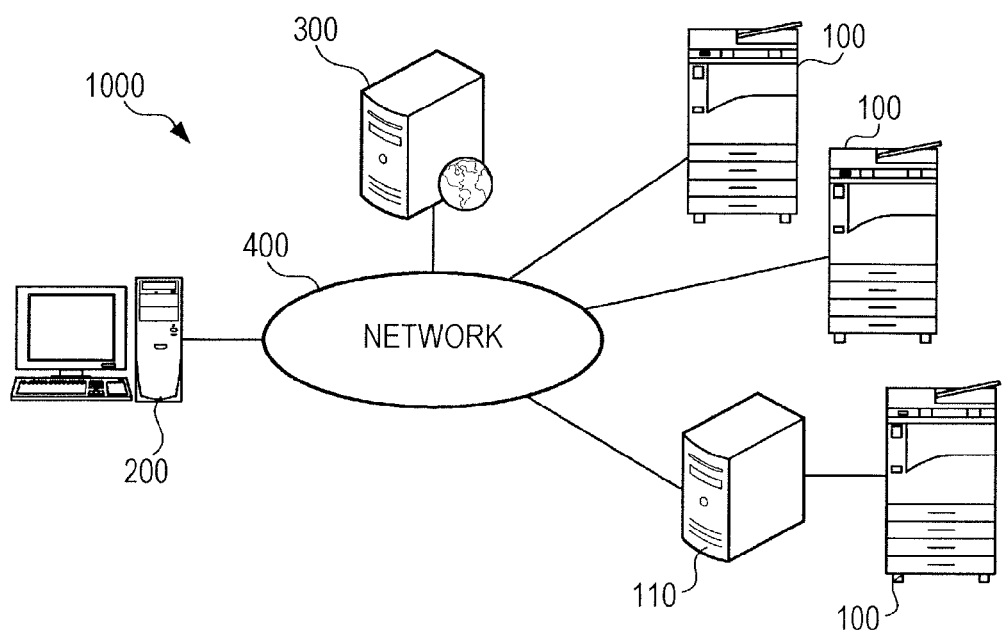
FIG. 1 is a block diagram illustrating a configuration of an information processing system according to an exemplary embodiment of the present invention.

FIG. 1 is a block diagram illustrating a configuration of an information processing system 1000 according to an exemplary embodiment of the present invention. The information processing system 1000 is a system for managing books. Books may be largely divided into monographs and magazines. A monograph is a book written by one or multiple authors or editors and published in a single-volume format, but also includes books such as anthologies and encyclopedias that are published in a series. In contrast, a magazine is a publication that is periodically published over time under the same title, and given a volume, book, part, or serial number. International standard numbers called ISBNs and ISSNs are assigned. Monographs are assigned an ISBN (a 10-digit or 13-digit number, for example), while magazines are assigned an ISSN (an 8-digit or 13-digit number, for example). ISBNs and ISSNs are both information for specifying publications, and will hereinafter be referred to as "publication specification information" when not being distinguished.

The information processing system 1000 is equipped with an image processing device 100 installed in a library, for example, a server device 200 operated by an administrator of the library, for example, a bibliographic information storage device 300 managed by the National Diet Library or an operator of a bibliographic information-providing site, for example, and a network 400 that connects these devices. The image processing device 100 is what is called a multifunction device (MFD), equipped with an image reading function and an image forming function. The server device 200 analyzes an image scanned by the image processing device 100, acquires bibliographic information from the bibliographic information storage device 300 and the like, and executes processes related to book management. These processes related to book management include at least one of a process that registers/deletes a book in a database inside the server device 200, a process that updates a database for borrowing books, and a process that updates a database for returning borrowed books.

The bibliographic information storage device 300 is a web server device that stores bibliographic information for a very large number of books, and provides this bibliographic information over the network 400. The bibliographic information may include information such as the title, publication date, and library classification code of a publication. A library classification code refers to a code indicating a standard category based on the subject and contents of a monograph. The network 400 includes various types of networks such as a local area network (LAN), an intranet, a virtual private network (VPN), and the Internet. The respective numbers of the image processing device 100, the server device 200, and the bibliographic information storage device 300 are not limited to what is illustrated by way of example in FIG. 1. Note that the functions of the server device 200 may also be executed by one of the image processing devices 100, or be implemented by an information processing device 110 connected as a frontend device to one of the image processing devices 100. In addition, the functions of the server device 200 may also be distributed among multiple server devices, and the individual server devices may operate in conjunction with each other to realize the same functions as the server device 200. The functions of the server device 200 may also be provided as a so-called cloud service. In addition, the structural elements other than the bibliographic information storage device 300 (image processing device 100, server device 200, and information processing device 110) may also be implemented inside a single device.

FIG. 2 is a block diagram illustrating a configuration of an image processing device 100. The image processing device 100 is an information processing device equipped with a controller 101, storage 102, an image forming unit 103, an image reading unit 104, a communication unit 105, and a user interface (UI) unit 106. The controller 101 controls each component of the image processing device 100, and is realized by a control circuit such as an application-specific integrated circuit (ASIC) or a central processing unit (CPU) and various types of memory, for example. The storage 102 is a storage device such as a hard disk, for example, and stores programs executed by the CPU and data used in the execution of such programs.

The image forming unit 103 forms an image on a medium using an electrophotographic system, for example, in which a laser beam is shined on an image holder such as a photoreceptor to form a latent image that is subsequently developed using toner for each of the colors of yellow (Y), magenta (M), cyan (C), and black (K), and transferred to a medium such as a print sheet, and the medium is delivered after undergoing a fusing process. The image reading unit 104 generates image data by optically reading an image on a document. The communication unit 105 transmits and receives data, and communicates with the server device 200 via the network 400. The UI unit 106 realizes a dialog with a user, and is equipped with an operating unit which is provided with operable elements such as keys and a touch sensor, for example, and which supplies to the controller 101 an operating signal according user operations, as well as a display which is provided with a liquid crystal display (LCD) panel and an LCD driving circuit, for example, and which displays an image under control by the controller 101.

FIG. 3 is a block diagram illustrating a hardware configuration of the server device 200. The server device 200 is equipped with a controller 210, storage 220, and a communication unit 230. The controller 210 controls the operation of the respective components of the server device 200. The controller 210 is realized by a control circuit such as a CPU and various types of memory, and controls the operation of the respective components of the server device 200 by executing a program. The storage 220 stores data used by the server device 200. The storage 220 is a hard disk, for example, and stores programs executed by the controller 210 and data used in the execution of such programs. Herein, the storage 220 stores a monograph database (DB) 221, a magazine DB 222, a category table 223, and a user DB 224. The communication unit 230 transmits and receives data, and communicates with the image processing device 100 and the bibliographic information storage device 300 via the network 400.

FIG. 4 is a diagram illustrating an example of part of the content of the monograph DB 221, the magazine DB 222, and the category table 223. In the monograph DB 221, the management number is an indexed number for each monograph archived in a facility that manages monographs, such as a library. A unique number is associated with every book. For this reason, the management number is also used as identification information for identifying a book. The title is the title of the monograph. If there are multiple monographs with the same title, respectively different management numbers are assigned as discussed above. The ISBN is the publication specification information discussed earlier (information for specifying a publication), and is an international standard number assigned to monographs. The library classification code is a code expressing a standard category based on the subject and contents of the monograph as discussed earlier. In Japan, codes defined in accordance with a rule called the Nippon Decimal Classification (NDC9) are known.

The call number (1) is information used in each library, expressing a category for the book (hereinafter designated "category information") according to a rule used to manage books. For the call number (1), information expressing a category according to the Nippon Decimal Classification above may be used in some cases, or information expressing a category according to a rule defined independently by a library may be used in some cases. Each library or other facility that archives books determines which rule to use to express the call number (1). Generally, in a library, since the shelving location of each monograph and the order on the shelves are determined for each monograph classification, the shelving location of each monograph and the order on the shelves in the library are specified by the call number (1). In this case, the call number (1) expresses the location in the facility of the book expressed by the category according to the category information of that call number (1).

The call number (3) is a classification such as the volume number or publication year of each monograph in an anthology or encyclopedia published as a series. The call number (3) is a sequential number within the call number (1), and generally the same number is indexed for the same title. The borrow flag is a flag indicating whether or not the monograph is currently being borrowed. The borrow date is the borrow date in the case in which the monograph is currently being borrowed. The user ID is identification information of the user borrowing the monograph in the case in which the monograph is currently being borrowed.

The data included in the magazine DB 222 may be understood by substituting "monograph" for "magazine" in the monograph DB 221 described above. Note that the magazine DB includes a restricted period, which is a period starting from the publication date of the magazine during which borrowing is not allowed.

The category table 223 indicates correspondence relationships between the library classification code, which is a standard library classification, and the call number (1), which is a library classification specific to the library. The category table 223 enables conversion from a standard library classification code such as NDC9 to the call number (1) used in the library. The user DB 224 is a database that includes information such as a user ID assigned to a user, and attributes of that user.

Figure 5:
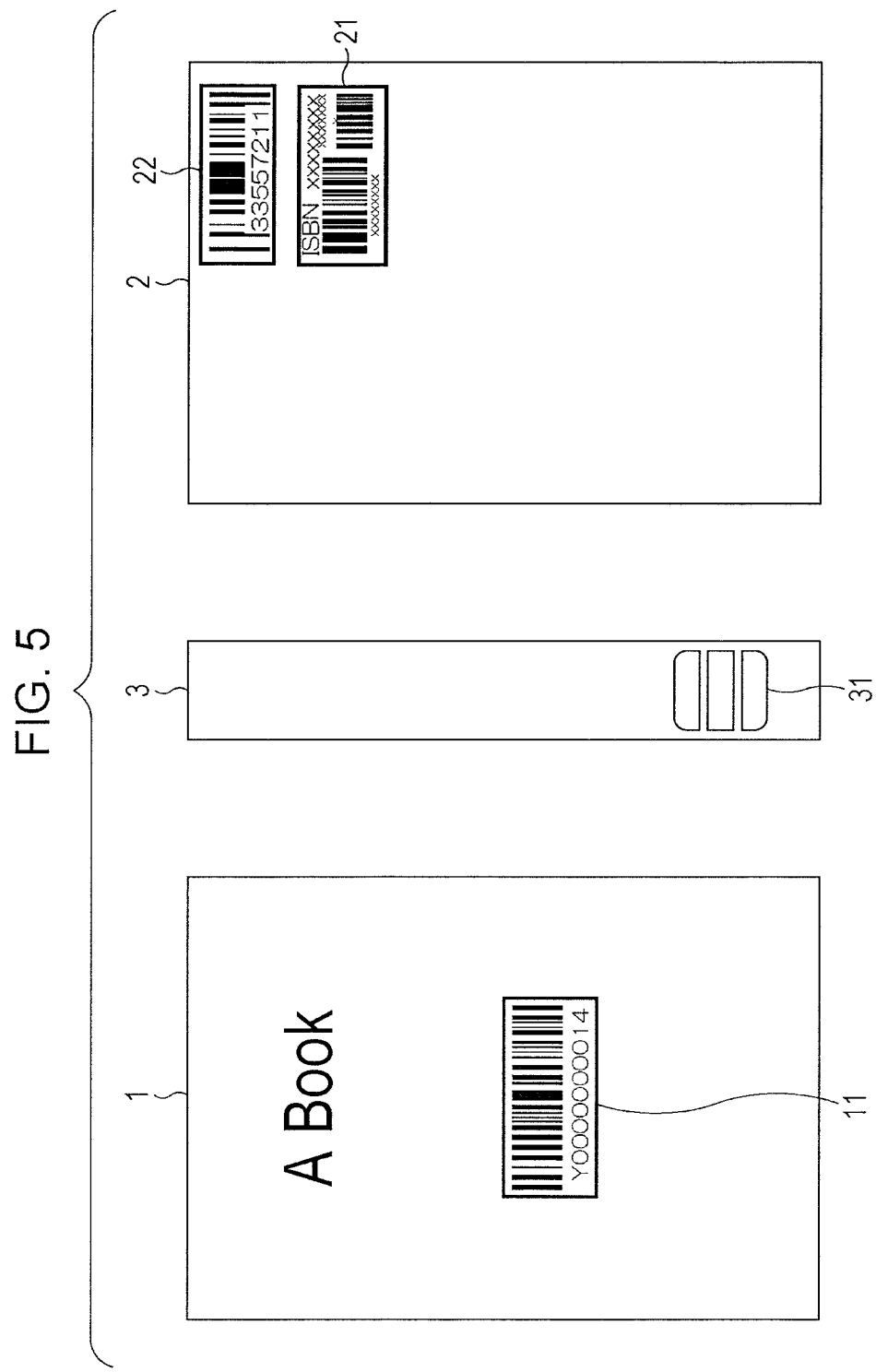
FIG. 5 is a diagram illustrating an exterior of a book.

FIG. 5 is a plan view illustrating an example of the exterior of a book. In the example in FIG. 5, a management barcode label 11 indicating a management barcode that encodes a management number is affixed to the front cover 1 of the book. Additionally, by using an identifier of "YB" to mean a monograph (book) and an identifier of "YM" to mean a magazine as part of the management number, such as by having a management number of "YB000123" in the case of a monograph and a management number of "YM0000123" in the case of a magazine, for example, monographs and magazines may be distinguishable on the basis of the management number. Also, the management barcode label 11 is affixed to the front cover 1 in this example, but may also be affixed to the back cover 2 or the spine 3.

On the back cover 2 of the book, a publication specification information barcode label 21 indicating the publication specification information discussed earlier (information for specifying a publication, specifically an ISBN or an ISSN) and a price barcode label 22 indicating the price of the book is printed or affixed. On the spine 3, a call number label 31 is affixed. The call number label 31 is displayed in a three-line format, with the call number (1) stated on the top line, and the call number (3) stated on the bottom line.

Figure 6:
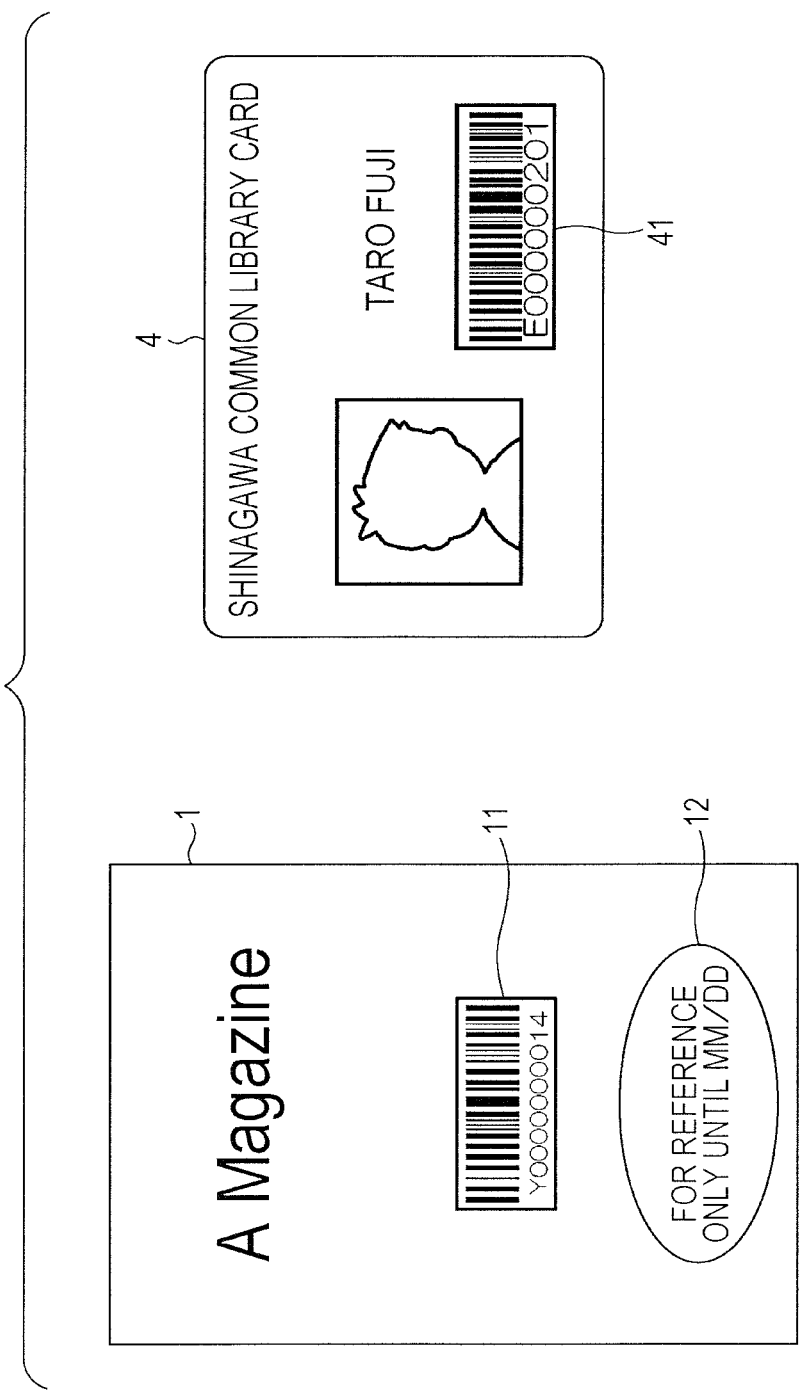
FIG. 6 is a diagram illustrating an exterior of a magazine and a user card.

In the case of a magazine, a restricted label 12 denoting the restricted period is affixed to the front cover 1 or the like of the magazine (see FIG. 6). Book borrowing is only conducted for users who possess a user card 4 illustrated in FIG. 6. On the user card 4, a user ID barcode 41 indicating a user ID for identifying each user is printed or affixed. Note that the format for representing the various information above is not strictly limited to barcodes, and may be any code that encodes the respective information.

Figure 7:
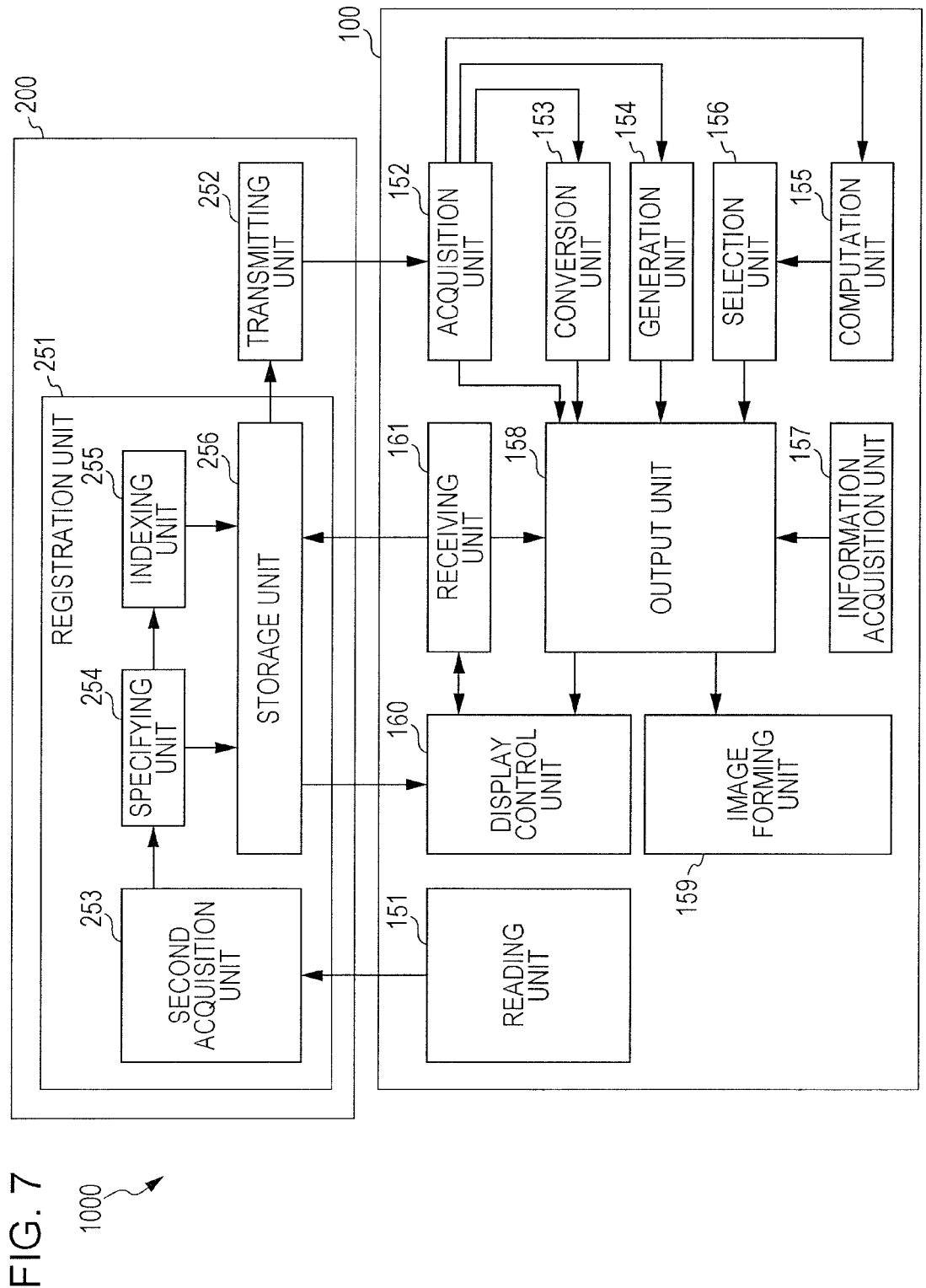
FIG. 7 is a diagram illustrating a functional configuration of a server device.

FIG. 7 is a diagram illustrating a functional configuration of the system 1000. The image processing device 100 is equipped with a reading unit 151, an acquisition unit 152, a conversion unit 153, a generation unit 154, a computation unit 155, a selection unit 156, an information acquisition unit 157, an output unit 158, an image forming unit 159, a display control unit 160, and a receiving unit 161. The reading unit 151 reads an ISBN or an ISSN as information for specifying a publication. The reading unit 151 reads this information from the publication specification information barcode label 21 illustrated in FIG. 5, for example.

The acquisition unit 152 acquires one or multiple sets of at least one of attribute information indicating an attribute of the book, identification information identifying the book, category information expressing a category of the book, and period information indicating a period during which borrowing of the book is not allowed (in other words, a restricted period). In the present exemplary embodiment, the acquisition unit 152 acquires the title of the book as attribute information, the management number of the book as identification information, and the call number (1) and call number (3) as category information. The acquisition unit 152 supplies the acquired attribute information to the output unit 158, and supplies the acquired identification information to the conversion unit 153. Also, the acquisition unit 152 supplies the acquired category information and period information to the generation unit 154.

The conversion unit 153 converts identification information acquired by the acquisition unit 152 into a code image, and supplies the code image to the output unit 158. A code image refers to an image expressing identification information in encoded form, and is an image of a management barcode, for example. In other words, the conversion unit 153 converts identification information into a management barcode and generates an image expressing the management barcode, thereby converting the identification information into an image of a management barcode.

When the acquisition unit 152 acquires the call numbers (1) and (3), the generation unit 154 generates a call number image expressing the call numbers, and supplies the generated call number image to the output unit 158. Also, when the acquisition unit 152 acquires period information, the generation unit 154 generates a restricted period image expressing the restricted period indicated by the period information, and supplies the generated restricted period image to the output unit 158.

The computation unit 155 computes the size of an area in which an image group is formed on a medium. The selection unit 156 selects, from among multiple media of respectively different sizes, a medium whose relationship with the size computed by the computation unit 155 satisfies a predetermined condition. The selection unit 156 supplies medium information indicating the selected medium to the output unit 158. The information acquisition unit 157 acquires performance information related to the performance of at least one of the image forming function and the image reading function of the local device. The information acquisition unit 157 supplies the acquired performance information to the output unit 158.

The output unit 158 outputs image forming data, which is data for forming an image on a medium, to the image forming unit 159. The output unit 158 generates image forming data on the basis of the respective information supplied from the conversion unit 153, the generation unit 154, the selection unit 156, and the information acquisition unit 157, and outputs the generated image forming data. The image forming data is, for example, data expressing the placement of the image to be formed in a drawing area expressed by a page description language (hereinafter simply designated PDL). Note that in some cases, the output unit 158 may be supplied with all information and be able to generate the image forming data, but be unable to immediately output the image forming data. This case will be described in further detail later.

The image forming unit 159, on the basis of image forming data output from the output unit 158, forms an image expressing one or all of the attribute information acquired by the acquisition unit 152, a code image converted by the conversion unit 153, and a call number image (or restricted period image) generated by the generation unit 154 on one or multiple media, so that an image group corresponding to one set is formed on one sheet of the medium. Of these, the medium on which is formed the code image and the call number image is affixed to the book as a label, and used to manage the book in the library or the like. Hereinafter, the term "label image" will be used to collectively refer to the code image, the call number image, and the restricted period image. In addition, the term "label information" will be used to collectively refer to the information expressed by a label image, or in other words the identification information expressed by the code image, the call numbers expressed by the call number image, and the restricted period expressed by the restricted period image. The label information is information used to manage books.

The display control unit 160 causes a display unit (the UI unit 106) to display an operating screen for receiving user operations. On the operating screen, operable elements, input fields, and the like are displayed, for example. The display control unit 160 supplies the receiving unit 161 with relevant information for receiving user operations related to the displayed operating screen. This information is information that identifies the operable elements, input fields, and the like that are displayed, for example. The receiving unit 161 receives a user operation performed by the user while the operating screen is displayed, and conducts a process in response to the received user operation. A process in response to a user operation refers to a process associated with a displayed operable element, or a process of correcting information in a displayed input field, for example.

Note that after information in an input field is corrected, the receiving unit 161 conducts a process of supplying the corrected information to the display control unit 160 as the process in response to a user operation, and the display control unit 160 causes the corrected information to be displayed in the input field. The display control unit 160 and the receiving unit 161 will be described in further detail later, in conjunction with the storage unit 256 and the output unit 158. The reading unit 151, the acquisition unit 152, the conversion unit 153, the generation unit 154, the computation unit 155, the selection unit 156, the information acquisition unit 157, the output unit 158, the image forming unit 159, the display control unit 160, and the receiving unit 161 are realized by software processing of the controller 101.

The server device 200 is equipped with a registration unit 251 and a transmitting unit 252. The registration unit 251 registers the set of the title of a book given as attribute information, and the management number and call numbers given as label information, in the monograph DB 221 illustrated in FIG. 4, and registers the set of the title of a book given as attribute information, and the management number and restricted period given as label information, in the magazine DB 222. The registration unit 251 is equipped with a second acquisition unit 253, a specifying unit 254, an indexing unit 255, and a storage unit 256. The second acquisition unit 253 acquires publication specification information (an ISBN or ISSN) scanned from a book.

In the present exemplary embodiment, when the acquired publication specification information is an ISBN, the specifying unit 254 specifies category information expressing the category of the book on the basis of the ISBN. Specifically, the specifying unit 254 first cross-references publication information with the bibliographic information storage device 300 on the basis of the ISBN. Subsequently, the specifying unit 254 specifies the call number (1) in the category table 223 illustrated in FIG. 4 that is associated with the library classification code included in the cross-referenced publication information, and specifies the call number (3) on the basis of the call number (1). The specifying unit 254 reports the specified call number (1) and call number (3) to the storage unit 256.

Meanwhile, when the acquired publication specification information is an ISSN, the specifying unit 254 specifies the restricted period discussed earlier (the period starting from the publication date of the magazine during which borrowing is not allowed), on the basis of the ISSN. In this case, the specifying unit 254 cross-references publication information with the bibliographic information storage device 300 on the basis of the ISSN, and specifies the restricted period from the publication date of the magazine included in the publication information. The specifying unit 254 reports the specified restricted period to the storage unit 256. In addition, in both cases whether the publication specification information is an ISBN or an ISSN, the specifying unit 254 cross-references the publication information, reports the title of the book included in the publication information to the storage unit 256, and reports this state to the indexing unit 255. The indexing unit 255 indexes a management number when there is a report from the specifying unit 254. The indexing unit 255 reports the indexed management number to the storage unit 256.

When the publication specification information acquired by the second acquisition unit 253 is an ISBN, the storage unit 256 obtains the call number (1) and call number (3) reported from the specifying unit 254, and the management number reported from the indexing unit 255, as the label information discussed earlier. Also, when the publication specification information acquired by the second acquisition unit 253 is an ISSN, the storage unit 256 obtains the restricted period reported from the specifying unit 254, and the management number reported from the indexing unit 255, as the label information discussed earlier. This label information is information obtained on the basis of the publication specification information (an ISBN or ISSN) acquired by the second acquisition unit 253.

The storage unit 256 stores the label information obtained in this way, and stores the title of the book reported from the specifying unit 254 as the attribute information discussed earlier, and as a result the registration unit 251 registers the set of attribute information and label information. The storage unit 256 stores this information in the monograph DB 221 if the publication specification information is an ISBN, and stores the information in the magazine DB 222 if the publication specification information is an ISSN. Note that the storage unit 256 may not store the label information immediately after acquisition in some cases. This case will be described in further detail later.

The transmitting unit 252 transmits the set of attribute information and label information registered by the registration unit 251 to the image processing device 100. In the present exemplary embodiment, the transmitting unit 252 transmits to the image processing device 100 every time a set corresponding to one book is registered (a set of attribute information and label information registered on the basis of publication specification information scanned from the publication specification information barcode label 21 on one book).

This set is supplied to the acquisition unit 152, and acquired by the acquisition unit 152 as a set of at least one of attribute information, identification information, category information, and period information. The registration unit 251, the transmitting unit 252, the second acquisition unit 253, the specifying unit 254, and the storage unit 256 are realized by software processing of the controller 210. Also, a code applied to a book includes not only a code printed on a book or a code affixed to a book, but also a code attached to a book in a removable way. Note that a code refers to a system of signs or codes for expressing information, and in the present exemplary embodiment includes not only various types of barcodes and QR codes (registered trademark), but also call numbers.

Next, the storage of label information by the storage unit 256 will be described in detail. When obtained label information includes the category information of the call number (1) and the call number (3) as discussed earlier, the storage unit 256 transmits this category information to the image processing device 100. The category information is supplied to the display control unit 160. The display control unit 160 displays a screen for confirming the supplied category information, which is also a screen for receiving an operation to correct the category information where appropriate (hereinafter designated a "first operation") as a user operation.

FIG. 8 is a diagram illustrating an example of a screen for receiving a first operation. On this screen, the character strings "Confirmation/Correction Screen" and "Book title: xxxxxxxxxx" are displayed. In addition, an input field A1 expressing category information of "09" is displayed beside the character string "Call number (1):", and an input field A2 expressing category information of "18" is displayed beside the character string "Call number (3):". In addition, an operable element A3 including the character string "OK" is displayed. The category information expressed in the input fields A1 and A2 is user-correctable. If the receiving unit 161 receives an operation of correcting the category information expressed in the input field A1 or A2 as the first operation, the display control unit 160 displays the corrected category information.

In addition, if the receiving unit 161 receives an operation of selecting the operable element A3 as the first operation, a process of transmitting the call number (1), which is the category information displayed in the input field A1, and the call number (3), which is the category information displayed in the input field A2, to the server device 200 is conducted as a process in response to a user operation. The user checks whether or not there are any problems with the call numbers (1) and (3) displayed at first. If there are no problems, the user conducts an operation of selecting the operable element A3 without correcting the input fields A1 and A2, whereas if there is a problem, the user conducts an operation of selecting the operable element A3 after first correcting the input fields A1 and A2.

Herein, a problem refers to whether or not the call numbers (1) and (3) are appropriate as part of the library classification specific to the library. As discussed earlier, the category information corresponds to a library classification code included in publication information cross-referenced on the basis of publication specification information. However, for books related to rapidly-changing fields, such as the field of cloud computing, for example, the library classification code included in the cross-referenced publication information may be inappropriate in some cases. In this case, the category information specified by the specifying unit 254 also becomes inappropriate.

The call numbers (1) and (3) transmitted to the server device 200 by the receiving unit 161 are supplied to the storage unit 256. The storage unit 256 stores the call numbers (1) and (3) supplied in this way in the monograph DB 221 as the label information. In this way, when the category information is corrected, the storage unit 256 stores the category information corrected by the first operation as the label information. In addition, even if the category information is not corrected, the storage unit 256 likewise stores the category information confirmed by the user as the label information.

Next, the output of image forming data by the output unit 158 will be described in detail. When the output unit 158 is supplied with all of the various information relevant to outputting image forming data (in other words, information relevant to forming label information on a medium), the output unit 158 reports this state to the display control unit 160. In the present exemplary embodiment, a set of attribute information and label information corresponding to one book is transmitted from the server device 200 as discussed earlier, and thus the output unit 158 makes a report every time the various information relevant to forming label information corresponding to one book on a medium is collected.

When the output of at least one instance of image forming data is available, the display control unit 160 displays a screen for receiving an operation of giving an instruction to start the formation of a label image on a medium (hereinafter a "second operation") as a user operation. FIG. 9 is a diagram illustrating an example of a screen for receiving a second operation. On this screen, the character string "Label Image Preparation Status Screen" is displayed, and a display field A11 expressing a numerical value of "2" is displayed beside the character string "Number of prepared labels:". In addition, the character string "Do you want to start image formation?" and an operable element A12 including the character string "OK" are displayed.

If the receiving unit 161 receives an operation of selecting the operable element A12 as the second operation, a process of requesting the output unit 158 to output image forming data for forming a label image not yet formed on a medium is conducted as a process in response to a user operation. When the output unit 158 receives the above request from the receiving unit 161, or in other words when the user performs the second operation, the output unit 158 follows the request and outputs image forming data for forming a label image not yet formed on a medium. If the second operation is performed while the screen illustrated in FIG. 9 is being displayed, the output unit 158 outputs image forming data for forming two label images not yet formed on a medium. Meanwhile, if the second operation is not performed, the numerical value expressed in the display field A11 is incremented by 1 every time a publication specification information barcode label 21 is scanned.

As above, the display control unit 160 causes a display unit to display operating screens for receiving a user operation (first operation or second operation) conducted after label information is obtained by the storage unit 256, but before a label image expressing that label information is formed on a medium by the image forming unit 159. In addition, the output unit 158 responds to an instruction based on a user operation received while one or both of these operating screens are being displayed, and outputs data for forming a label image on a medium. Herein, an instruction refers to an instruction to correct category information when the first operation is received, and an instruction to start the formation of a label image on a medium when the second operation is received.

In the present exemplary embodiment, a first operation which is a user operation for correcting category information as discussed earlier is received, and a label image reflecting the corrected category information is formed. Consequently, it is possible to minimize wasteful consumption of media due to forming a label image expressing incorrect category information, and then forming a label image with corrected category information. In addition, by having the user perform the second operation when the number of label images not yet formed on a medium increases, a larger number of label images are formed on a medium compared to the case of generating and outputting image forming data as soon as the generation of image forming data is available, for example, and as a result, less media is consumed.

In the present exemplary embodiment, since a user instruction is reflected in the process of forming a label image to use for book management on a medium as discussed above, the user becomes able to give instructions for reducing the amount of media consumed by this process. Specifically, the user becomes able to perform the first operation to give an instruction to correct incorrect category information, and in addition, the user becomes able to perform the second operation to give an instruction to increase the number of label images formed on a medium.

(Operation)

Figure 10:
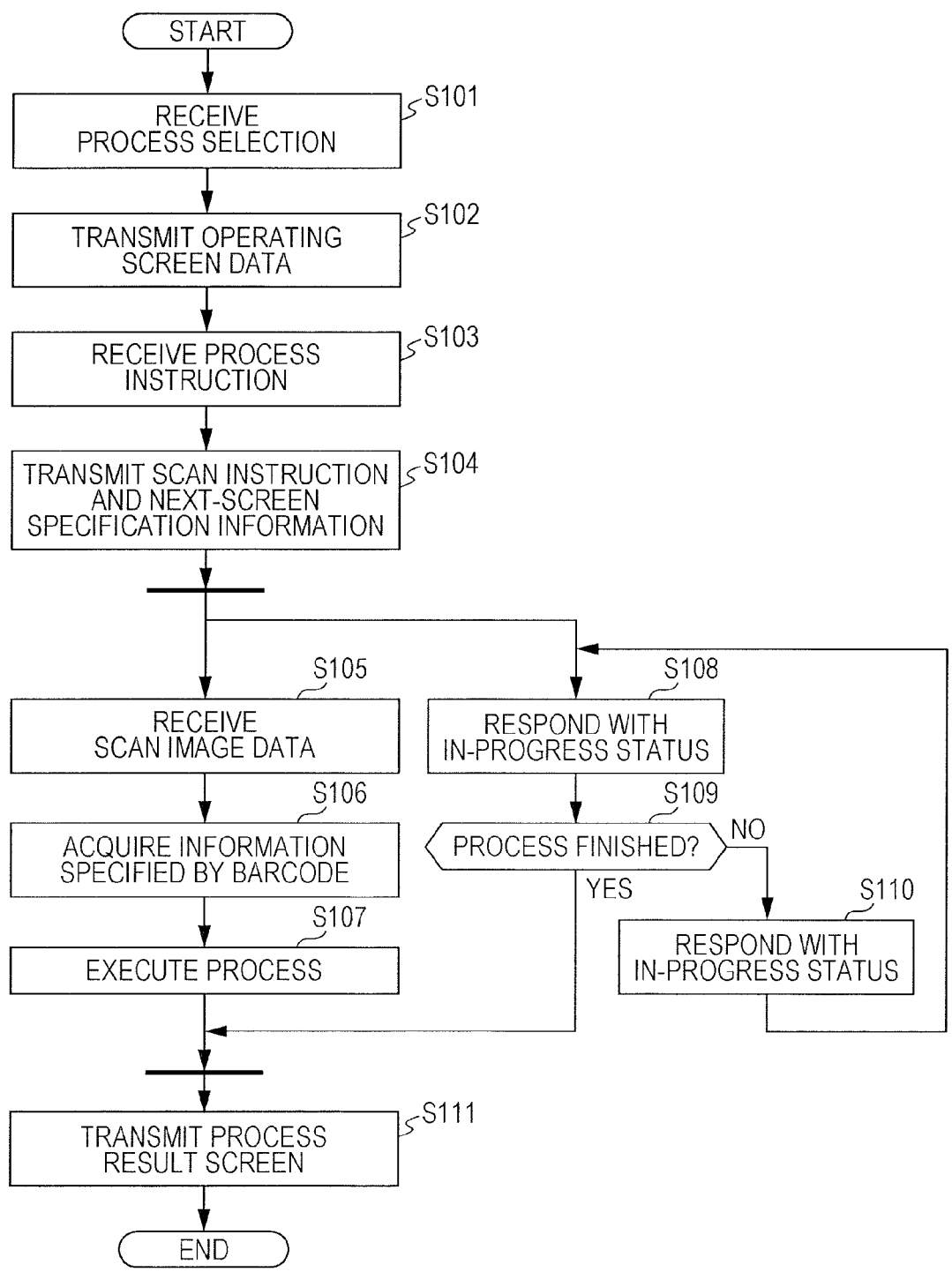
FIG. 10 is a flowchart illustrating basic operation of a server device.
Figure 11:
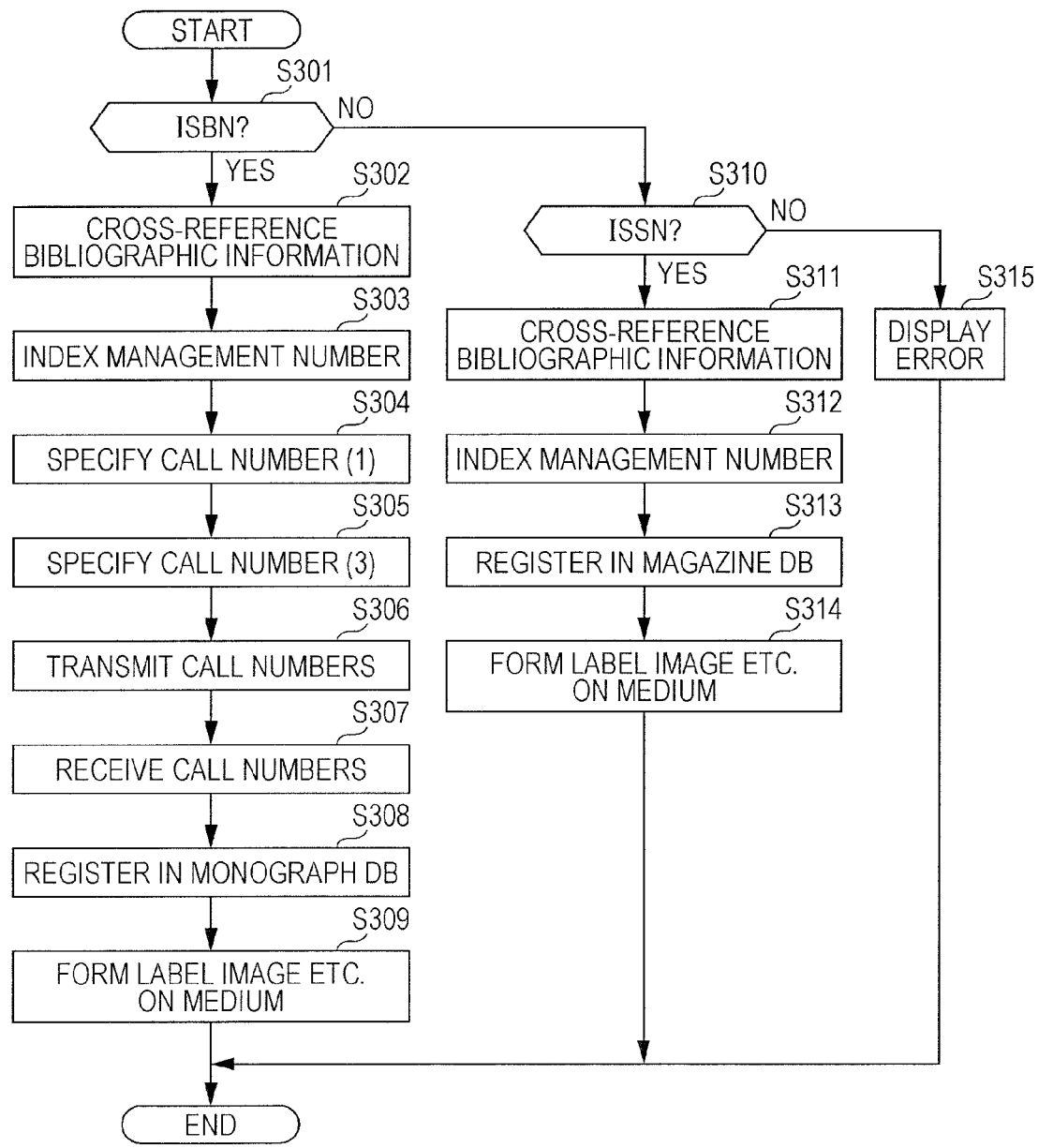
FIG. 11 is a flowchart illustrating operation of a server device during database registration.
Figure 12:
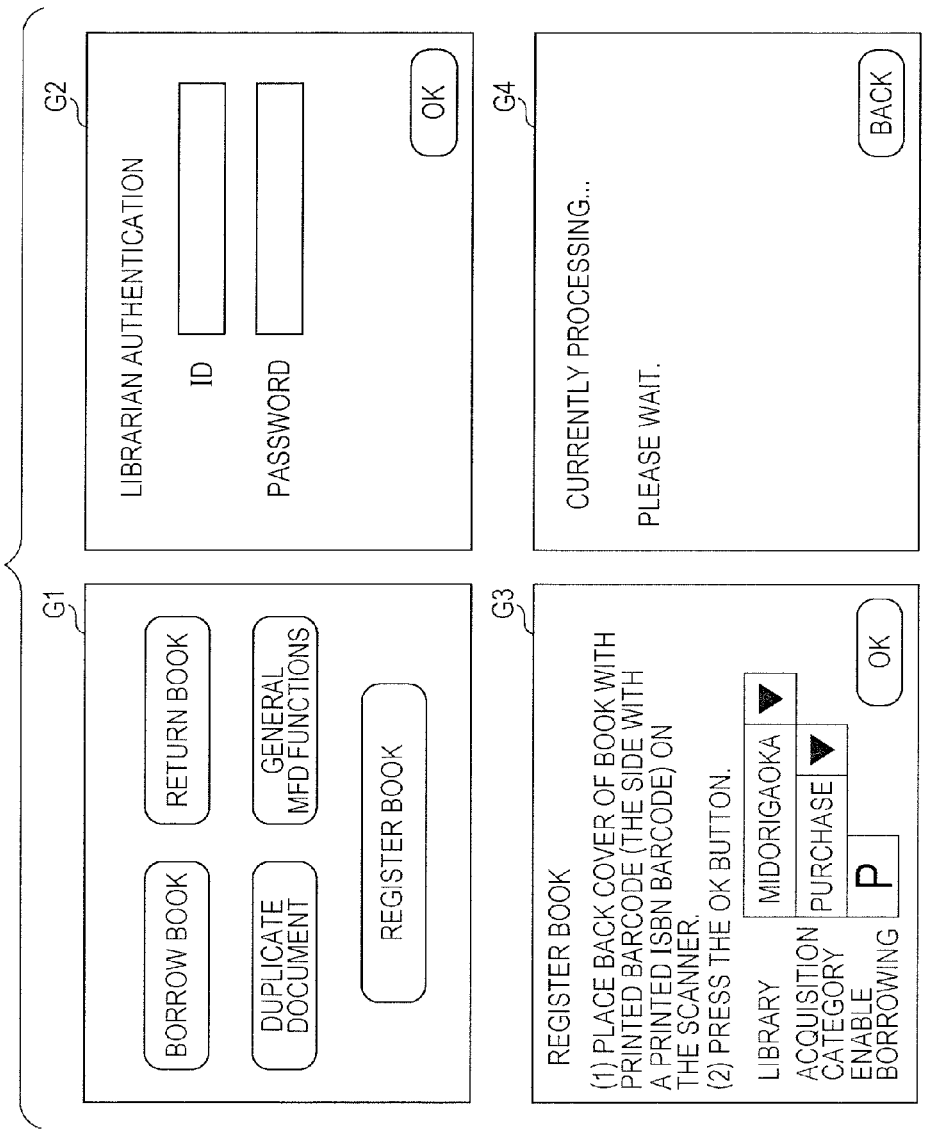
FIG. 12 is a diagram illustrating an example of a screen displayed on an image processing device.
Figure 13:
FIG. 13 is a diagram illustrating an example of a screen displayed on an image processing device.
Figure 14:
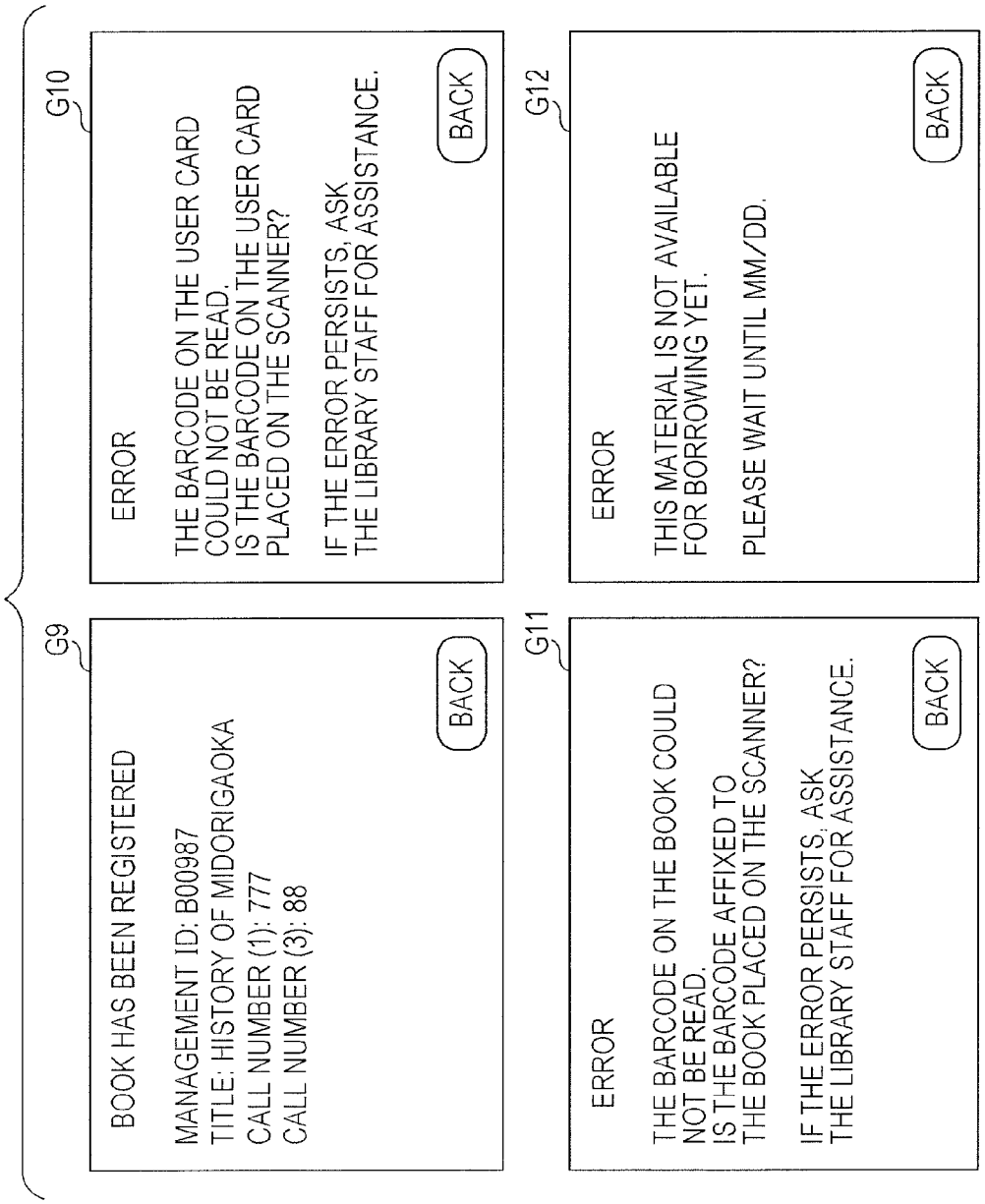
FIG. 14 is a diagram illustrating an example of a screen displayed on an image processing device.

FIGS. 10 and 11 are flowcharts illustrating operation of the server device 200, while FIGS. 12 to 14 are diagrams illustrating examples of screens displayed on the image processing device 100. FIG. 10 illustrates basic operation of the server device 200, while FIG. 11 illustrates the detailed processing in step S107 of FIG. 10.

(Basic Operation)

First, the process selection screen G1 illustrated in FIG. 12 is displayed on the UI unit 106 of the image processing device 100. On the process selection screen G1, the user selects a desired process. Among the software buttons stating the processes "Borrow book", "Return book", "Duplicate document", "Register book", and "General MFD functions" illustrated in FIG. 12, respective Uniform Resource Locators (URLs) are associated with the software buttons of "Borrow book", "Return book", and "Register book". If the user selects one of the processes among "Borrow book", "Return book", and "Register book", the controller 101 of the image processing device 100 transmits a Hypertext Transfer Protocol (HTTP) request to the URL associated with the selected process.

On the other hand, if the user selects "Duplicate document", the controller 101 of the image processing device 100 reads out screen data for conducting a copy from the storage 102, and displays a screen according to the data on the UI unit 106. Also, if "General MFD functions" is selected, the controller 101 of the image processing device 100 reads out from the storage 102 data for displaying a typical menu screen on an MFD, listing selection options such as Copy, Scan, and Facsimile, and displays the screen on the UI unit 106.

Note that not all of the above processes may be provided to all users. In other words, among all processes, some processes may be provided to all users, whereas other processes may only be provided to specific users. In this case, it is conceivable to implement a method of authenticating the user before displaying the process selection screen G1, and displaying a process selection screen G1 presenting processes available to the authenticated user, or a method of first displaying the process selection screen G1 presenting processes available to all users, and after conducting authentication, displaying processes available to the authenticated user.

The display screen itself may also be modified to be different between normal users and specific users. For example, the process of "Register book" may be provided to a librarian only. On the process selection screen G1 for normal users, "Register book" is not displayed, and after successful authentication with an ID and a password or the like on a librarian login screen G2, the controller 101 reads out from the storage 102 data for displaying a process selection screen exclusively for librarians, and displays a screen including a software button stating "Register book" on the UI unit 106.

At this point, an example will be described for a case in which a user performs an operation of selecting one of "Borrow book", "Return book", and "Register book" on the image processing device 100. In this case, the controller 101 of the image processing device 100 transmits an HTTP request to the URL associated with the selected process. In this example, these processes are all conducted by the server device 200, and thus the URL is the URL of the server device 200. The controller 210 of the server device 200 receives the HTTP request, and thereby receives the selection of a process (FIG. 10, step S101). Subsequently, the controller 210 reads out operating screen data according to the HTTP request from the storage 220, and transmits to the image processing device 100 (step S102).

The controller 101 of the image processing device 100 displays an operating screen according to the received operating screen data on the UI unit 106. For example, a registration screen G3 (FIG. 12) is displayed on the UI unit 106 in the case of registering a book newly obtained by the library, a borrow process screen G5 (FIG. 13) is displayed on the UI unit 106 in the case of the library lending a book (the user borrowing a book), and a return process screen G6 (FIG. 13) is displayed on the UI unit 106 in the case of the user returning a book. In the case of registering a book, the back cover 2 of the book on which is printed the publication specification information barcode label 21 is set in the image reading unit 104 of the image processing device 100, relevant information is additionally input into an input field provided on the registration screen G3, and a software button stating "OK" (hereinafter designated the OK button) is selected. As a result, an identifier of the OK button, the value information, and the information input into the input field are transmitted to an associated URL given by a form tag in Hypertext Markup Language (HTML) on the registration screen.

Also, in the case of borrowing or returning a book, the user sets, on a platen glass provided in the image reading unit 104 of the image processing device 100, the front cover 1 of the book to which is affixed the management barcode label 11, and the face of the user's own user card 4 on which is printed a user ID barcode, and selects the OK button on the borrow process screen G5 or the return process screen G6. As a result, the image reading unit 104 reads multiple codes with a single scan from one book on the platen glass. At this point, multiple books may also be placed on the platen glass at the same time and codes may be read from these books with a single scan, and in addition, a user card may also be placed together on the platen glass and a code may be read from the user code.

The identifier of the OK button and the value information are transmitted to an associated URL given by a form tag in HTML on these screens. The controller 210 of the server device 200 receives the information, and thereby receives the process instruction (step S103). Note that hardware buttons provided on the image processing device 100 may also be configured to receive the same instructions as the above software buttons. Alternatively, software buttons may not be displayed on the UI unit 106, and hardware buttons on the image processing device may replace the functions of the software buttons.

The controller 210 of the server device 200 transmits a scan instruction and next-screen specification information to the image processing device 100 (step S104). The scan instruction includes scan parameters such as the scan resolution (300 dots/inch (dpi), for example), monochrome, and the image format (TIFF format, for example), and a URL indicating the transmission destination of the scan image data. The next-screen specification information is path information such as a URL signifying the storage location of image data.

The controller 101 of the image processing device 100, following the received scan instruction, reads an image with the image reading unit 104, and generates image data in accordance with the parameters specified from the server device 200. The controller 101 transmits the generated image data to the specified transmission destination. Where appropriate, the controller 101 attaches not only the scan parameters but also meta-information (such as authenticated user information and the address of the image processing device) to the scan image data.

The controller 210 of the server device 200 receives the scan image data transmitted from the image processing device 100 (step S105). Subsequently, the controller 210 acquires the information specified by the barcode included in the scan image data (step S106). If the scan image data includes multiple barcodes, the controller 210 acquires the multiple instances of respectively corresponding information. Subsequently, the controller 210 judges whether or not the execution of a process using the acquired information is available, and in the case of judging that the execution of a process is available, executes a process on the basis of the acquired information (step S107). Details of these processes will be discussed later.

During steps S105 to S107, the controller 101 of the image processing device 100 specifies the URL specified by the next-screen specification information, and requests a status display screen from the server device 200. If the processing in step S107 is not completed (step S109; No), the controller 210 of the server device 200 transmits in-progress screen data (the in-progress screen G4 of FIG. 12) to the image processing device 100 (steps S108, S110). On the other hand, if the processing in step S107 has finished normally (step S109; Yes), the controller 210 transmits normal finish screen data (the process result screens G7 and G8 in FIG. 13, or the process result screen G9 in FIG. 14) to the image processing device 100, whereas if the processing in step S107 finished on an error, the controller 210 transmits an error screen (the process result screens G10, G11, and G12 in FIG. 14) to the image processing device 100 (step S111).

(Registration Operation)

Next, the processing in step S107 (FIG. 10) when registering a book will be described with reference to FIG. 11. The controller 210 of the server device 200 decodes the one or multiple barcodes included in the scan image data, and acquires the one or multiple instances of information specified from each barcode. The controller 210 judges whether or not a character string indicating an ISBN is included among this information (step S301). To identify various information such as the ISBN, ISSN, user ID, and monograph/magazine management number, a method that distinguishes by respective prefixes is conceivable.

Specifically, an ISBN is a 13-digit number that starts with 987, an ISSN is a 13-digit number that starts with 977, and by configuring a user ID to start with a specific prefix such as A (for example, A0012345), for example, a monograph management number to start with a specific prefix such as YB (for example, YB00012), for example, and a magazine management number to start with a specific prefix such as YM (for example, YM0002222), for example, the controller 210 judges the type of information according to these prefixes. In addition, the number of digits in each piece of information, or what is called a check digit, may also be used. Also, information may be distinguished by the type of barcode, or distinguished by an image near a barcode (such as a guide image), and the barcode position.

When an ISBN is obtained (step S301; Yes), the controller 210 specifies the ISBN and cross-references publication information with the bibliographic information storage device 300 (step S302). If publication information is obtained, the controller 210 indexes a management number (step S303). The controller 210 references the category table 223, and specifies the call number (1) corresponding to the library classification code included in the acquired publication information (step S304). Next, the controller 210 specifies the call number (3) from the specified call number (1) (step S305).

Next, the controller 210 transmits the specified call numbers (call numbers (1) and (3)) and the title of the book included in the publication information to the image processing device 100 (step S306). Consequently, the image processing device 100 displays the screen illustrated in FIG. 8, for example. Subsequently, if the user performs the first operation, the image processing device 100 receives the first operation and transmits the call numbers being displayed at that time to the server device 200, and thus the controller 210 receives the call numbers transmitted in this way. Next, the controller 210 adds a new record to the monograph DB 221 and registers relevant information, including the received call numbers (step S308).

From among the registered information, the controller 210 causes the label image expressing the label information (code image and call number image) and the title of the book given as attribute information to be formed on a medium (step S309). The code image formed on a medium in this way, or in other words the image of a barcode expressing a management number, is affixed to the monograph as the management barcode label 11. Also, the call number image formed on a medium is affixed to the monograph as the call number label 31. Also, the title of the book formed on a medium is used by the user to distinguish which book corresponds to the management barcode label 11 and the call number label 31. Note that the processing in step S309 will be discussed in detail later.

Meanwhile, when an ISSN is obtained (step S301; No and step S310; Yes), the controller 210 specifies the ISSN and cross-references publication information with the bibliographic information storage device 300 (step S311). If publication information is obtained, the controller 210 indexes a management number (step S312). Next, the controller 210 adds a new record to the magazine DB 222 and registers relevant information (step S313). From among the registered information, the controller 210 causes the label image expressing the label information (code image and restricted period image) and the title of the book given as attribute information to be formed on a medium (step S314). The code image formed on a medium in this way is affixed to a magazine as the management barcode label 11, and the restricted period image formed on a medium is affixed to a magazine as the restricted label 12. Note that the processing in step S314 will be discussed in detail later.

Note that if neither an ISBN nor an ISSN is obtained (step S301; No and step S310; No), the controller 210 judges that book registration is unavailable, and instructs the image processing device 100 to display an error (step S315). In other words, the judgment in step S301 and step S310 corresponds to a judgment of whether or not the requested process of registering a book is available. In this case, the front cover and back cover of the book may be scanned with the image processing device 100, processed with optical character recognition (OCR), and used as publication information.

(Management Barcode and Label Creation Operation)

Next, the processing in step S309 and step S314 of FIG. 11 will be described with reference to FIG. 15. In this example, in step S309 of FIG. 11, the controller 210 of the server device 200, on the basis of the information registered in step S308, transmits to the image processing device 100 a set of monograph information including information such as the title of a monograph (an example of attribute information), a management number (an example of identification information), and the call number (1) and call number (3) (an example of category information). In addition, in step S314, the controller 210, on the basis of the information registered in step S313, transmits to the image processing device 100 a set of magazine information including information such as the title of a magazine, a management number, and restricted period information. The monograph information and the magazine information are examples of attribute information indicating the attributes of a book.

Figure 15:
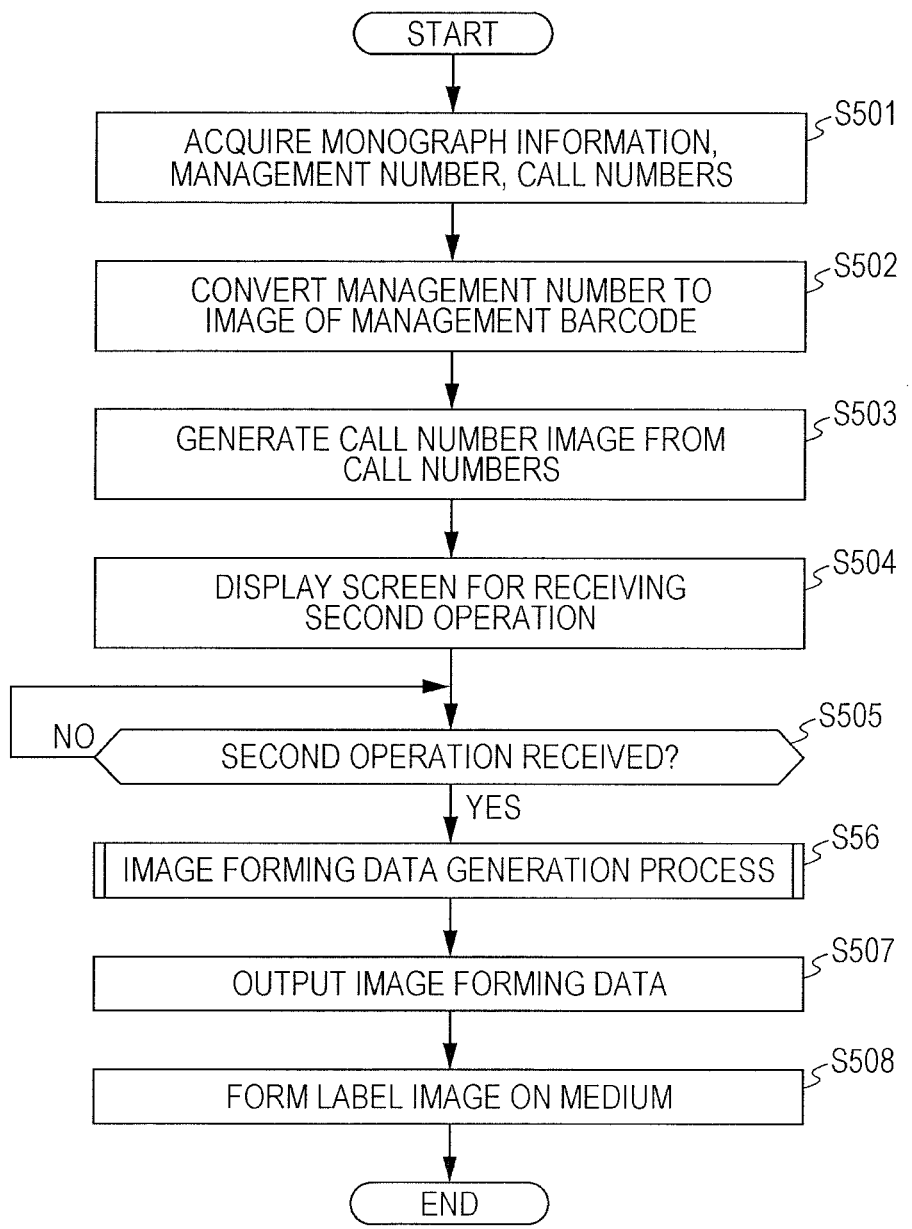
FIG. 15 is a flowchart illustrating operation of an image processing device.

FIG. 15 is a flowchart illustrating a sequence of operations of the image processing device 100 in a label creation process. The label creation process refers to the process of creating the management barcode label 11 and the call number label 31 (the process in step S309 of FIG. 11). First, the controller 101 of the image processing device 100 receives (acquires) from the server device 200 a set of monograph information which is an example of attribute information, a management number which is an example of identification information, and the call number (1) and call number (3) which are an example of category information (step S501). The controller 101 converts the received management number into an image of a management barcode (an example of a code image) (step S502).

The code system of the converted barcode may use Code 39, for example, or be a two-dimensional code such as a QR code. In addition, in the case of scanning at the minimum available scanning resolution (typically 200 dpi) with the image processing device 100, the controller 101 may also convert the received management number into an image of a management barcode of a size enabling analysis. At this point, the controller 101 may also add supplementary information, such as the library name or facility name, above or below the image of the management barcode. The supplementary information may also be held in advance in a storage unit of the image processing device 100.

The controller 101 generates a call number image on the basis of the received call number (1) and call number (3) (step S503). The call number image is generated by combining the call number (1) and call number (3) with an image for the call number label 31 registered in advance in the image processing device 100, for example. After the controller 101 acquires monograph information, converts a management number to an image of a management barcode, and generates a call number image as above, the information for an image to be formed on a medium (monograph information and label information) is collected and image forming data may be generated, and thus the controller 101 displays an image for receiving the second operation as illustrated in FIG. 9 (step S504).

The controller 101 judges whether or not the second operation was received until the second operation is received (step S505), and after judging that the second operation was received (step S505; Yes), generates image forming data for forming monograph information and a label image on a medium (step S506). Next, the controller 101 outputs the generated image forming data to the image forming unit (step S507), and forms the monograph information and the label image on a medium (step S508).

Figure 16:
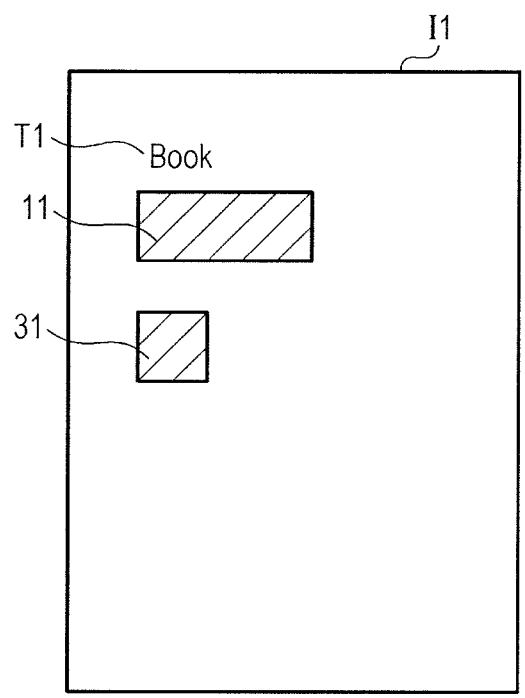
FIG. 16 is a diagram illustrating an example of an image formed on a medium by an image processing device.

The image I1 in FIG. 16 is an example of an image formed on a medium in step S508. In this example, an image expressing the title T1, a management barcode label 11, and a call number label 31 including the call number (1) and call number (3) of a monograph are formed on a single sheet of A4-sized medium. In this example, the controller 101 places the title T1, an image expressing the management barcode label 11 (in other words, an image of a management barcode) and an image expressing the call number label 31 (in other words, a call number image) in PDL discussed earlier. First, the controller 101 places the title T1 of the book with left justification. The title T1 of the book may be embedded as a character string, or be placed after being converted to a font image. If the title T1 is long and does not fit on a single line of the page, the title T1 may continue on a new line after reaching the edge of the page.

The controller 101 places the management barcode label 11 on the next line after the title T1, and places the call number label 31 on the next line after the management barcode label 11. Note that in this example, the controller 101 uniquely decides the placement locations of the title T1, the management barcode label 11, and the call number label 31 (hereinafter designated the "image group"), but the method of placing the image group is not limited to the above. For example, a template stating the placement method may be stored in advance in a storage unit of the image processing device 100, and the controller 101 may place the image group by referencing the template stored in the storage unit. A worker cuts out and affixes the management barcode label 11 and the call number label 31 formed on the medium to the registered book.

Exemplary Modifications

The exemplary embodiment discussed above is merely an example of carrying out the present invention, and may also be modified as follows. Also, the exemplary embodiment and each exemplary modification may also be carried out in combination with each other as appropriate.

Exemplary Modification 1

Output Timing

In the exemplary embodiment, the output unit 158 outputs image forming data when the second operation is performed, but may also output image forming data at different timings. For example, the output unit 158 may output image forming data on the basis of the number of unformed label images not yet formed on a medium. Specifically, when the number of label images not yet formed on a medium exceeds a threshold, the output unit 158 outputs image forming data even if the second operation is not performed.

The number used as the number of label images may be the number of pairs of a code image and a call number image or the number of pairs of a code image and a restricted period image, or a number obtained by counting the code images, call number images, and restricted period images as one each. The number used as the threshold may be the number of label images sufficient to fill a single sheet of the medium, for example. In this case, the threshold is determined according to factors such as the size of the label image, the size of the medium, and the placement of label images. Note that a number of label images sufficient to fill each of multiple sheets of medium rather than one sheet of medium may also be used as the threshold.

Figure 17:
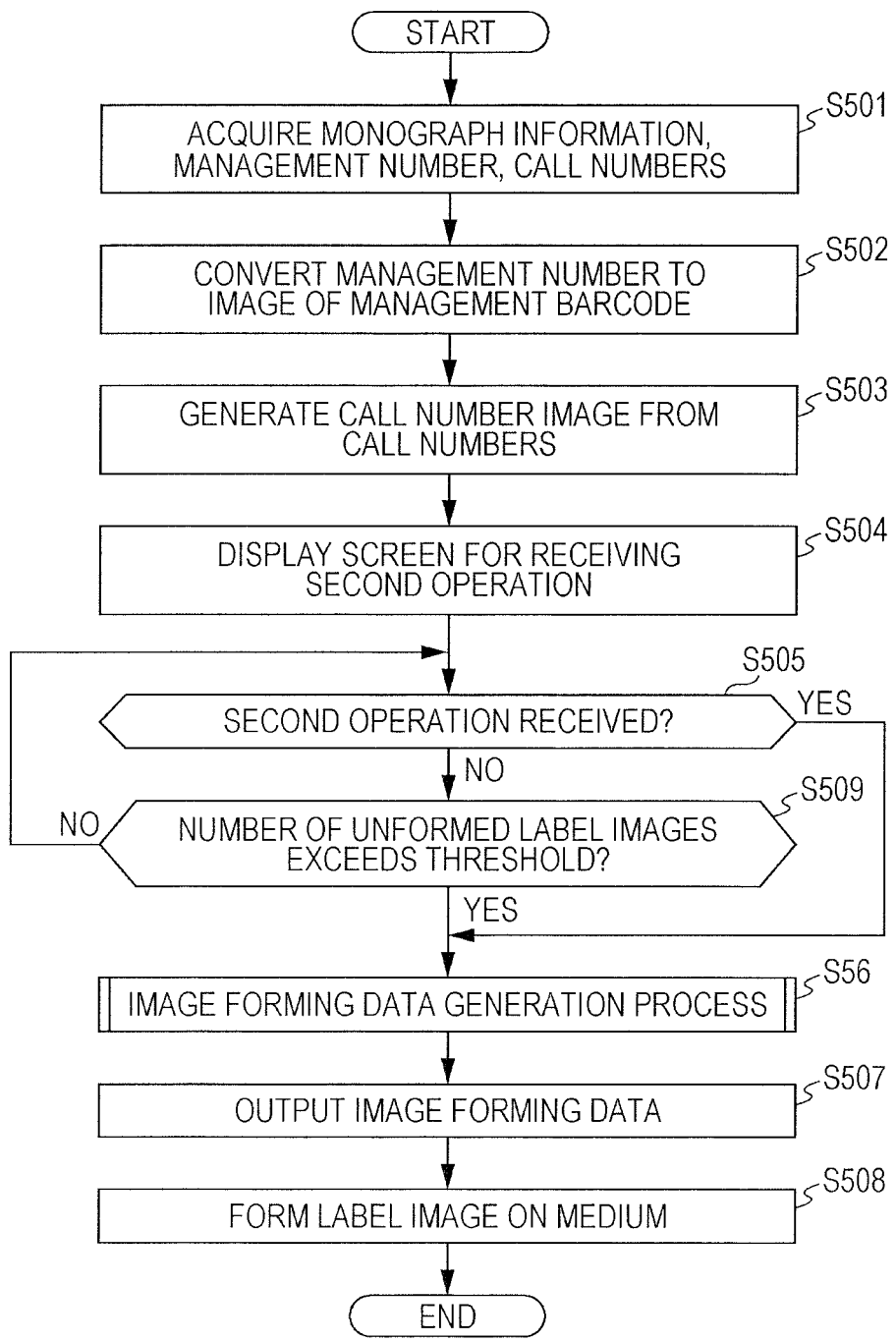
FIG. 17 is a flowchart illustrating operation of an image processing device.

FIG. 17 is a flowchart illustrating a sequence of operations of the image processing device 100 in a label creation process of the present exemplary modification. First, the controller 101 of the image processing device 100 conducts the operations from step S501 to S505 illustrated in FIG. 15. In the case of judging in step S505 that the second operation was received (Yes), the controller 101 conducts the operation in step S56 (image forming data generation process) and thereafter. In the case of judging in step S505 that the second operation is not received (No), the controller 101 next judges whether or not the number of unformed label images exceeds a threshold (step S509). In the case of judging that the number of label images does not exceed the threshold (No), the controller 101 returns to the operation in step S505, whereas in the case of judging that the threshold is exceeded (Yes), the controller 101 conducts the operation in step S56 (image forming data generation process) and thereafter.

If the user continually performs the work of scanning the publication specification information barcode label 21, the number of unformed label images gradually increases, but if some kind of trouble occurs in the image processing device 100 at this point, for example, the unformed image labels may be lost. According to the present exemplary modification, compared to the case of not outputting image forming data on the basis of the number of label images, there are fewer unformed label images, and a lessened burden of redoing the registration work due to a loss of image labels in the case discussed above.

Note that in some cases, the image forming data may also not be output even if the number of unformed label images exceeds the threshold. For example, when the image forming unit 159 that forms label images is in a specific state, the output unit 158 may not output image forming data even if the number of label images not yet formed on a medium exceeds the threshold. For the specific state, the case of using a state in which the image forming unit 159 does not have a dedicated housing unit for housing a medium on which to form label images (for example, a dedicated feed tray), and a state in which the image forming unit 159 does not have a dedicated housing unit for housing a medium formed with label images and delivered (for example, a dedicated delivery tray) will be described, for example.

Figure 18:
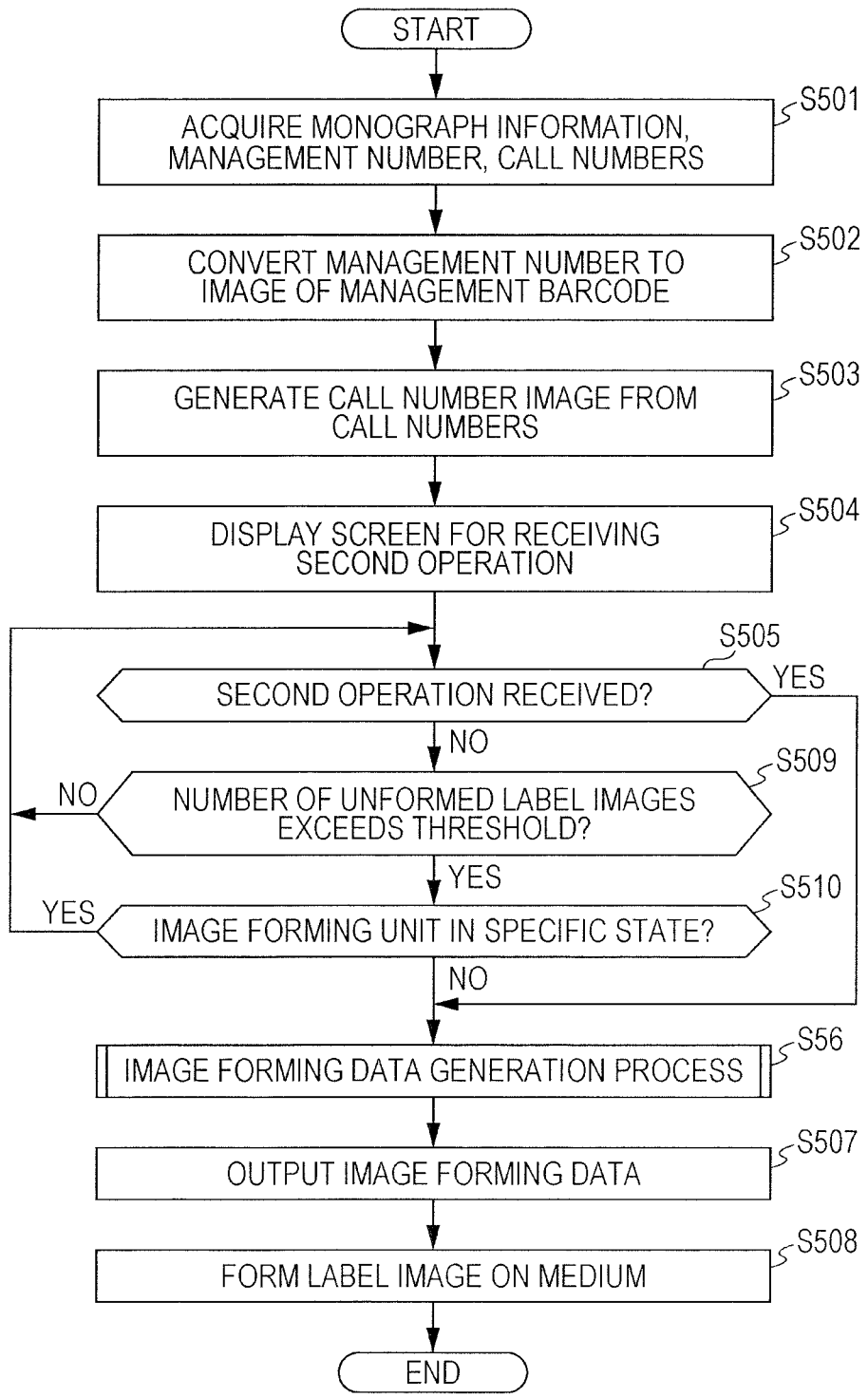
FIG. 18 is a flowchart illustrating operation of an image processing device.

FIG. 18 is a flowchart illustrating another sequence of operations of the image processing device 100 in a label creation process of the present exemplary modification. First, the controller 101 of the image processing device 100 conducts the operations from step S501 to S505 illustrated in FIG. 17. In the case of judging in step S505 that the second operation is not received (No), and next judging that the number of unformed label images exceeds a threshold (step S509; Yes), the controller 101 judges whether or not the image forming unit is in a specific state (step S510). In the case of judging that the image forming unit is in a specific state (step S510; Yes), the controller 101 returns to the operation in step S505 (the judgment of whether or not the second operation is received), whereas in the case of judging that the image forming unit is not in a specific state (step S510; Yes), the controller 101 conducts the operation in step S56 (image forming data generation process) and thereafter.

For example, when the image forming unit does not have the dedicated feed tray discussed above, the efficiency of other work sharing a feed tray may drop as a result of forming label images. According to the example in FIG. 18, in this case, by having the user who conducts the registration work perform the second operation and cause the formation of label images when the image forming unit is not being used for other work, a drop in the efficiency of other work may be minimized. Conversely, when the image forming unit has a dedicated feed tray, the user is free from worrying about the utilization of the image forming unit for other user.

In addition, when the image forming unit does not have a dedicated delivery tray, a medium with label images formed thereon will be delivered into the delivery tray used for other work. If label images are formed on a medium when the number of unformed label images exceeds a threshold, the user performing the registration work may not have performed the second operation personally, and thus may not realize that label images have been formed on a medium. In this case, a problem may occur in which the medium is neglected and taken away or discarded by another user.

According to the example in FIG. 18, if the image forming unit does not have a dedicated delivery tray and the second operation is not performed, label images are not formed on a medium, and thus such problems may not occur. As above, according to the example in FIG. 18, compared to the case of not outputting data on the basis of the state of the image forming unit, the work efficiency of a user using the image forming unit may be increased.

Otherwise, the output unit 158 may also output image forming data even if the second operation is not performed, such as on a specific date and time, for example. The specific date and time may be determined from a date and time obtained by taking the time at which books are newly acquired by the facility that manages monographs, and adding an estimated period for doing the work of scanning the publication specification information barcode labels 21 of those books. Otherwise, a date and time at which a large accumulation of unformed label images in the image processing device 100 is estimated may be determined. Consequently, compared to the case of not outputting image forming data on the basis of the date and time, there are fewer unformed label images, and a lessened burden of redoing the registration work due to a loss of image labels similar to the example discussed earlier.

Exemplary Modification 2

Displaying Unformed Label Images

In the exemplary embodiment, the display control unit 160 causes a display unit to display the number of label images not yet formed on a medium like in the display field A11 illustrated in FIG. 9, but the display control unit 160 may also present a different display. For example, the display control unit 160 may cause a display unit to display different numbers of label images not yet formed on a medium, according to the type of label image.

Figure 19:
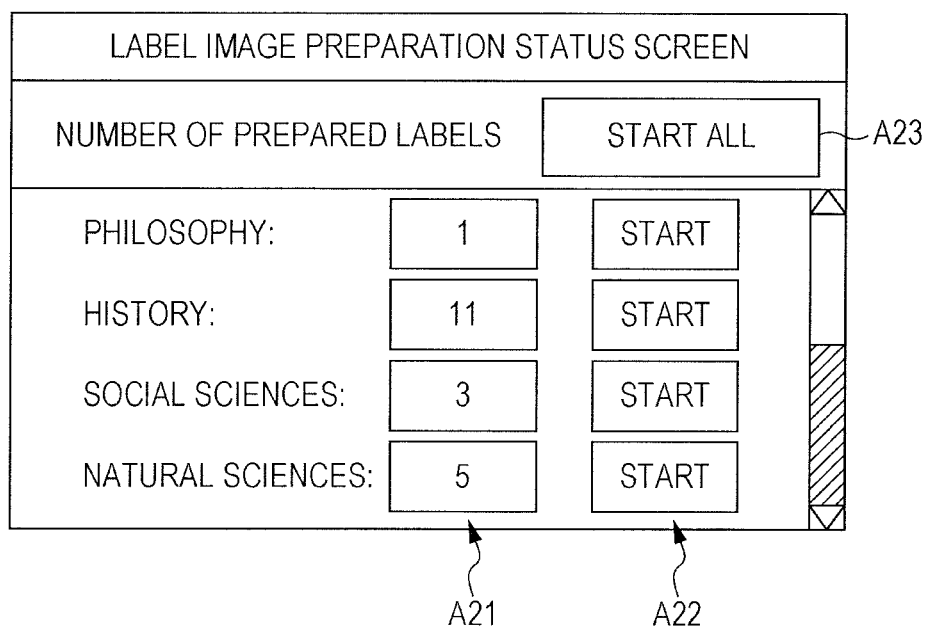
FIG. 19 is a diagram illustrating an example of a displayed screen.

FIG. 19 is a diagram illustrating an example of a displayed screen in the present exemplary modification. On this screen, numbers of prepared label images, or in other words numbers of unformed label images, are respectively displayed in multiple display fields A21 prepared for each of the categories "Philosophy", "History", "Social Sciences", and "Natural Sciences". An operable element A22 including the character string "Start" is respectively displayed beside each display field A21. When an operation of selecting one or more operable element A22 is performed, the output unit 158 outputs the image forming data of label images in the category corresponding to the operated operable element A22.

Also, on the screen of FIG. 19, an operable element A23 including the character string "Start All" is displayed. If an operation of selecting the operable element A23 is performed, the output unit 158 outputs image forming data for forming all unformed label images irrespective of category on a medium. In this way, in addition to displaying the number of label images not yet formed on a medium, the display control unit 160 also displays a screen (the screen presenting multiple operable elements A22) for receiving, as the second operation, an operation giving an instruction to start the formation on a medium of label images sharing a common type from among the label images.

In addition, the display control unit 160 displays a screen (the screen presenting the operable element A23) for receiving, as the second operation, an operation giving an instruction to start the formation on a medium of all unformed label images irrespective of type. The output unit 158 outputs the image forming data of label images sharing a common type or the image forming data of all unformed label images, depending on the received second operation. According to the present exemplary modification, the user is informed of the number of each type of label image to be formed when the second operation is performed. In addition, by having the user view these numbers and perform the second operation, unformed label images are collectively formed by type, or unformed label images are collectively formed irrespective of type.

Exemplary Modification 3

Enabling/Disabling Screen Display

In the exemplary embodiment, the display control unit 160 displays both an operating screen for receiving the first operation and an operating screen for receiving the second operation, but is not limited thereto, and may also display only one of the operating screens, for example. Even in this case, the user instruction indicated by the user operation received on the displayed operating screen is reflected in the process of forming label images on a medium.

In addition, the display control unit 160 may also be configured to not display both operating screens, according to a user-configured setting, for example. For example, if the category information specified by the specifying unit 254 is correct and not in need of correction, and the output of image forming data based on the number of unformed label images discussed above (when the number exceeds the threshold) may be conducted without problems, configuring a setting to not display both operating screens may be a useful way for the user to save time and effort.

Exemplary Modification 4

Storage of Label Information

In the exemplary embodiment, the storage unit 256 does not store obtained label information until after the label information is checked or corrected by the user. However, the storage unit 256 is not limited to this configuration, and may also store label information immediately. In this case, the storage unit 256 stores, in association with the label information, a flag indicating that the label information has not been checked or corrected by the user, for example. Subsequently, if call numbers (1) and (3) that have been checked or corrected by the user are transmitted from the server device 200 and supplied to the storage unit 256, the storage unit 256 writes the supplied call numbers (1) and (3) over the previously stored call numbers (1) and (3), and removes the associated flag.

The registration unit 251, by storing the call numbers (1) and (3) not associated with a flag in this way, registers the call numbers as label information. Since label information associated with a flag is label information that has not been checked or corrected by the user (hereinafter designated "unchecked label information"), the transmitting unit 252 is configured to not transmit unchecked label information to the image processing device 100. Accordingly, label images expressing unchecked label information are not formed on a medium.

Note that the transmitting unit 252 may also transmit unchecked label information in such a way as to indicate that a flag is associated. In this case, the generation unit 154 is configured to not generate a call number image from the call numbers included in the unchecked label information, for example. In addition, the output unit 158 may be configured to not output a call number image generated from call numbers included in unchecked label information as image forming data to form on a medium, and to not include such image forming data in the number of unformed label images in the exemplary modification discussed above. In this way, by not forming label images expressing unchecked label information on a medium, label images are not formed on a medium unless the label image expresses category information that has been checked or corrected by the user.

Exemplary Modification 5

Magazine Management

In the exemplary embodiment, call numbers are only used to manage monographs, but call numbers may also be used to manage magazines. In this case, before the registration of information into the magazine DB in step S313 illustrated in FIG. 11, a process similar to steps S306 and S307 may be conducted, and category information may be checked or corrected by the user.

Exemplary Modification 6

Changing Label Information

In the exemplary embodiment, the category information (specifically, the call numbers) included in the label information are corrected as appropriate for the monograph classification unique to the library, but category information may also be simply changed to some other kind of category information, rather than being corrected to something appropriate. In addition, label information other than category information, or in other words identification information and the restricted period, may also be changed. In this case, the display control unit 160 displays a screen for checking the label information (including the category information, the identification information, and the restricted period), which is also a screen for receiving, as the first operation, an operation to change the label information where appropriate. Consequently, when the user wants to change the indexed management number (an example of identification information) or the restricted period, an instruction to change this information may be applied.

Exemplary Modification 7

Timing for Receiving Second Operation

The display control unit 160 may also display an operating screen for receiving the second operation at a different timing from the exemplary embodiment. For example, the display control unit 160 may also display the operating screen after step S501 (the acquisition of bibliographic information and the like) but before step S502 (the conversion to an image of a management barcode) illustrated in FIG. 15, or display the operating screen after step S56 (the image forming data generation process) but before step S507 (the output of image forming data).

In addition, the display control unit 160 may also display an operating screen after step S507 but before step S508 (the formation of label images onto a medium). In this case, the exchange that the output unit 158 conducts with the display control unit 160 and the receiving unit 161 in the exemplary embodiment is conducted by the image forming unit 159. Basically, it is sufficient for the display control unit 160 to display an operating screen for receiving the second operation before the formation of label images onto a medium is started.

Exemplary Modification 8

Image Forming Data Generation Process

Figure 20A:
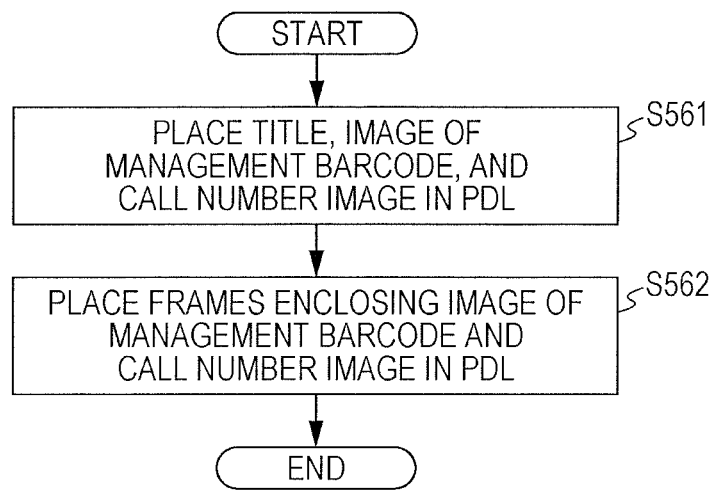
FIGS. 20A to 20D are flowcharts illustrating an example of an image forming data generation process.

The image forming data generation process in step S56 illustrated in FIG. 15 may also differ from the exemplary embodiment. FIG. 20A is a flowchart illustrating an example of an image forming data generation process according to the present exemplary modification. The controller 101 places the title of the book, an image of the management barcode, and a call number image in PDL (step S561), and places a frame enclosing the image of the management barcode (an example of a first frame image) and a frame enclosing the call number image (an example of a second frame image) in PDL (step S562).

Figure 28A:
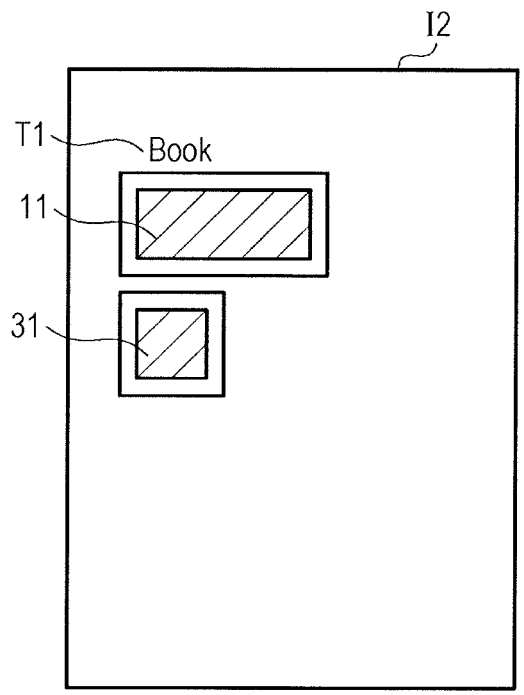
FIGS. 28A and 28B are diagrams illustrating an example of an image formed on a medium by an image processing device.

The image I2 in FIG. 28A is an example of an image formed on a medium according to this example operation. In this example, the placed frames are given a slight margin, enough to not touch the management barcode label 11 and the call number label 31. Note that the frame enclosing the management barcode label 11 and the frame enclosing the call number label 31 may touch.

By enclosing the management barcode label 11 and the call number label 31 in frames, a worker may easily perform the work of cutting out the management barcode label 11 and the call number label 31 from the medium with scissors or the like. In addition, by placing frames so as to not touch the management barcode label 11 and the call number label 31, cutting out the management barcode label 11 and the call number label 31 becomes easier, and in addition, accidental damage to the management barcode label 11 and the call number label 31 when being cut out may be minimized.

Figure 20B:
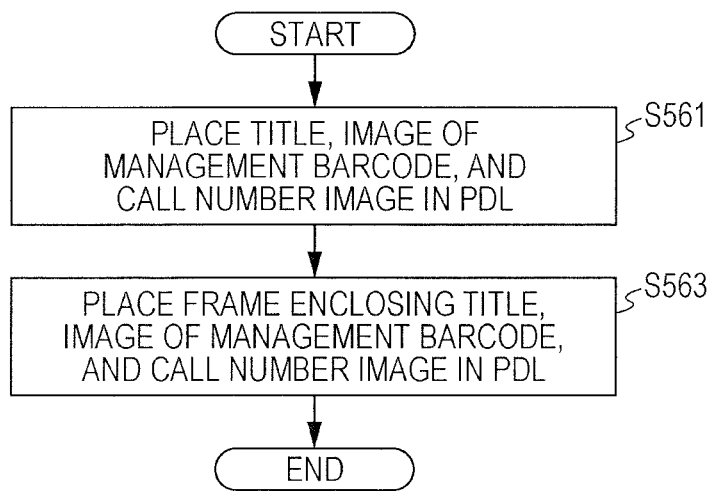
Figure 28B:
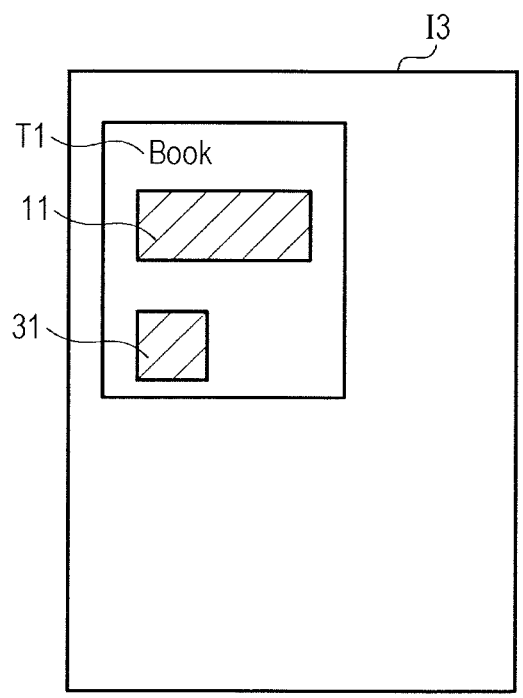

FIG. 20B is a flowchart illustrating another example of an image forming data generation process. The controller 101 conducts the operation in step S561 (placing an image group in PDL), and places in the PDL a frame enclosing the image group placed in the PDL (an example of a third frame image) (step S563). The image I3 in FIG. 28B is an example of an image formed on a medium according to this example operation. In this example, the placed frame is given a slight margin, enough to not touch the image group.

By enclosing the image group in a frame, the mutual association between the title T1, the management barcode label 11, and the call number label 31 of a monograph is easily grasped. In addition, by placing the frame so as to not touch the management barcode label 11 and the call number label 31, cutting out the management barcode label 11 and the call number label 31 becomes easier, and in addition, accidental damage to the management barcode label 11 and the call number label 31 when being cut out may be minimized.

Figure 20C:
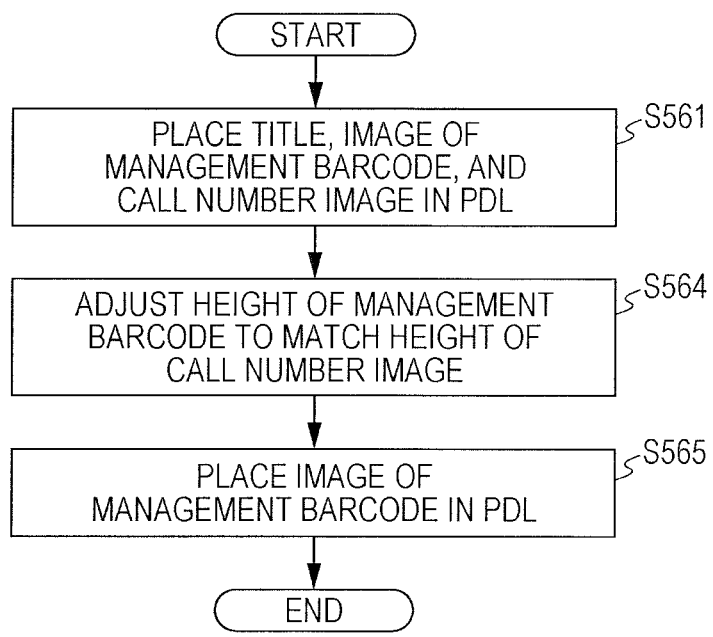
Figure 31:
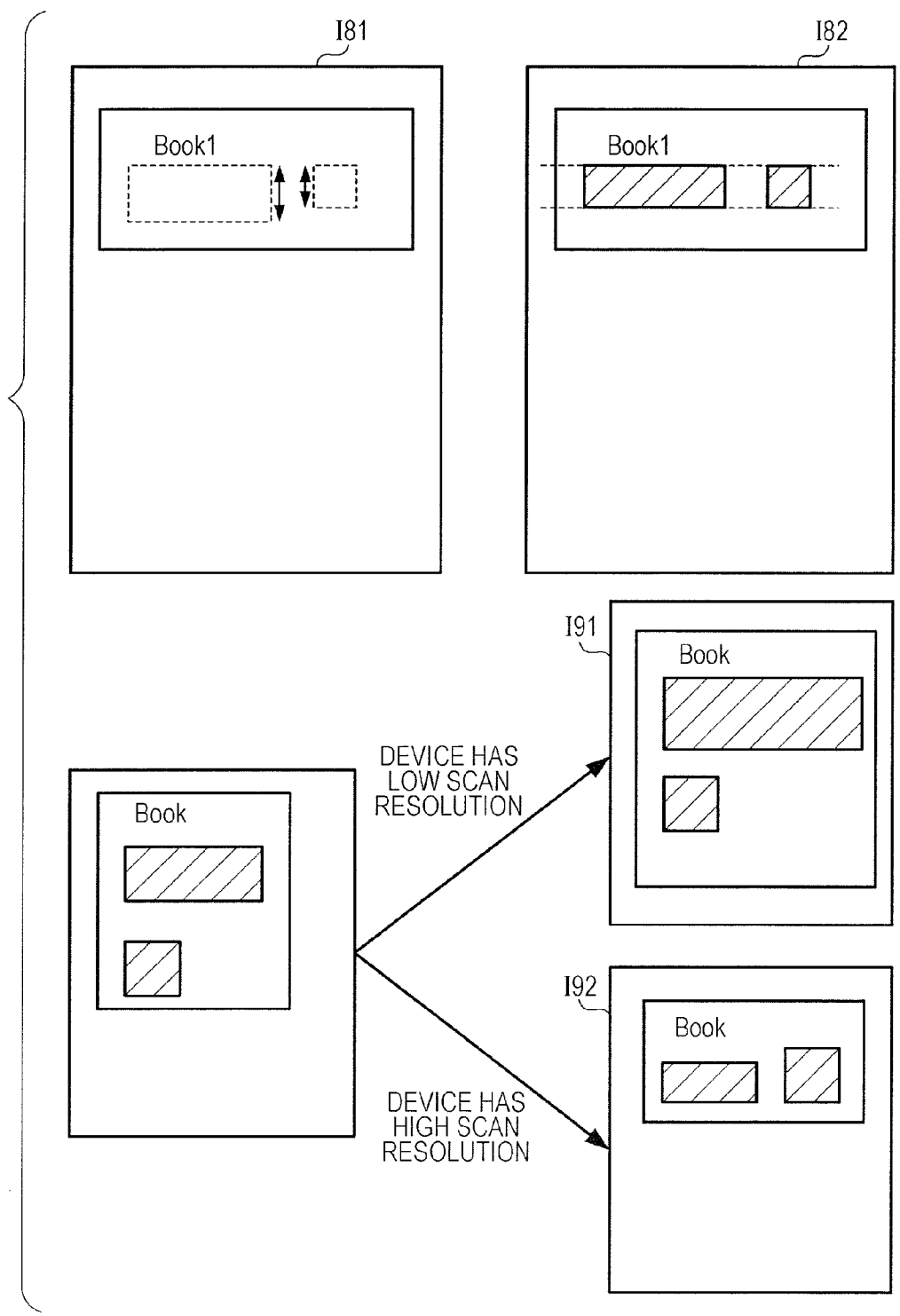
FIG. 31 is a diagram illustrating an example of an image formed on a medium by an image processing device.

FIG. 20C is a flowchart illustrating another example of an image forming data generation process. The controller 101 conducts the operation in step S561 (placing an image group in PDL), and places the management barcode label 11 and the call number label 31 arranged in a predetermined first direction, while also matching the length of the management barcode label 11 and the length of the call number label 31 in a second direction perpendicular to the first direction. In this example, the controller 101 makes adjustments so that the height of the management barcode label 11 matches the height of the call number label 31 (step S564). The controller 101 places the height-adjusted management barcode label 11 in the PDL (step S565). In this example operation, the height of the management barcode label 11 and the height of the call number label 31 are matched, as illustrated in the image I82 of FIG. 31.

Figure 20D:
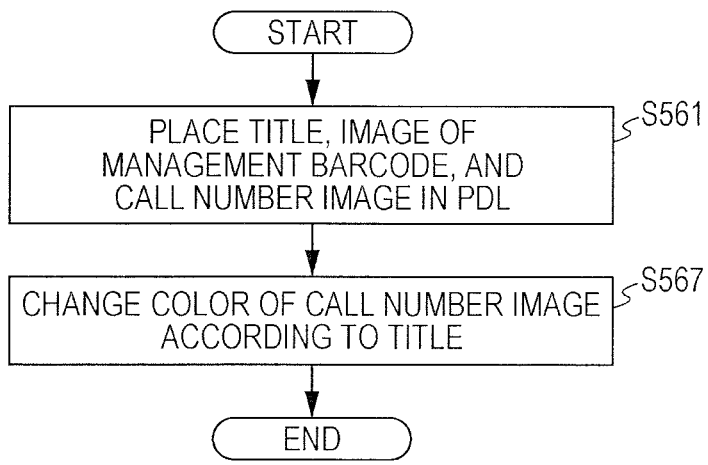

FIG. 20D is a flowchart illustrating another example of an image forming data generation process. In FIG. 20D, the controller 101 conducts the operation in step S561 (placing an image group in PDL), and decides a label color on the basis of the monograph information acquired from the server device 200 (step S567). For example, the controller 101 may use a blue label by default, but use a red label in the case of a restricted monograph. The color to use may be configured by a worker in advance, or the worker may be queried every time.

Figure 32:
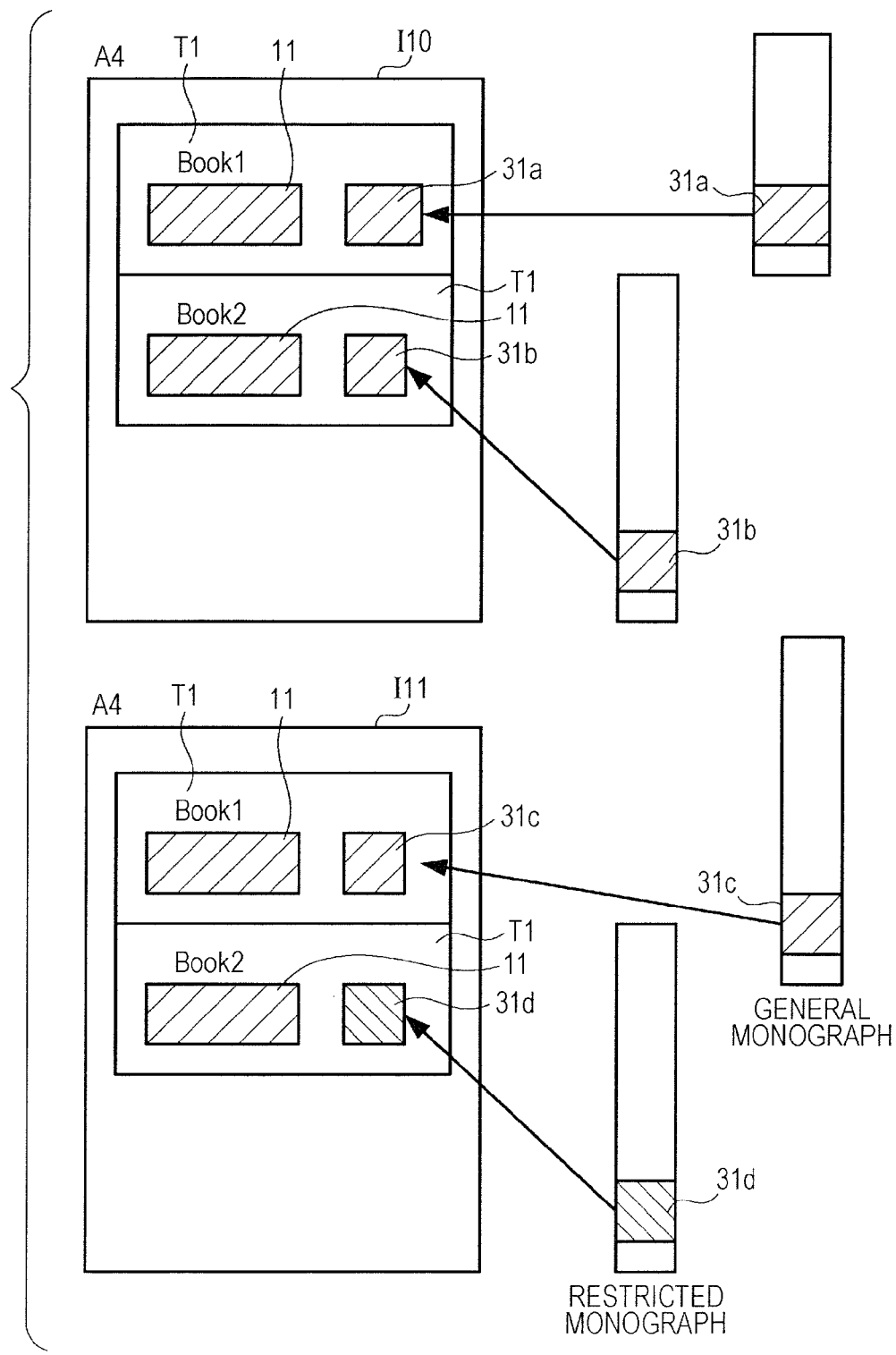
FIG. 32 is a diagram illustrating an example of an image formed on a medium by an image processing device.

Meanwhile, depending on the monograph (for example, general monographs and restricted monographs), it may be desirable to change the label color in some cases, but having a worker manually use different label colors is burdensome. In contrast, in the exemplary embodiment, the image processing device 100 selects the label to use from the monograph information, thereby reducing the manual work by the worker. In this example, differently colored call numbers 31*c* and 31*d* are generated for general monographs and restricted monographs, as illustrated in the image I11 of FIG. 32.

Exemplary Modification 9

Other Methods of Generating Image Forming Data

The method of generating image forming data is not limited to the above-described. Hereinafter, several other generation methods will be described. Note that in the following description, a description of the process of displaying an operating screen for receiving the second operation will be reduced or omitted. Also, the generation methods discussed hereinafter may be used in combination with each other, and may also be used in combination with the generation method discussed earlier.

FIG. 21 is a flowchart illustrating another example of an image forming data generation method conducted by the image processing device 100. This example describes operation in the case of collectively receiving multiple sets of monograph information, a management number, a call number (1), and a call number (3) from the server device 200.

The controller 101 receives (acquires) multiple sets of monograph information, a management number, a call number (1), and a call number (3) from the server device 200 (step S601). The controller 101 selects one set from among the multiple received sets, and conducts the processing in step S602 and thereafter on the selected set. The controller 101 converts the management number included in the received set into an image of a management barcode (an example of a code image) (step S602). In addition, the controller 101 generates a call number image on the basis of the call number (1) and the call number (3) included in the received set (step S603).

Prior to placing an image group in PDL, the controller 101 calculates the size in the case of placing the image group (step S604). This size is taken to be the vertical and horizontal size of a rectangular frame that includes the image group. Note that the rectangular frame may also be placed so as to not touch the image group. The controller 101 calculates whether there is enough blank space to place an image group of the size calculated in step S604 on the current page of the PDL (step S605). A typical rectangle placement algorithm is used for this calculation. The blank space enabling placement of an image group of the calculated size may be oriented vertically or horizontally.

If there is not enough blank space to place an image group of the calculated size (step S605; No), the controller 101 creates a new page in the PDL (step S606). If there is enough blank space to place an image group of the calculated size (step S605; Yes), or if a new page is created, the controller 101 places the image group in the blank space (step S607). The controller 101 judges whether or not an unprocessed set exists among the multiple received sets (step S608). If an unprocessed set exists (step S608; Yes), the controller 101 selects the next monograph set, and repeats the processing in step S602 and thereafter. After all monograph sets are processed, the controller 101 ends the process.

Figure 29:
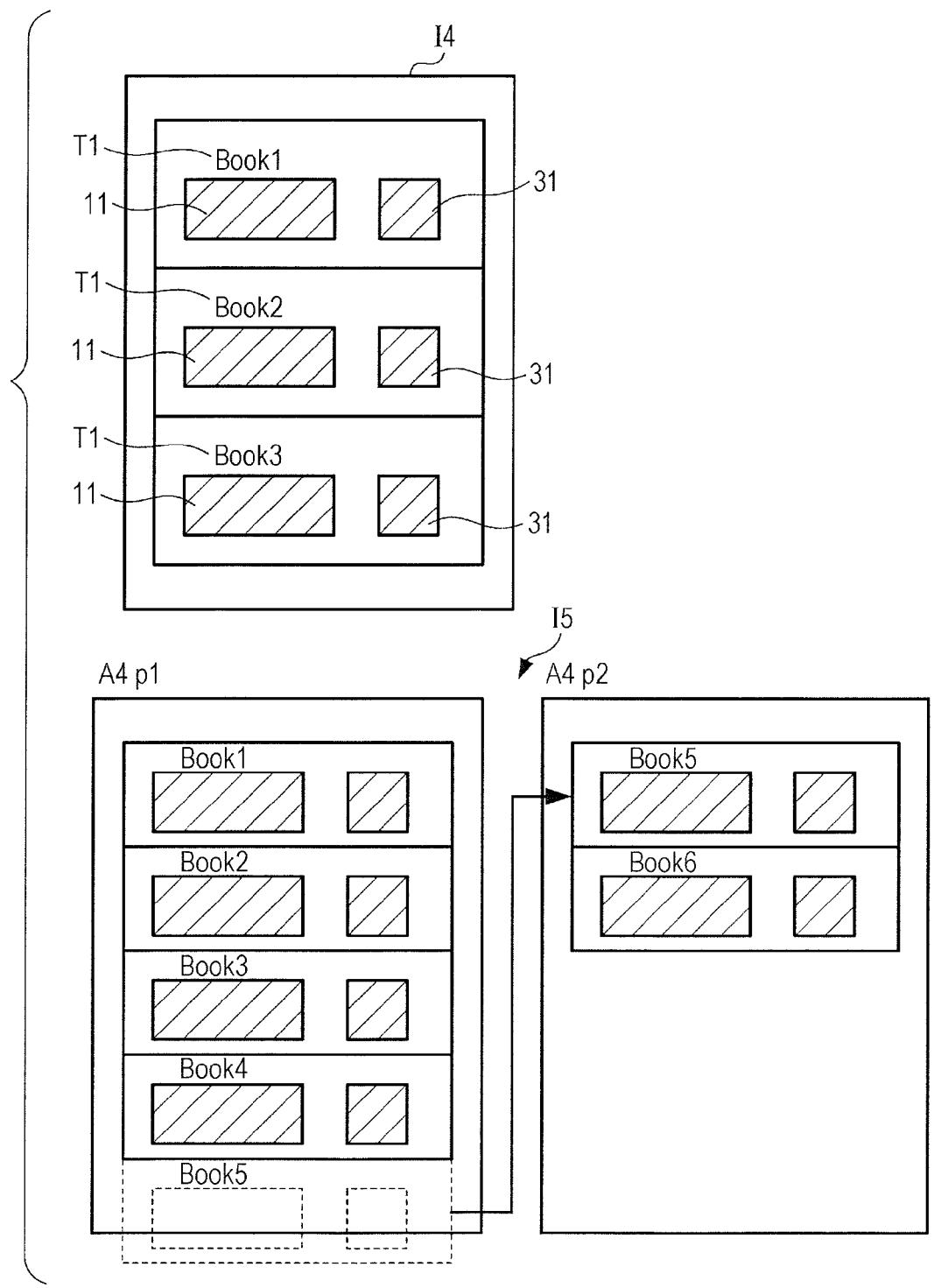
FIG. 29 is a diagram illustrating an example of an image formed on a medium by an image processing device.

The image I4 and the image I5 in FIG. 29 are examples of an image formed on a medium according to this example operation. As illustrated in the image I4, multiple image groups are formed on one sheet of medium. Also, if the multiple image groups do not fit on one sheet of medium, the multiple image groups are formed on multiple sheets of medium, as illustrated in the image I5. At this point, the placement of image groups is decided so that an image group corresponding to one set is not split across multiple pages, but instead positioned at the top of a new page.

Figure 22:
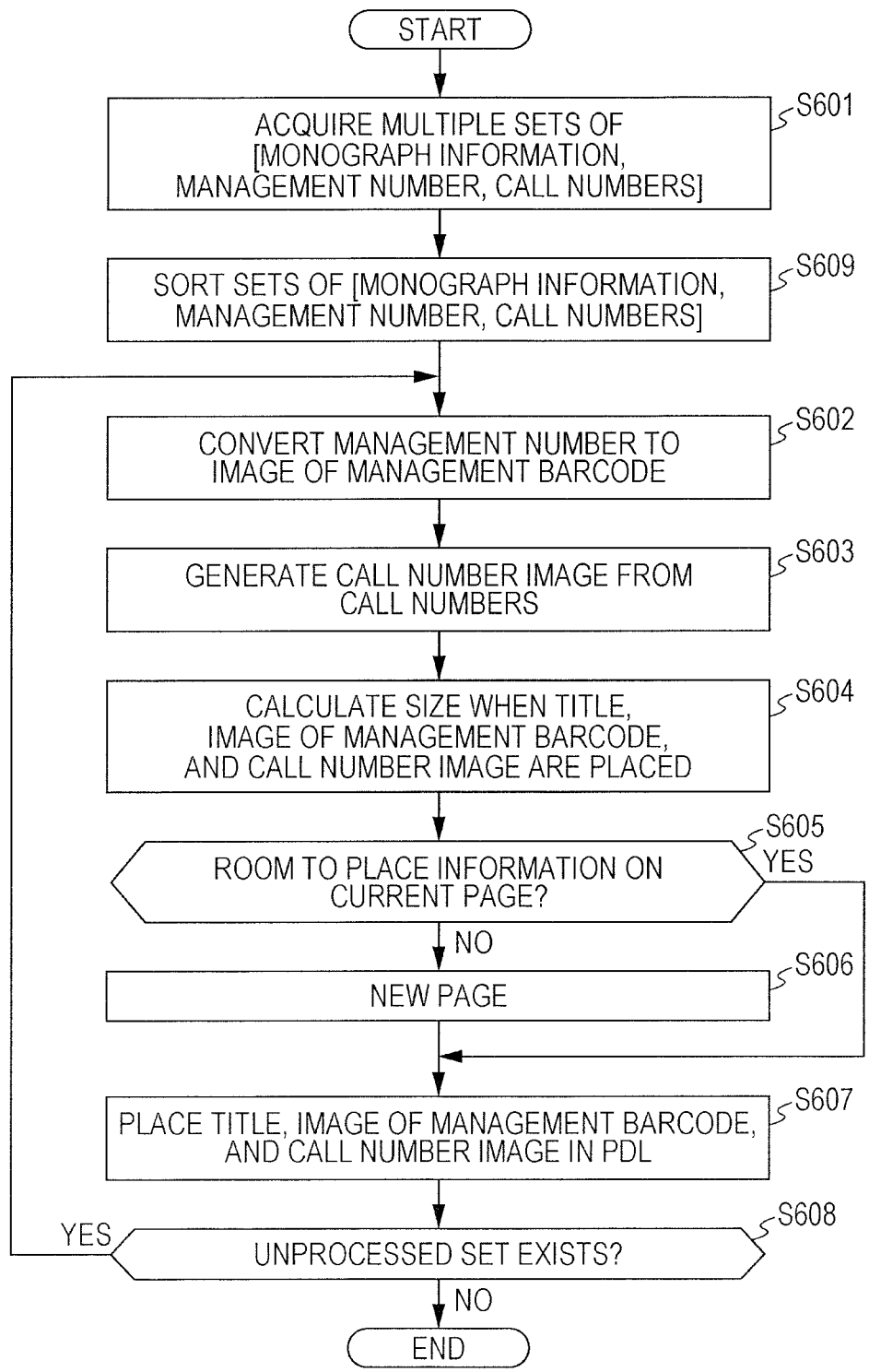
FIG. 22 is a flowchart illustrating operation of an image processing device.

FIG. 22 is a flowchart illustrating another example of an image forming data generation method conducted by the image processing device 100. The flowchart illustrated in FIG. 22 differs from the flowchart illustrated in FIG. 21 in that the processing in step S609 is conducted after the processing in step S601. The controller 101 reorders (sorts) the multiple sets received from the server device 200 on the basis of at least one of the monograph information (for example, the title), the management number, the call number (1), and the call number (3) included in each set (step S609). The sorting method may be ascending or descending, and may also be configured by a worker. The image I6 of FIG. 30 illustrates an example of sorting multiple image groups by title.

Figure 23:
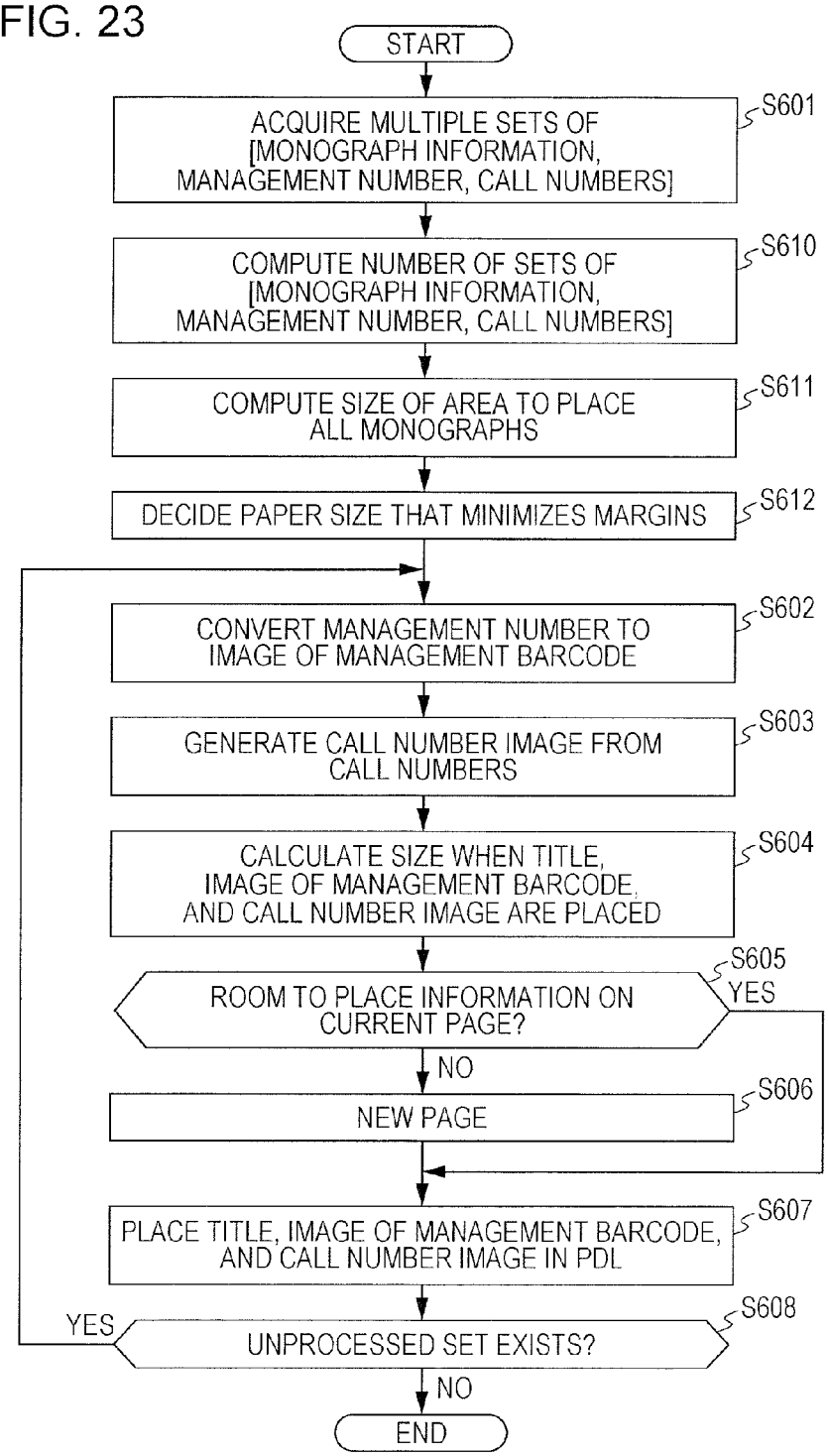
FIG. 23 is a flowchart illustrating operation of an image processing device.

FIG. 23 is a flowchart illustrating another example of an image forming data generation method conducted by the image processing device 100. The flowchart illustrated in FIG. 23 differs from the flowchart illustrated in FIG. 21 in that the processing in steps S610 to S612 is conducted after the processing in step S601. The controller 101 computes the number of the multiple sets received from the server device 200 (step S610). The controller 101 computes the smallest image group size (hereinafter designated the "minimum size") in the case of placing an image group corresponding to the multiple received sets in PDL (step S611). This minimum size is taken to be the vertical and horizontal size of a square frame that includes the image group. Note that the square frame may also be placed so as to not touch the image group.

The controller 101 selects, from among multiple types of media of respectively different sizes, a medium whose relationship with the minimum size computed in step S611 satisfies a predetermined condition. In this example, the controller 101 selects a medium of a size with the smallest margins when forming an image group at the computed minimum size (step S612).

Figure 30:
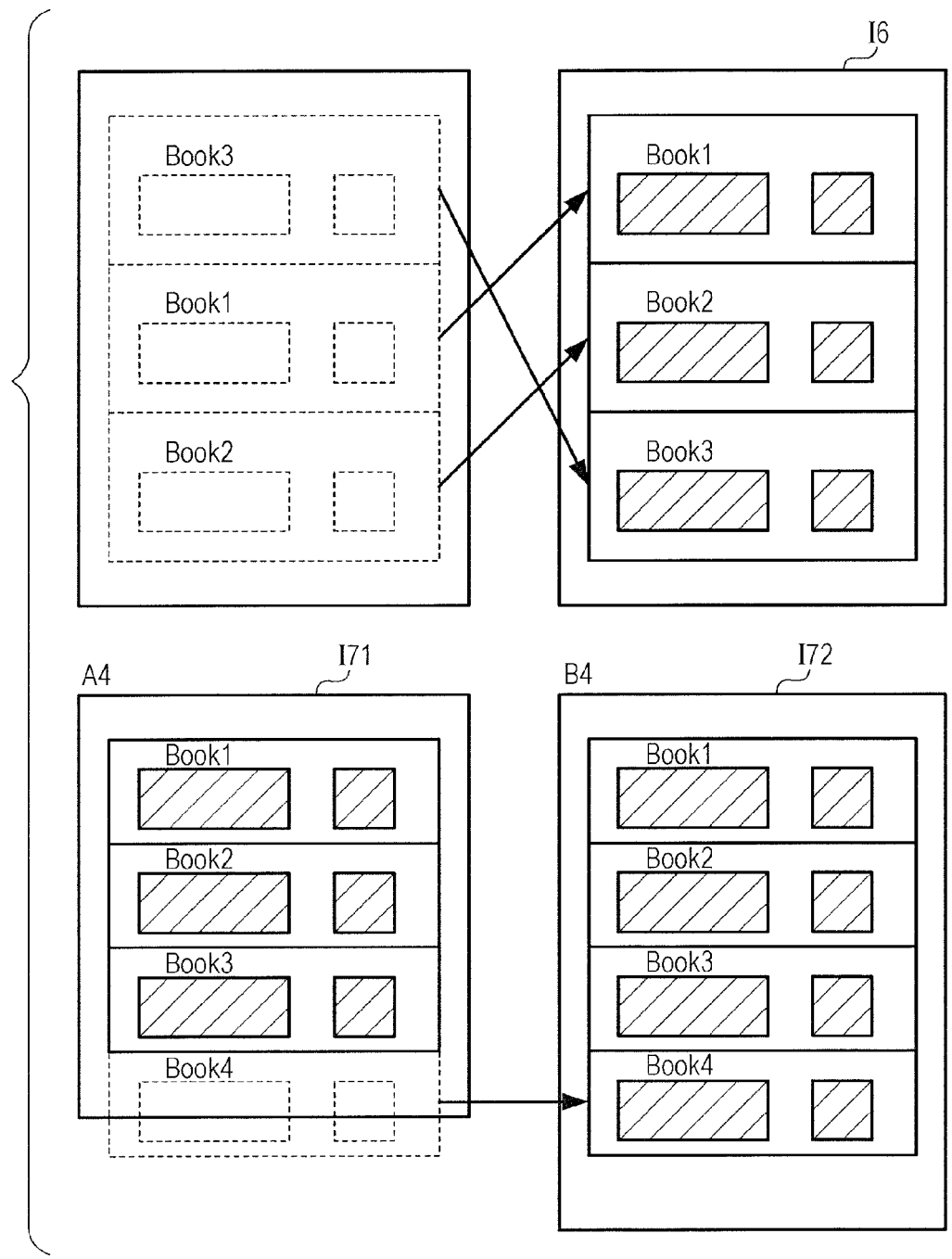
FIG. 30 is a diagram illustrating an example of an image formed on a medium by an image processing device.

In this example operation, when the multiple image groups do not fit on one sheet of A4 medium, the image groups are formed on one sheet of B4 medium rather than being formed on two sheets of A4 medium, as illustrated in the images I71 and I72 of FIG. 30. In this case, there is less blank space than the case of using two A4 sheets. Note that the controller 101 may also select the A4 size if the smallest sheet size becomes a size greater than A3 size. This is because A3 is the largest sheet size of medium used by typical image processing devices installed in offices.

Figure 24:
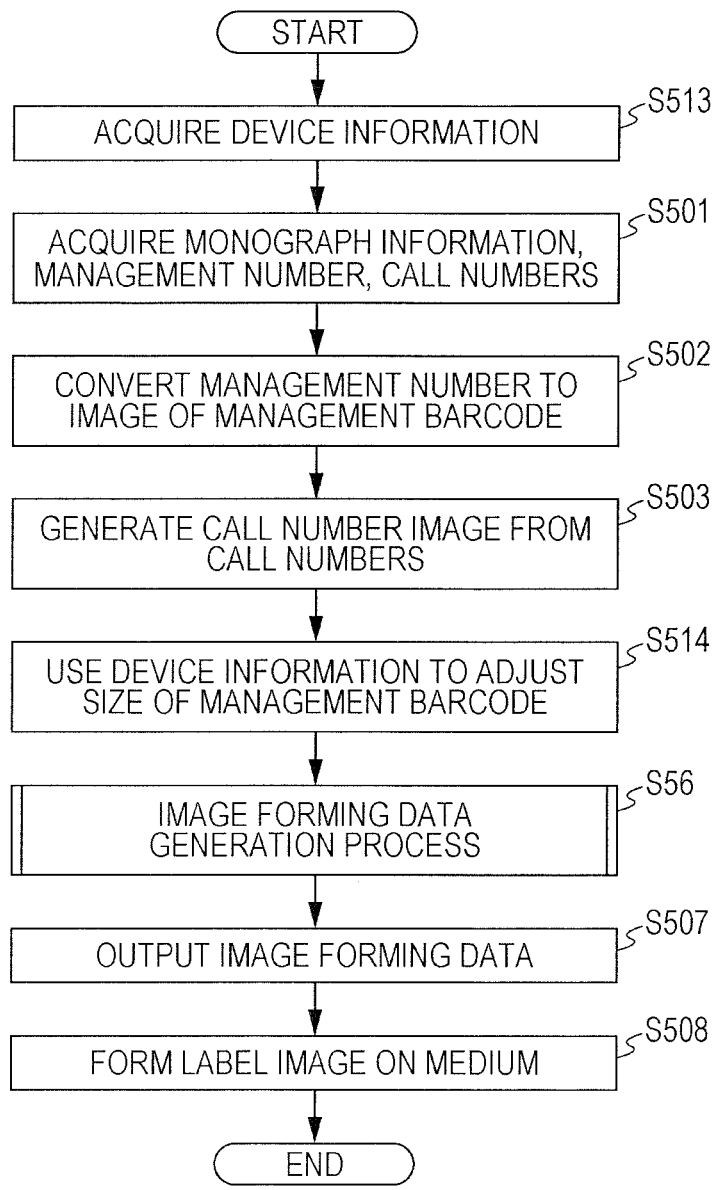
FIG. 24 is a flowchart illustrating operation of an image processing device.

FIG. 24 is a flowchart illustrating another example of an image forming data generation method conducted by the image processing device 100. The controller 101 acquires information related to the performance of at least one of the image forming function and the image reading function of the local device. In this example, the controller 101 acquires device information about the device that forms an image of the management barcode label 11 on a medium, and the device that reads the management barcode label 11 (step S513). When placing an image group in PDL (before the image forming data generation process of step S56), the controller 101 uses the device information acquired in step S513 to adjust the size of the barcode (step S514).

For example, in the case of using a device that forms images at 100 dpi, if the barcode is too small, correctly distinguishing between thin bars and thick bars in the formed image may be difficult. In this case, the controller 101 enlarges the size of the management barcode label 11 for placement in PDL. Also, if the reading device has a low resolution, the size of the management barcode label 11 is likewise enlarged for placement (see image I91 of FIG. 31). On the other hand, if the reading device supports 600 dpi and the image forming device is also able to output at 600 dpi, the barcode may be smaller, and thus in order to effectively utilize the PDL area, the size of the management barcode label 11 is reduced (see image I92 of FIG. 31).

Figure 25:
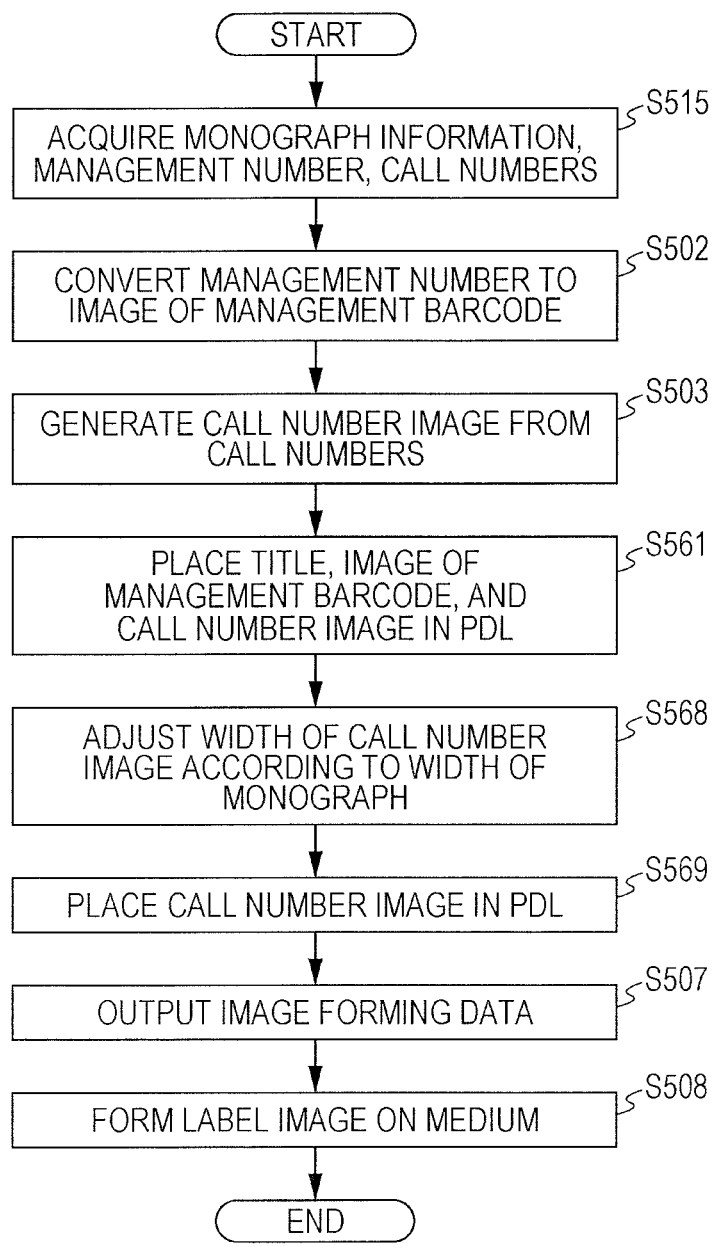
FIG. 25 is a flowchart illustrating operation of an image processing device.

FIG. 25 is a flowchart illustrating another example of an image forming data generation method. The controller 101 acquires, from the server device 200, monograph information (an example of attribute information) including at least the title of the monograph and thickness information indicating the thickness of the monograph), a management number, a call number (1), and a call number (3) (step S515). In addition, after the operation in step S561 (placing an image group in PDL), the controller 101 adjusts the width of the label generated in step S503 according to the thickness information (step S568). Note that although the controller 101 decides the label width according to thickness information acquired from the server device 200 in this example operation, the method of deciding the label width is not limited to the above. For example, if the information acquired from the server device 200 includes information indicating the number of pages in the monograph, a label width may be decided on the basis of such information. The controller 101 places a label of the decided width in the PDL (step S569). Steps S561, S568, and S569 are processes included in the image forming data generation process of step S56.

Meanwhile, the label affixed to the spine of a monograph is in general approximately 17 mm×26 mm in size, but some monographs may be slightly narrower than the label, for example, and the worker may have difficulty affixing the label in some cases. In contrast, in this example operation, by adjusting the label to be a size that is easily affixed according to the thickness of a monograph, the worker may easily perform the working of affixing a label. Note that the "size that is easily affixed" herein refers to an approximate size at which some of the left and right sides of the label wraps around to the front cover and the back cover, for example. On the other hand, if the adjusted label is too narrow or too wide, the label actually becomes more difficult to affix, and thus for a monograph having a thinness or a thickness exceeding a certain threshold, the controller 101 is configured to not adjust the label from the original size. In this example, call number labels 31a and 31b are created with different widths according to the thickness of the monograph, as illustrated in the image I10 of FIG. 32.

Figure 26:
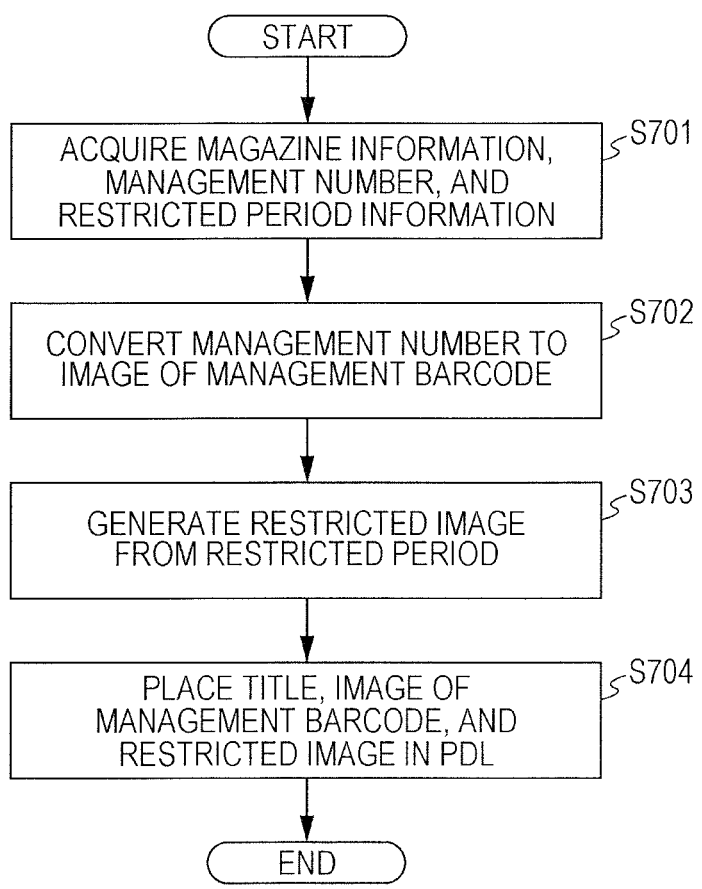
FIG. 26 is a flowchart illustrating operation of an image processing device.

FIG. 26 is a flowchart illustrating the flow of a process of creating the management barcode label 11 and the restricted label 12 (the process in step S314 of FIG. 11) conducted by the image processing device 100. The controller 101 receives a set of magazine information including the title of the magazine, a management number, and a restricted period (an example of restricted period information) from the server device 200 (step S701). The controller 101 converts the received management number into an image of a management barcode (step S702). The controller 101 generates a restricted image from the restricted period (step S703). The controller 101 forms an image expressing the title included in the magazine information, an image of the management barcode, and the restricted image on one sheet of medium (step S704).

Figure 33:
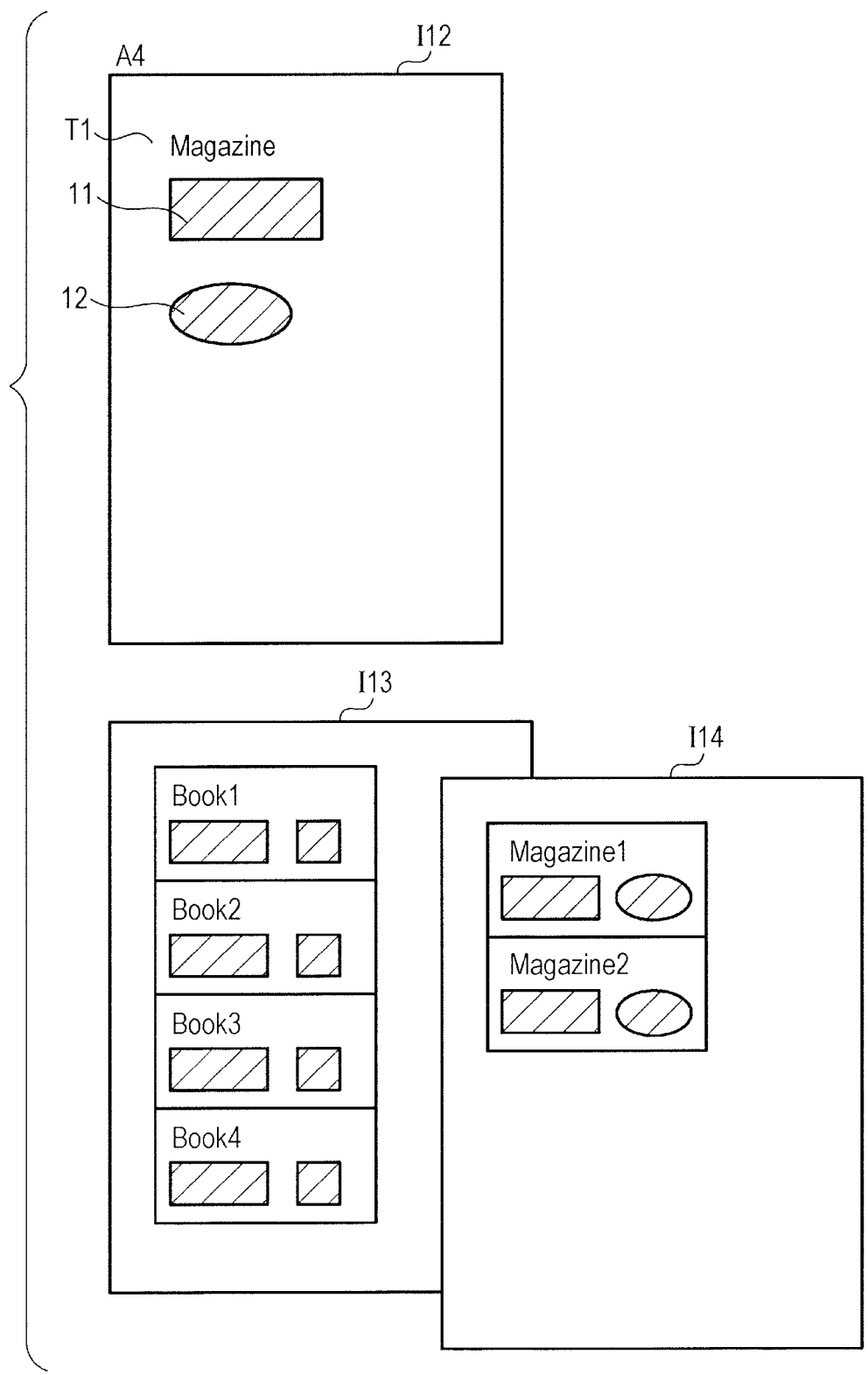
FIG. 33 is a diagram illustrating an example of an image formed on a medium by an image processing device.

The image I12 in FIG. 33 is an example of an image formed on a medium in step S704. In this example, the title T1 of a magazine, the management barcode label 11, and the restricted label 12 are formed on a single sheet of A4-sized medium.

Figure 27:
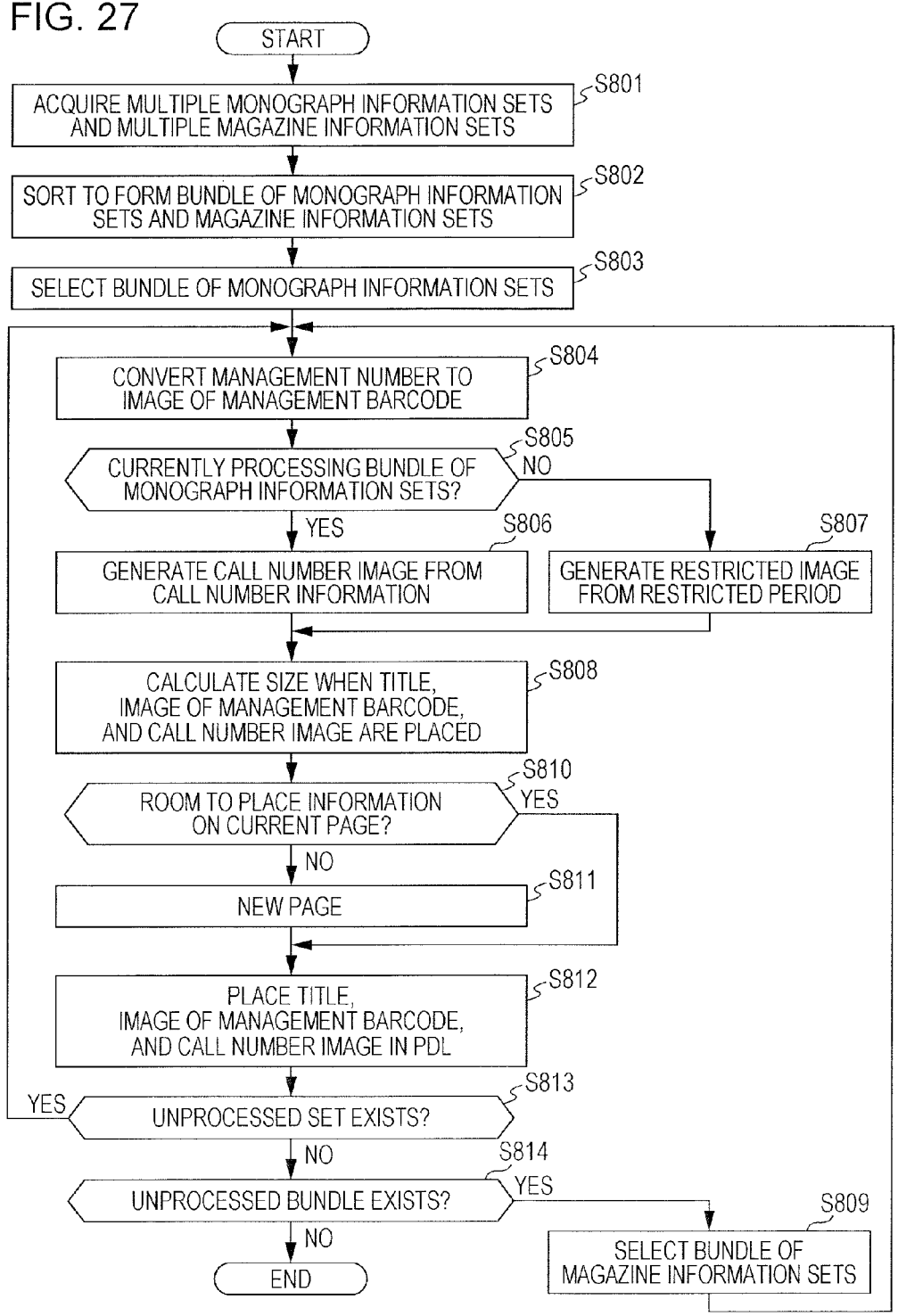
FIG. 27 is a flowchart illustrating operation of an image processing device.

FIG. 27 is a flowchart illustrating the flow of a process of creating the management barcode label 11, the call number label 31, and the restricted label 12 conducted by the image processing device 100. This example describes operation for the case of collectively processing multiple sets of monograph information including the title of a monograph, a management number, a call number (1) and a call number (3) (hereinafter designated a "monograph information set"), and multiple sets of magazine information including the title of a magazine, a management number, and a restricted period (hereinafter designated a "magazine information set"). The controller 101 receives multiple monograph information sets and multiple magazine information sets from the server device 200 (step S801). The controller 101 sorts the received multiple monograph information sets and multiple magazine information sets so that the monograph information sets and the magazine information sets are separated. For example, in the case of receiving sets in the order of "Monograph 1", "Monograph 2", "Magazine 1", "Magazine 2", "Monograph 3", the controller 101 may sort the sets into the order of "Monograph 1", "Monograph 2", "Monograph 3", "Magazine 1", "Magazine 2".

The controller 101 selects one monograph information set from among the sorted group of monograph information sets (step S803). For example, the controller 101 may select the monograph information sets one at a time in ascending order. The controller 101 converts the management number included in the selected monograph information set into an image of a management barcode (step S804). In addition, the controller 101 generates a call number image on the basis of the call number (1) and the call number (3) included in the selected monograph information set (step S806). Note that if the set being processed is a magazine information set rather than a monograph information set (step S805; No), the controller 101 generates a restricted image from the restricted period (step S807).

Subsequently, the controller 101 calculates the size in the case of placing the image group corresponding to the set currently being processed in PDL (step S808). Note that the size referred to herein is the vertical and horizontal size of a rectangular frame enclosing the image group. The controller 101 determines whether or not there is enough blank space to place the calculated size in the PDL (step S810). If there is not enough blank space for the calculated size (step S810; No), the controller 101 creates a new page in the PDL (step S811). If there is enough blank space to place an image group of the calculated size (step S810; Yes), or if a new page is created, the controller 101 places the image group in the blank space (step S812).

If an unprocessed monograph information set exists, the controller 101 selects one from among the remaining monograph information sets, returns to the processing in step S804, and repeats the process of generating an image of the management barcode and the processing thereafter. Meanwhile, after the group of monograph information sets is processed (step S814; Yes), the controller 101 starts processing the magazine information sets (step S809).

Meanwhile, in the case of collectively processing multiple monograph information sets and multiple magazine information sets, the worker is able to perform work easily if image groups such as images of management barcodes are output separately, collected into a monograph group and a magazine group. On the other hand, separately picking out monographs and magazines in advance for input into the image processing device 100 is tedious. In contrast, in the exemplary embodiment, the image processing device 100 places image groups separately, collected into a monograph group and a magazine group, thereby making work easier for the worker. In this example, monograph image groups and magazine groups are formed on separate sheets of medium, as illustrated in the image I13 and the image I14 of FIG. 33.

Exemplary Modification 10

Process when Borrowing

Next, the processing in step S107 (FIG. 10) when borrowing a book will be described with reference to FIG. 34. The controller 210 of the server device 200 decodes the one or multiple barcodes included in the scan image data, and acquires one or multiple instances of information. The controller 210 judges whether or not a character string indicating a user ID is included among this information (step S200). If a user ID is obtained (step S200; Yes), the controller 210 cross-references the obtained user ID against user IDs included in the user DB stored in the storage 220, and judges whether or not there is a valid user (step S201). If there is a valid user (step S201; Yes), the controller 210 judges whether or not a character string indicating a management number is included in the above information (step S202). In a management number is obtained (step S202; Yes), the controller 210 references the management number and judges whether or not the corresponding book is a monograph (step S203). In the case of a monograph (step S203; Yes), the controller 210 reads out from the monograph DB 221 (step S204), and updates the borrow flag, the user ID, and the borrow date corresponding to the management number with borrowing details (step S205).

On the other hand, if the controller 210 references the management number and judges that the corresponding book is a magazine (step S203; No and step S206; Yes), the controller 210 reads out from the magazine DB 222 (step S207), and if the restricted period has elapsed (step S208; Yes), updates the borrow flag, the user ID, and the borrow date corresponding to the management number with borrowing details (step S209). Note that if a user ID or a management number is not obtained (step S201; No or step S202; No), or if the restricted period has not elapsed (step S208; No), the controller 210 judges that book borrowing is unavailable, and instructs the image processing device 100 to display an error (step S210). In other words, the judgment in step S201, step S202, and step S208 corresponds to a judgment of whether or not the requested process of borrowing a book is available.

When returning a monograph or a magazine, it is sufficient to follow a procedure similar to when borrowing, and update the borrow flag, the user ID, and the borrow date corresponding to the management number with details according to the return. Also, in the case of removing a book from the database, the controller 210 of the server device 200 decodes the one or multiple barcodes included in the scan image data, and acquires one or multiple instances of information. The controller 210 judges whether or not a character string indicating a management number is included among this information. When a management number is obtained, the controller 210 references the management number, and removes the information corresponding to the above management number from the monograph DB 221 in the case of a monograph, or removes the information corresponding to the above management number from the magazine DB 222 in the case of a magazine.

Figure 34:
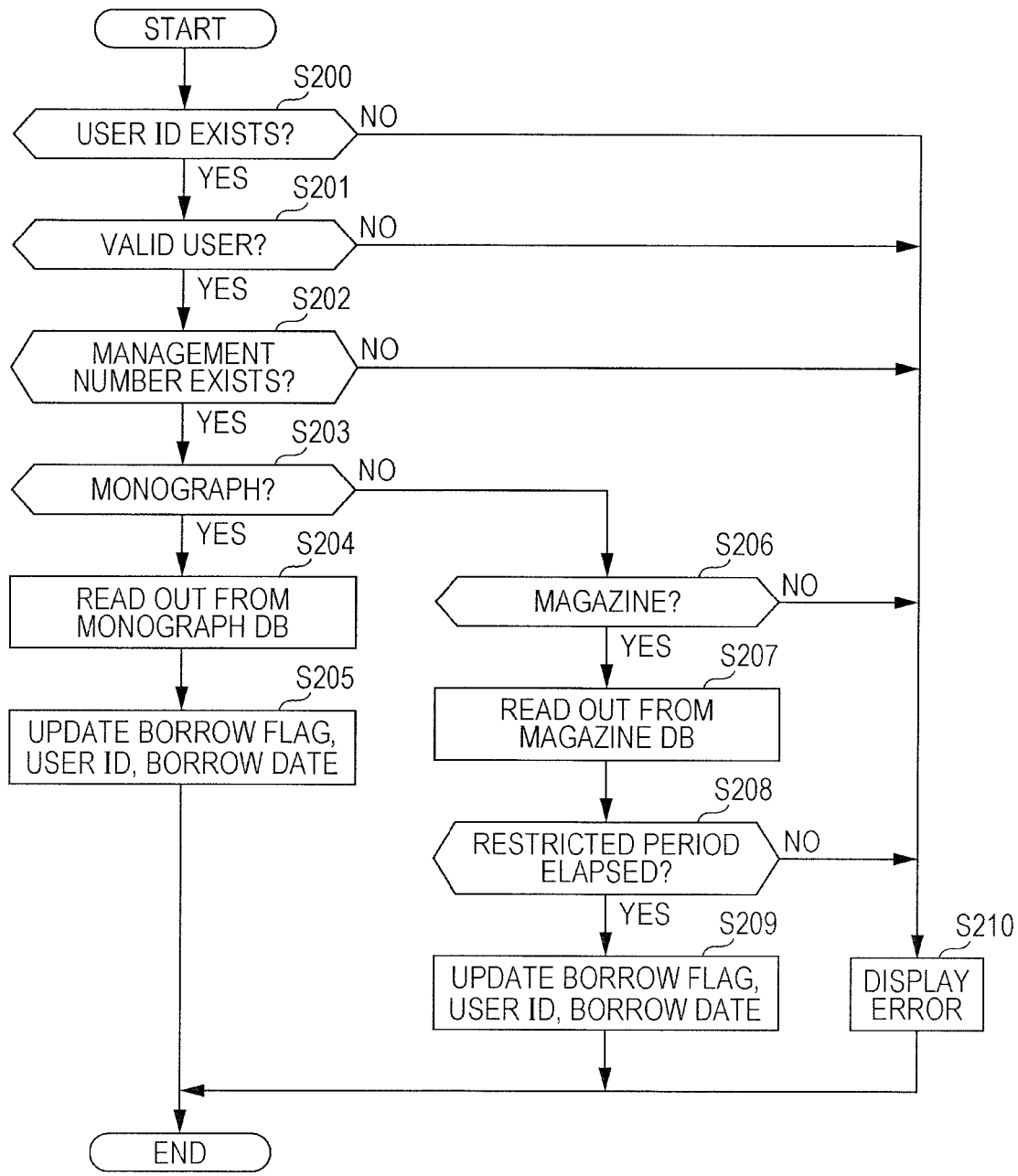
FIG. 34 is a flowchart illustrating operation of a server device during book borrowing.

Note that in the example of FIG. 34, authentication based on the user ID is conducted after the user selects the desired process (borrow or return). However, another acceptable procedure is to conduct user authentication first, and after that, select a desired process. In addition, although the above describes conducting authentication using the medium of a user card, this is merely one example, and authentication may also be conducted by having the user manually input a user ID and password, or by using bio-information such as the user's face. In this way, any authentication method may be used insofar as a judgment of whether or not a user is valid may be obtained. Also, the authentication used in an ordinary image processing device acting as an MFD may also be used as the authentication for library management such as "Borrow book" and "Return book". In addition, user authentication may also be realized with a technique such as an IC card or biometric authentication.

Exemplary Modification 11

Other Functions of Server Device

Figure 35:
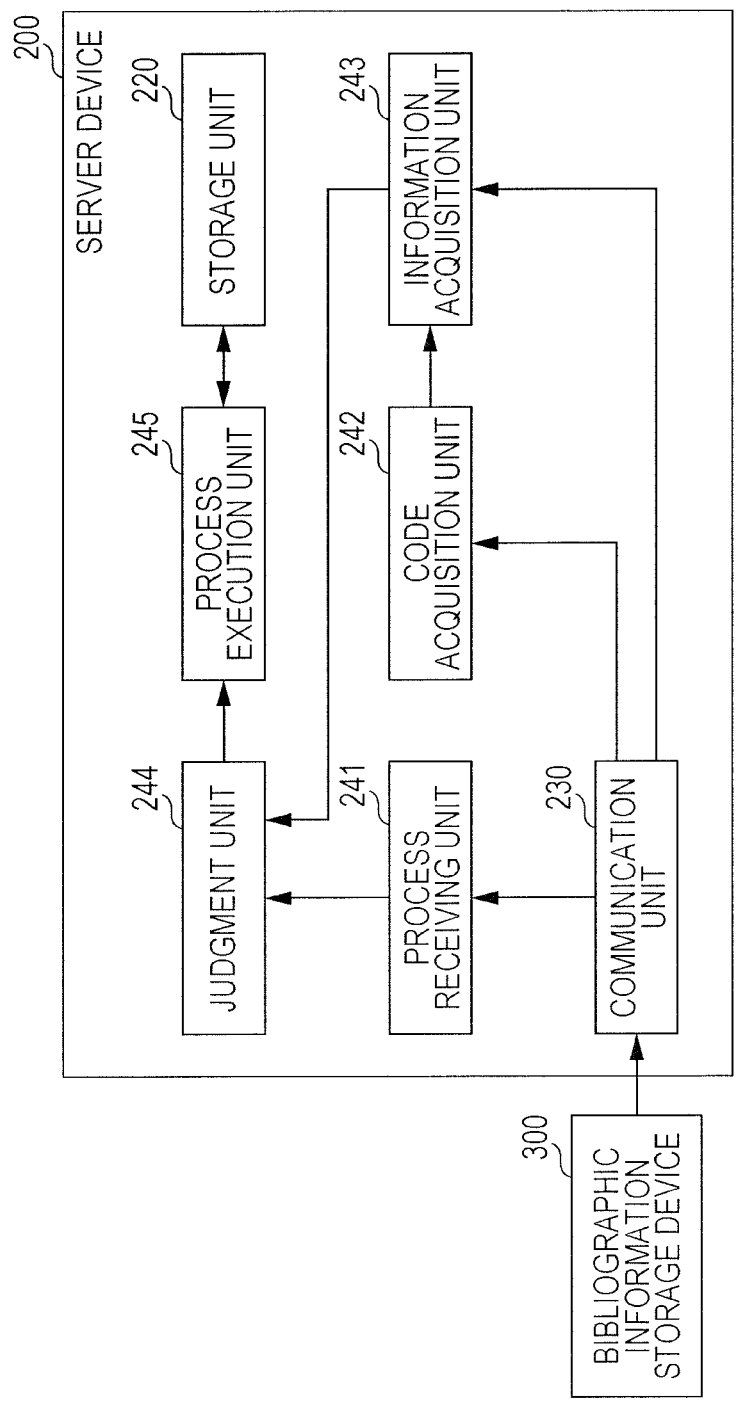
FIG. 35 is a diagram illustrating a functional configuration of a server device.

The server device 200 may also include a different functional configuration from the exemplary embodiment. FIG. 35 is a diagram illustrating a functional configuration of a server device 200 according to the present exemplary modification. The server device 200 is equipped with the functions of a process receiving unit 241 that receives a process request related to book management, a code acquisition unit 242 that acquires codes attached to a book, an information acquisition unit 243 that acquires information specified by the multiple acquired codes, a judgment unit 244 that judges whether or not a code corresponding to the process exists among the multiple acquired codes, a process execution unit 245 that, if a code corresponding to the process is judged to exist, executes the process on the basis of the code (that is, the information specified by the code), and storage 220.

The processes related to book management include at least one of a process that registers/deletes a book in a database inside the server device 200, a process that updates a database for borrowing books, and a process that updates a database for returning borrowed books. For the case of the process of registering a book in the database, for example, the process execution unit 245 includes a unit that registers acquired information in the storage 220, a unit that generates a code to apply to the book on the basis of the registered information, and a unit that uses the image forming unit 103 to form the generated code on a medium.

The process receiving unit 241, the code acquisition unit 242, the information acquisition unit 243, the judgment unit 244, and the process execution unit 245 are realized by software processing of the controller 210. Also, a code applied to a book includes not only a code printed on a book or a code affixed to a book, but also a code attached to a book in a removable way. Note that a code refers to a system of signs or codes for expressing information, and in the present exemplary embodiment includes not only various types of barcodes and QR codes (registered trademark), but also call numbers.

Figure 36:
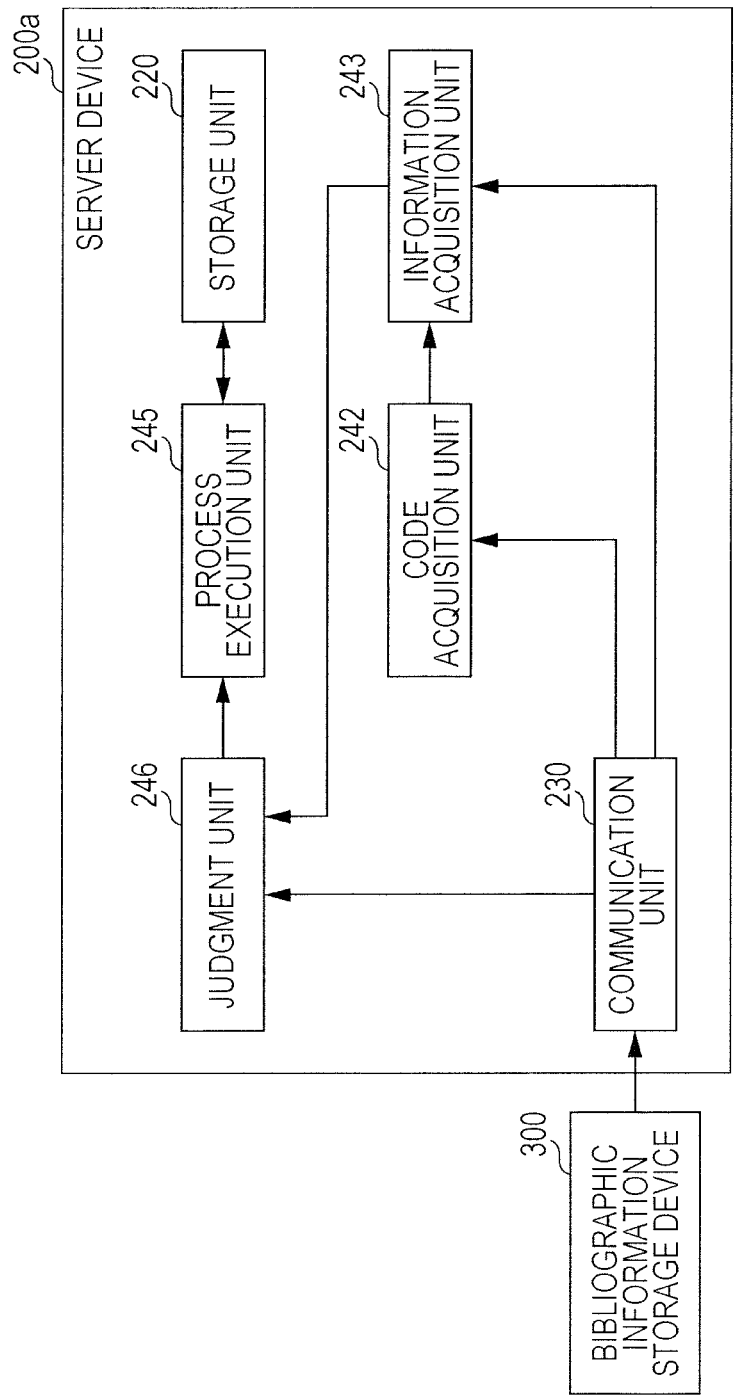
FIG. 36 is a diagram illustrating a functional configuration of a server device.

FIG. 36 is a diagram illustrating a functional configuration of a server device 200a according to the present exemplary modification. The server device 200a is equipped with the functions of a code acquisition unit 242 that acquires multiple codes attached to a book, an information acquisition unit 243 that acquires information specified by the multiple acquired codes, a judgment unit 246 that judges whether or not a code corresponding to a process related to book management exists among the acquired codes, a process execution unit 245 that, if the code is judged to exist, executes a process corresponding to the code, and storage 220. The code acquisition unit 242, the information acquisition unit 243, the judgment unit 246, and the process execution unit 245 are realized by software processing of the controller 210.

Figure 37:
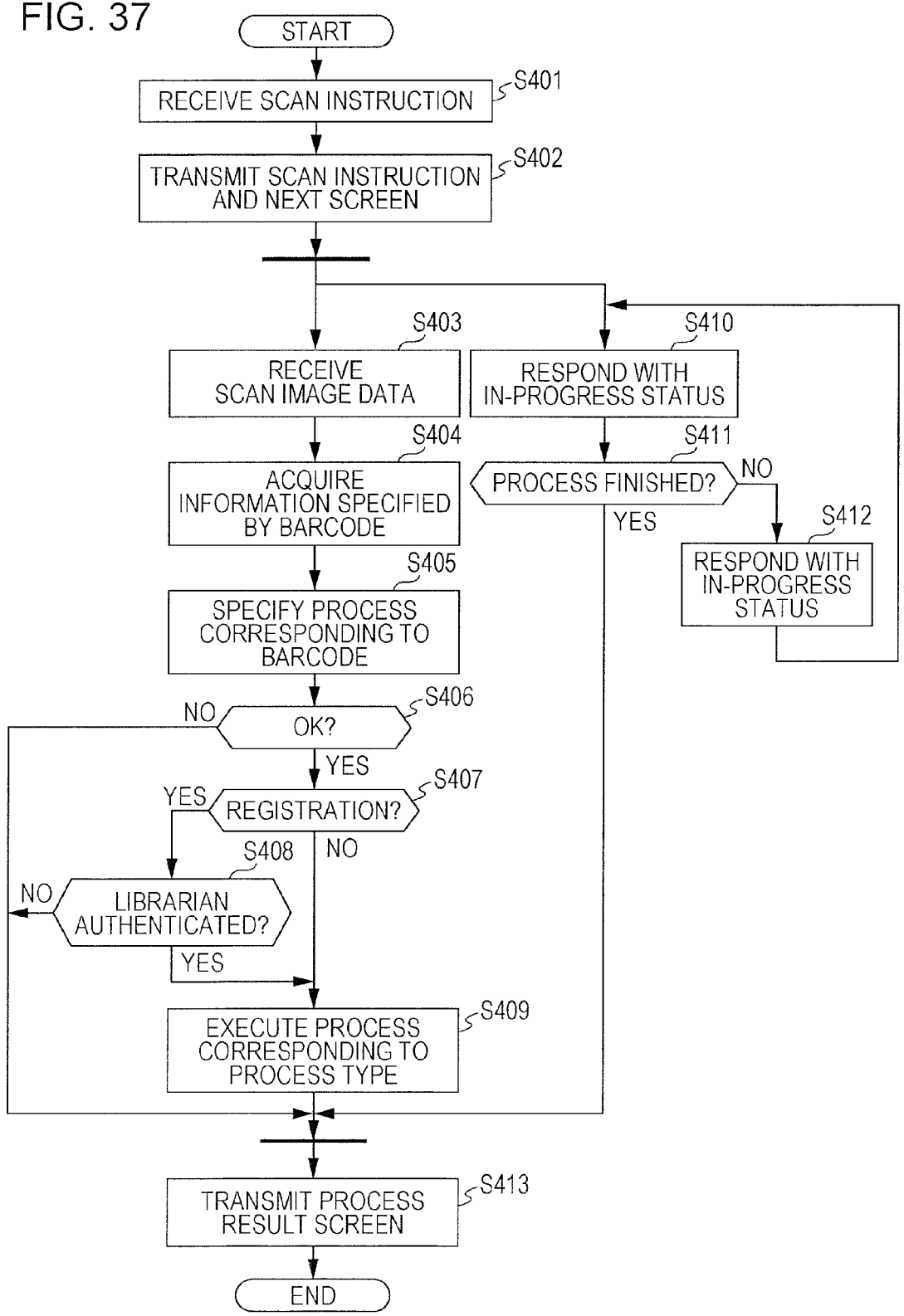
FIG. 37 is a flowchart illustrating operation of a server device.

FIG. 37 is a flowchart illustrating operations of the server device 200a. In the case of registering a book, the back cover 2 on which is printed the publication specification information barcode label 21 of the book is set in the image reading unit 104 of the image processing device 100, relevant information is additionally input into an input field provided on the registration screen G3, and a software button stating "OK" (hereinafter designated the OK button) is selected. Also, in the case of borrowing or returning a book, the user sets, on the image reading unit 104 of the image processing device 100, the front cover 1 of the book to which is affixed the management barcode label 11, and selects the OK button on the borrow process screen G5 or the return process screen G6. The identifier of the OK button and the value information are transmitted to an associated URL given by a form tag in HTML on these screens. The controller 201 of the server device 200a receives the information, and thereby receives a scan instruction (step S401).

The controller 210 of the server device 200a transmits a scan instruction and next-screen specification information to the image processing device 100 (step S402). The scan instruction includes scanning parameters and a URL indicating the transmission destination of the scan image data. The next-screen specification information is path information such as a URL signifying the storage location of image data. The controller 101 of the image processing device 100, following the received scan instruction, reads an image with the image reading unit 104, and generates image data in accordance with the parameters specified from the server device 200a. The controller 101 transmits the generated image data to the specified transmission destination. Where appropriate, the controller 101 attaches not only the scan parameters but also meta-information (such as authenticated user information and the address of the image processing device) to the scan image data.

The controller 210 of the server device 200a receives the scan image data transmitted from the image processing device 100 (step S403). Subsequently, the controller 210 acquires the information specified by the barcode included in the scan image data (step S404). If the scan image data includes multiple barcodes, the controller 210 acquires the multiple instances of respectively corresponding information. Subsequently, the controller 210 uses the acquired information to specify the process to be executed (step S405). Specifically, when an ISBN or ISSN is acquired, the controller 210 specifies a process of registering a book. Also, when the management number of a book is acquired, the controller 210 specifies a process of borrowing or returning a book.

The method of distinguishing between borrowing and returning may involve referencing the borrow flag in the monograph DB 221 or the magazine DB 222, and specifying a borrow process if the book is not currently being borrowed, or specifying a return process if the book is currently being borrowed. In addition, different positions at which to set the front cover of a book on the image processing device 100 may be decided for borrowing and returning, so that borrowing and returning may be distinguished on the basis of the position. In addition, different orientations in which to set the front cover or barcode may be decided for borrowing and returning, so that borrowing and returning may be distinguished on the basis of the orientation. In addition, different positional relationships between the front cover of the book and the user card may be decided for borrowing and returning, so that borrowing and returning may be distinguished on the basis of the positional relationship. Also, when both of an ISBN or ISSN and a management number of a book are acquired, the book may be judged to be already registered, and a process or borrowing or returning the book may be specified.

If a process is specified (step S406; Yes), and the process is the registration of a book (step S407; Yes), on the condition that librarian authentication has been completed (step S408; Yes), the controller 210 executes a registration process (step S409). Meanwhile, if the process is other than the registration of a book (step S407; No), the controller 210 executes that process (step S409). Note that during steps S403 to S409, the controller 101 of the image processing device 100 specifies the URL specified by the next-screen specification information, and requests a status display screen from the server device 200a. If the process of step S409 is not completed (step S411; No), the controller 210 of the server device 200a transmits in-progress screen data (the in-progress screen G4 of FIG. 12) to the image processing device 100 (steps S410, S412). On the other hand, if the processing in step S409 has finished normally (step S411; Yes), the controller 210 transmits normal finish screen data (the processing result screens G7 and G8 in FIG. 13, or the processing result screen G9 in FIG. 14) to the image processing device 100, whereas if the processing in step S409 finished on an error, the controller 210 transmits an error screen (the processing result screens G10, G11, and G12 in FIG. 14) to the image processing device 100 (step S413).

Exemplary Modification 12

Other Functions of Image Processing Device (Part 1)

Figure 38:
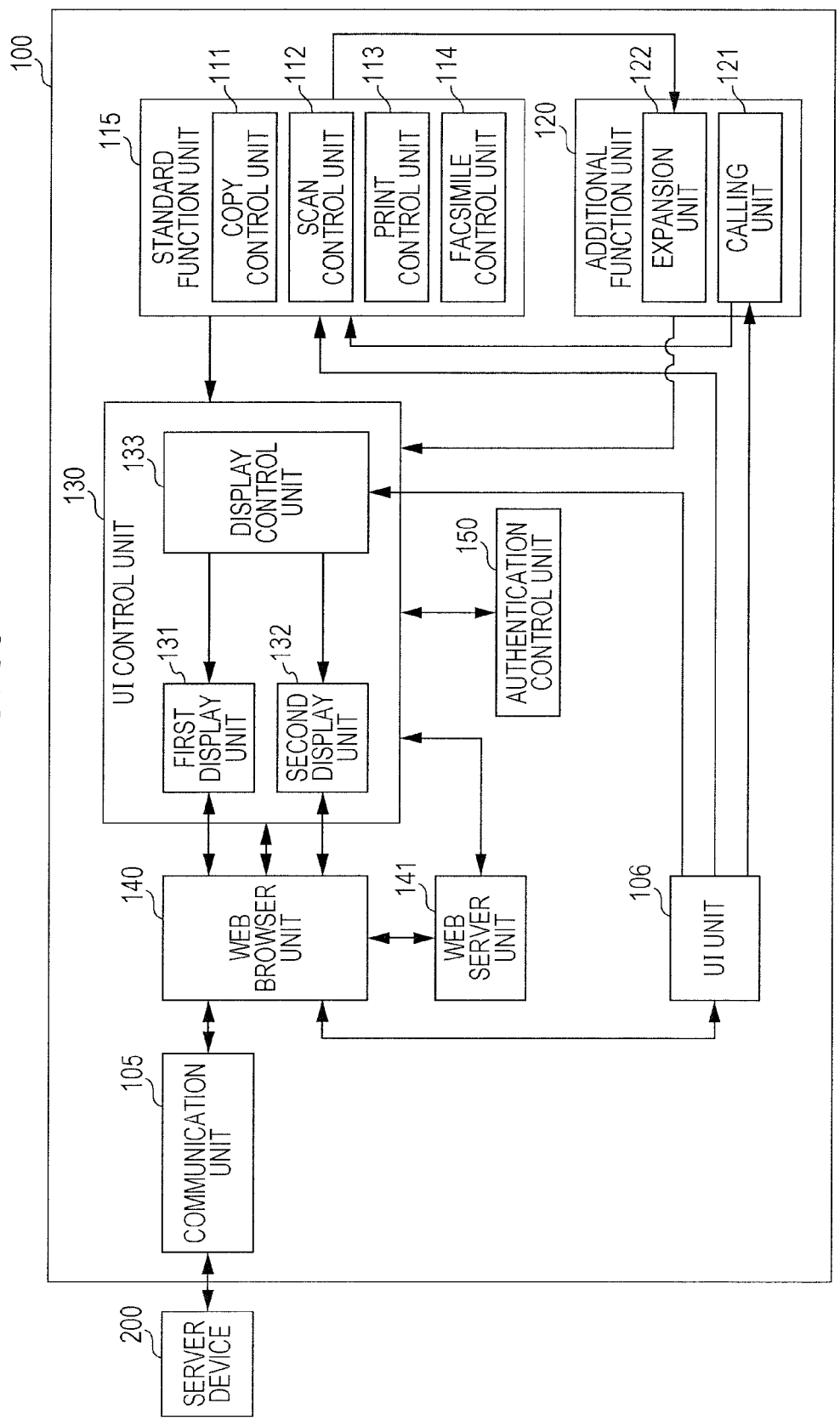
FIG. 38 is a diagram illustrating a functional configuration of an image processing device.

FIG. 38 is a diagram illustrating a functional configuration of an image processing device 100 according to the present exemplary modification. The functions of the image processing device 100 are largely divided into a standard function unit 115, an additional function unit 120, a UI control unit 130, a web browser unit 140, an authentication control unit 150, and a web server unit 141. The standard function unit 115 is realized by a standard function program 102A, while the additional function unit 120, the UI control unit 130, the authentication control unit 150, and the web server unit 141 are realized by an additional application 102B, and the web browser unit 140 is realized by a web browser.

The standard function unit 115 includes a copy control unit 111 that calls a copy function, a scan control unit 112 that calls a scan function, a print control unit 113 that calls a print function, and a facsimile control unit 114 that calls a facsimile function. The copy control unit 111 causes the image reading unit 104 to read an image on a document and generate image data, and additionally causes the image forming unit 103 to form an image on the basis of the generated image data. The scan control unit 112 causes the image reading unit 104 to read an image on a document and generate image data, and additionally causes the storage 102 to store the generated image data.

The print control unit 113 causes the image forming unit 103 to form an image on the basis of image data received from the network 400 by the communication unit 105. The facsimile control unit 114 conducts facsimile transmission and facsimile reception. Facsimile transmission is a process of causing the image reading unit 104 to read an image on a document and generate image data, and transmitting the generated image data via a telephone line of the network 400. Facsimile reception is a processing of causing the image forming unit 103 to form an image on the basis of image data received from a telephone line of the network 400 by the communication unit 105.

The additional function unit 120 includes a calling unit 121 and an expansion unit 122. The calling unit 121 is an example of a unit that calls an additional function of the image processing device 100. As discussed earlier, an additional function is a function related to book management, including a registration function, a borrow function, a return function, and a document duplication function. Of these, the document duplication function is a function that involves calling the copy function which is a standard function, and will be discussed in detail later. The expansion unit 122 is an example of a unit that expands a standard function called in conjunction with an additional function. Herein, the expansion unit 122 is realized by a plugin for the additional application 102B. However, the expansion unit 122 may also be realized by a function of the additional application 102B. The expansion unit 122 may also be a function that is part of the standard function program 102A, which activates a function that is not used and inactive during the standard functions.

The UI control unit 130 administers control related to dialog with the user via the UI unit 106. Specifically, the UI control unit 130 includes a first display unit 131, a second display unit 132, and a display control unit 133. The first display unit 131 is an example of a unit that displays on the UI unit 106 a first menu screen including a menu for calling standard functions. The menu in the present exemplary modification is a menu of items subjected to a selection operation by the user. The second display unit 132 is an example of a unit that displays on the UI unit 106 a second menu screen including a menu for calling additional functions.

The calling unit 121 discussed above operates (activates) when a menu item on the second menu screen is selected, for example, and calls an additional function corresponding to the selected menu item. The first display unit 131 and the second display unit 132 supply screen data in Hypertext Markup Language (HTML) to the web browser unit 140, for example, and display a menu screen expressed by the screen data. The display control unit 133 is an example of a control unit that controls whether to prioritize display of the first menu screen or the second menu screen.

Screen data related to standard functions is supplied to the UI control unit 130 from the standard function unit 115 while screen data related to additional functions is supplied to the UI control unit 130 from the additional function unit 120, but the configuration is not limited to this example. The standard function unit 115 and the additional function unit 120 may also supply data to the web server unit 141, and the web server unit 141 may interpret this data to generate and supply screen data to the UI control unit 130. The UI control unit 130 additionally supplies webpage data received from the server device 200 via the communication unit 105 to the web browser unit 140, and displays a screen on the UI unit 106. Also, the UI control unit 130 receives an operation performed by the user on the UI unit 106, and conducts screen control to display a screen according to the received operation.

The web browser unit 140 displays a screen on the UI unit 106 on the basis of screen data supplied from the UI control unit 130 (for example, the first display unit 131 and the second display unit 132). The web browser unit 140 displays a screen on the UI unit 106 in full screen or in a window, for example. The web browser unit 140 displays a screen on the basis of screen data that includes screen data in HTML format, cascading style sheets (CSS), JavaScript (registered trademark), image data, document data (document data in Portable Document Format (PDF)), or the like.

The authentication control unit 150 administers control to authenticate users. User authentication is conducted to determine the availability of a function provided in the image processing device 100. One example of authentication is the authentication of a librarian, who is a user provided with the registration function. The UI control unit 130, according to control by the authentication control unit 150, displays an authentication screen (login screen) for authenticating a user on the UI unit 106, and uses the UI unit 106 to receive a user operation related to authentication.

The web server unit 141 converts data supplied from the web browser unit 140 into a request message that requests control from the standard function unit 115 or additional function unit 120, and supplies the request message to the standard function unit 115 or the additional function unit 120. Note that the one or more of the standard function unit 115, the additional function unit 120, the UI control unit 130, the web browser unit 140, and the authentication control unit 150 may also be built into the web server unit 141. Note that in the image processing device 100, the web server unit 141 may also be omitted.

Operation of the image processing device 100 according to the present exemplary modification will now be described.

(A: Operation of Displaying Screen Related to Standard Functions)

Figure 39A:
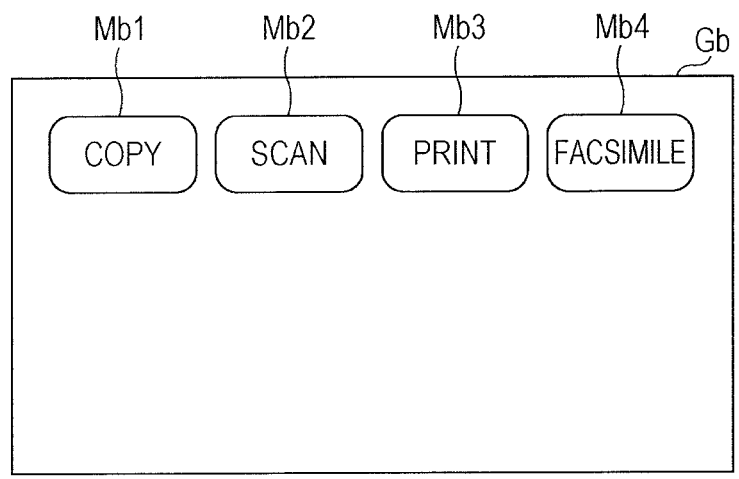
FIGS. 39A and 39B are diagrams illustrating a standard function menu screen and an authentication screen.

First, the operation of displaying a screen related to standard functions will be described. The controller 101 of the image processing device 100 executes the standard function program 102A, thereby causing the UI unit 106 to display the standard function menu screen Gb (an example of the first menu screen) illustrated in FIG. 39A. As illustrated in FIG. 39A, the standard function menu screen Gb includes a menu item Mb1 corresponding to the copy function, a menu item Mb2 corresponding to the scan function, a menu item Mb3 corresponding to the print function, and a menu item Mb4 corresponding to the facsimile function.

(B: Operation of Displaying Authentication Screen)

Figure 39B:
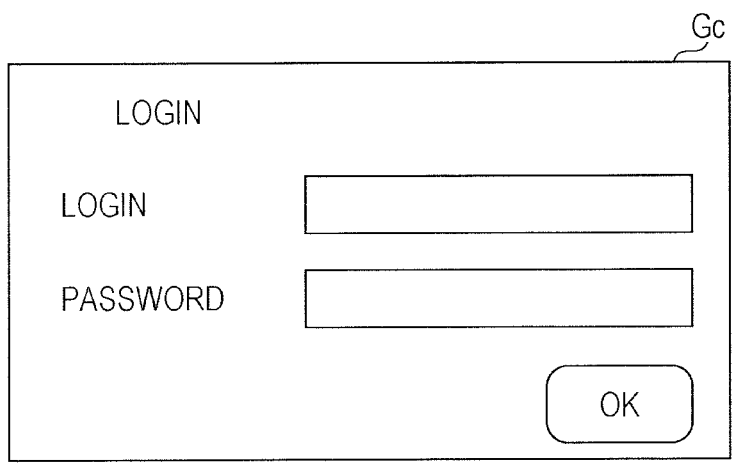

Next, the operation of displaying an authentication screen will be described. In the case of limiting the availability of a function provided in the image processing device 100 to certain users, the controller 101 conducts user authentication before providing the function to a user. For the registration function, the controller 101 conducts authentication to determine whether or not the user is a librarian. When conducting user authentication, the controller 101 causes the UI unit 106 to display the authentication screen Gc illustrated in FIG. 39B. On the authentication screen Gc, an input field corresponding to "ID" as an identifier that identifies a user, an input field for inputting a password for authentication, and a software button stating "OK" for giving an instruction to conduct user authentication (hereinafter designated the "OK button") are arranged. If authentication is successful, the controller 101 executes a process for realizing the function to provide to the authenticated user. Note that the authentication screen Gc is displayed by the function of the additional application 102B, for example, but may also be displayed by the function of the standard function program 102A.

(C: Operation of Displaying Screen Related to Additional Functions)

Figure 40:
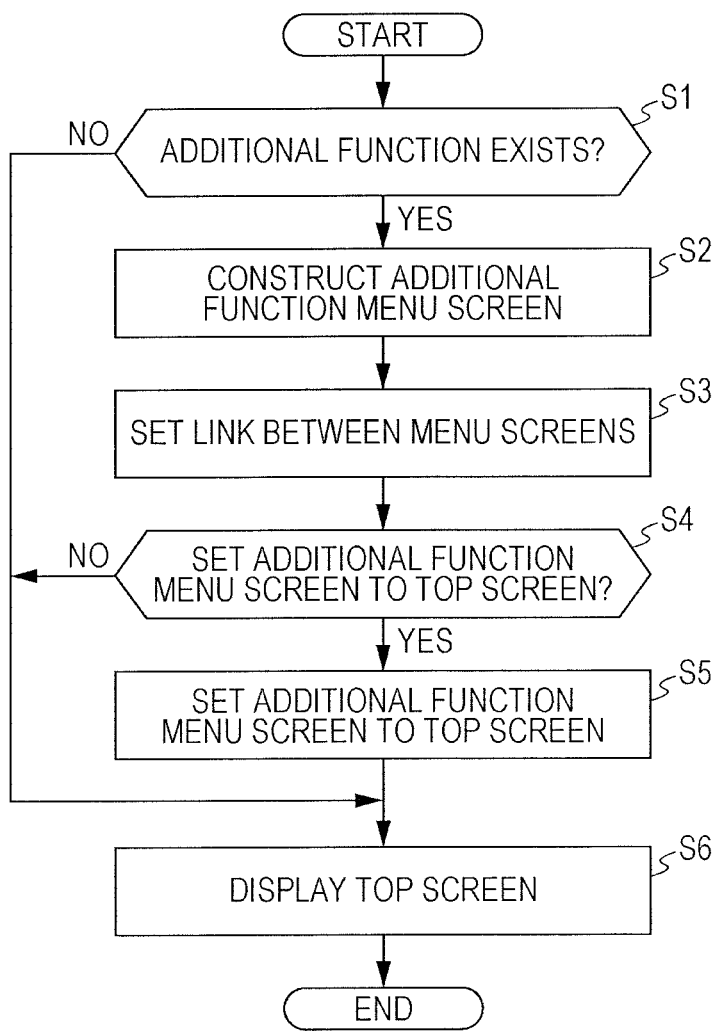
FIG. 40 is a flowchart illustrating operation of an image processing device.

FIG. 40 is a flowchart illustrating operations of an image processing device 100 in which the additional application 102B exists. FIG. 41 is a diagram illustrating an exemplary structure of an additional function configuration file used to display a menu screen corresponding to additional functions. When displaying a top screen, the controller 101 of the image processing device 100 judges whether or not there is an additional function (step S1). Herein, a top screen refers to a screen for receiving the first function-related instruction, such as when the image processing device 100 powers on or returns from standby. In the case of judging that there is an additional function (step S1; Yes), the controller 101 constructs an additional function menu screen (step S2). At this point, the controller 101 constructs a library menu screen using an additional function configuration file (see FIG. 41) acquired on the basis of the additional application 102B.

As illustrated in FIG. 41, the additional function configuration file F1 is a file associating a menu item corresponding to an additional function with a label, a type, a Uniform Resource Locator (URL)/command, and a plugin. Herein, a menu item corresponding to an additional function has the attribute "library management", indicating a menu item corresponding to library management. The label is a character string identifying each menu item corresponding to an additional function, and herein, is a character string expressing the name (item name) of the menu item. The type indicates the call type (call method) of the additional function, and herein, is either "internal" or "external". "Internal" means that when the menu item is selected, a designated command is executed to call an internal function of the image processing device 100.

In this case, the command to be executed to call the additional function (in the case of the document duplication function, "copy_proc"), is specified in the additional function configuration file F1. "External" means that when the menu item is selected, a web browser is used to call the function from an external device. In this case, the URL to be used to call the additional function (herein, a URL of the server device 200) is specified in the additional function configuration file F1. The plugin indicates a plugin for expanding a standard function when the additional function involves calling that standard function. Herein, the plugin "Libcopy_coinkit.zip" is associated with the document duplication function.

Figure 42:
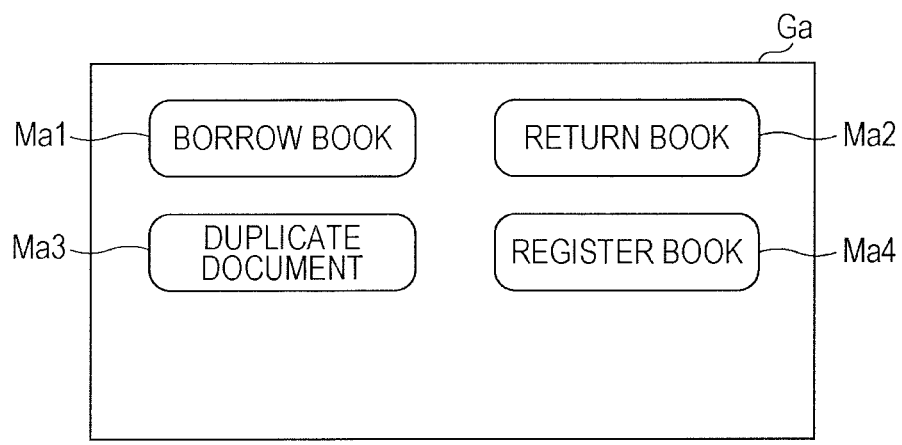
FIG. 42 is a diagram illustrating a library menu screen.

In the case of using the additional function configuration file F1 illustrated in FIG. 41, the library menu screen Ga illustrated in FIG. 42 (an example of the second menu screen) is constructed. As illustrated in FIG. 42, on the library menu screen Ga, a menu item Ma1 corresponding to a borrow function labeled "Borrow book", a menu item Ma2 corresponding to a return function labeled "Return book", a menu item Ma3 corresponding to a document duplication function labeled "Duplicate document", and a menu item Ma4 corresponding to a registration function labeled "Register book" are arranged.

For each of the menu items Ma1, Ma2, and Ma4, the URL specified in the additional function configuration file F1 is associated using an HTML form tag, for example. When the user selects a menu item with an associated URL, the controller 101 of the image processing device 100 transmits a Hypertext Transfer Protocol (HTTP) request to the URL associated with the selected menu item. On the other hand, when the menu item Ma3 with an associated command is selected, the controller 101 executes the command specified in the additional function configuration file F1.

Figure 43A:
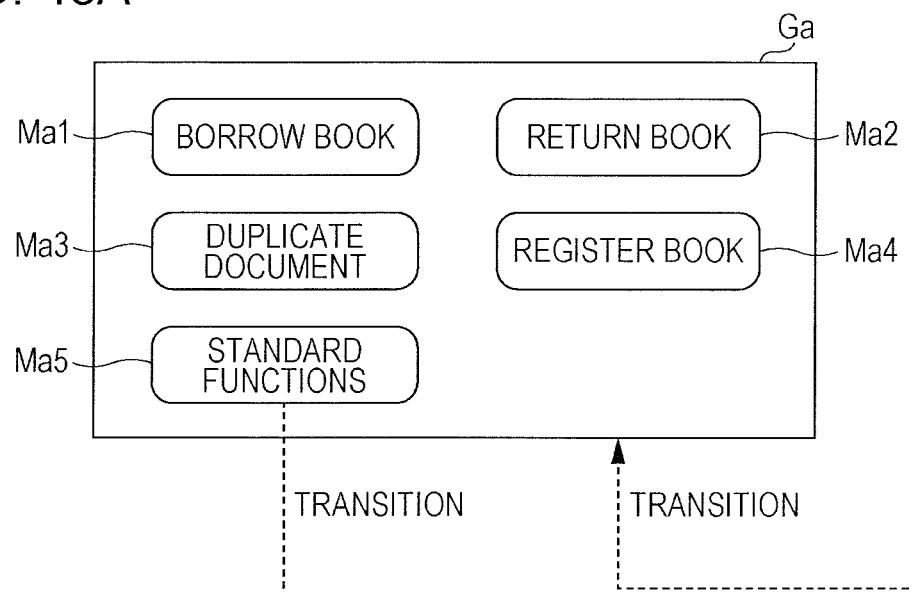
FIGS. 43A and 43B are diagrams illustrating a library menu screen and a standard function menu screen.
Figure 43B:
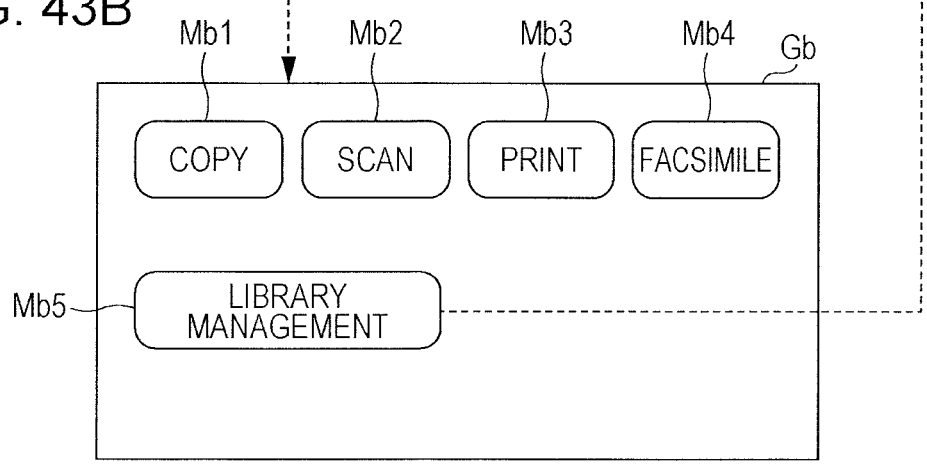

Next, the controller 101 sets a link (hyperlink) between the menu screens (step S3). As illustrated in FIG. 43A, the controller 101 places on the library menu screen Ga a menu item Ma5 associated with a URL for transitioning to the standard function menu screen Gb. Also, as illustrated in FIG. 43B, the controller 101 places on the standard function menu screen Gb a menu item Mb5 associated with a URL for transitioning to the library menu screen Ga. Note that the display element for setting a link (a display component such as a software button), as well as information specifying the display format such as the size, color, text font, arrangement order, and arrangement position of the display element, may also be included in the additional function configuration file F1.

Next, the controller 101 judges whether or not to set the additional function menu screen (herein, the library menu screen Ga) to the top screen (step S4). In the case of judging to not set the additional function menu screen to the top screen (step S4; No), the controller 101 causes the current top screen to be displayed (step S6). For example, if the top screen is specified by an administrator of the image processing device 100, the controller 101 causes the top screen to be displayed in accordance with the specification. On the other hand, in the case of judging to set the additional function menu screen to the top screen (step S4; Yes), the controller 101 sets the additional function menu screen to the top screen (step S5), and causes the top screen that was set to be displayed (step S6). At this point, in order to make the judgment in step S4, the storage 102 stores information indicating which menu screen is to be treated as the top screen.

Figure 44:
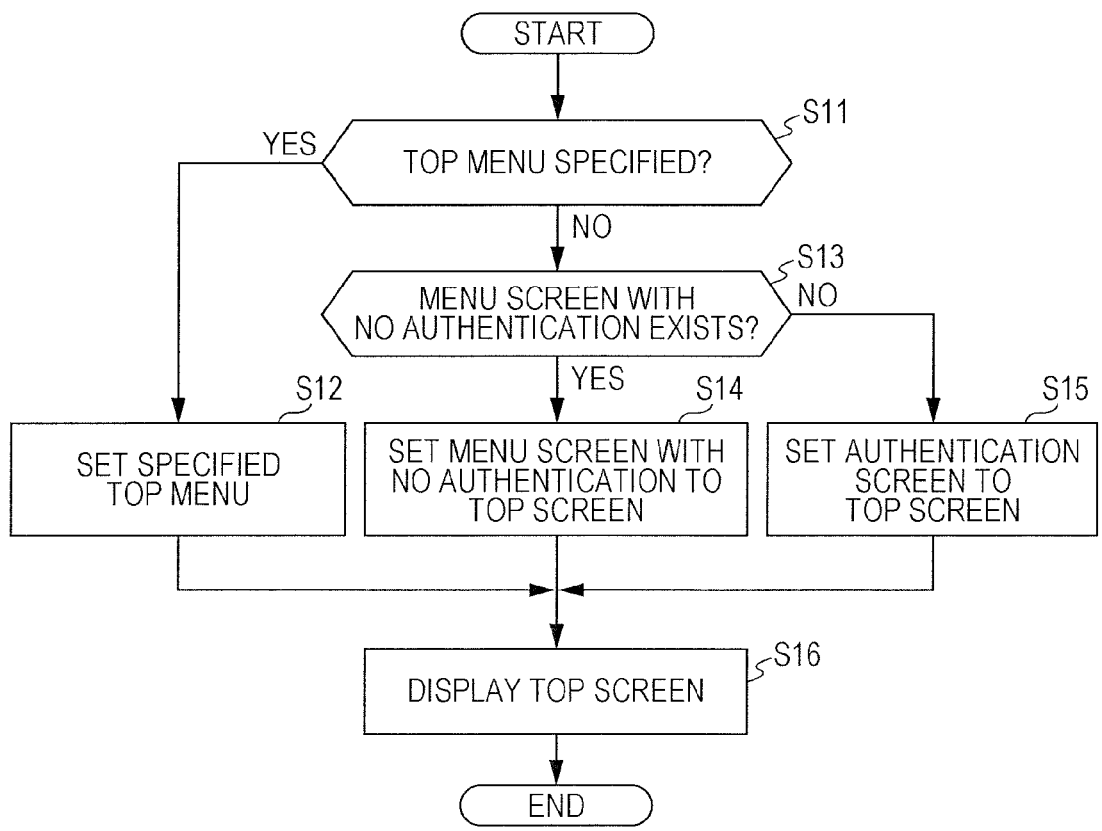
FIG. 44 is a flowchart illustrating operation of an image processing device.

The image processing device 100 may also configure the top screen setting according to the procedure of the flowchart illustrated in FIG. 44. The following process is executed instead of the process from steps S4 to S6 described in FIG. 40. When displaying a top screen, the controller 101 judges whether or not a top screen is specified (step S11). In the case of judging that a top screen is specified (step S11; Yes), the controller 101 sets the specified screen to the top screen (step S12). In the case of judging that a top screen is not specified (step S11; No), the controller 101 judges whether or not the additional function menu screen includes a menu screen for which user authentication is not conducted (step S13). A menu screen for which user authentication is not conducted is a screen including menu items corresponding to functions that are provided to users with no user authentication. Herein, the library menu screen Ga is given as an example of a menu screen for which user authentication is not conducted.

The library menu screen Ga is a screen including menu items corresponding to a borrow function, a return function, and a document duplication function, which are provided to users without user authentication. Thus, the controller 101 judges "Yes" in step S13, and sets the library menu screen Ga (FIG. 43A) to the top screen (step S14). Hypothetically, if there is not a menu screen for which user authentication is not conducted (step S13; No), the controller 101 sets the authentication screen Gc to the top screen (step S15). In this case, after user authentication using the authentication screen Gc is successful, the controller 101 causes a menu screen matched to the user's role (for example, librarian) to be displayed. Additionally, the controller 101 causes the UI unit 106 to display the top screen set in step S12, S14, or S15 (step S16).

(D: Basic Operation Related to Menu Screen)

Figure 45:
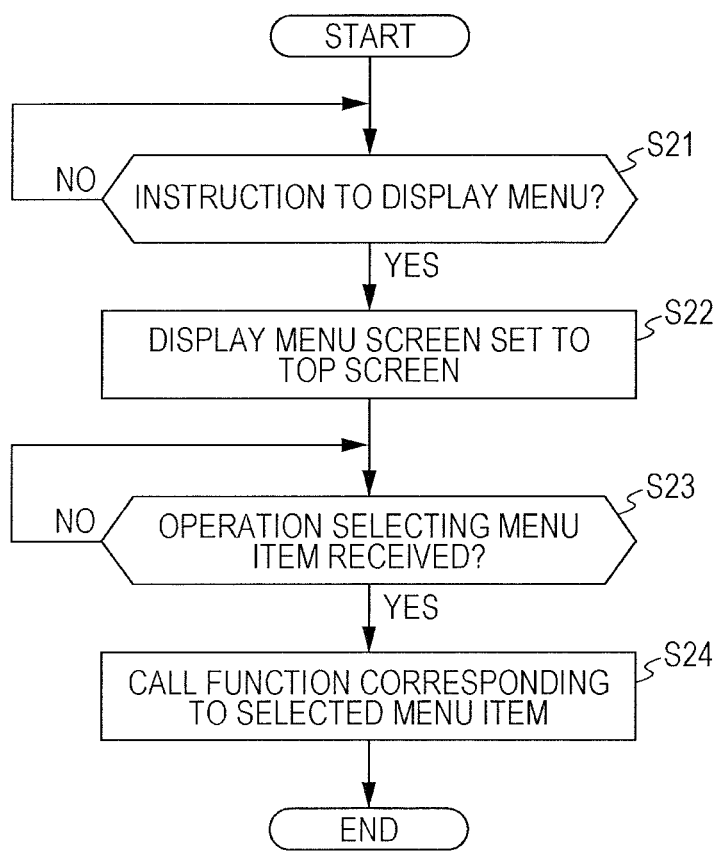
FIG. 45 is a flowchart illustrating operation of an image processing device.

At this point, basic operation from the display of a menu screen to the calling of a function on the image processing device 100 will be described with reference to the flowchart illustrated in FIG. 45. The controller 101 of the image processing device 100 judges whether or not an instruction to display a menu has been given (step S21). An instruction to display a menu may be given by a user operation for displaying the top screen, or in other words by the occurrence of an operation event, for example, but may also be given by the occurrence of some other specific event.

If "Yes" is judged in step S21, the controller 101 causes the menu screen set to the top screen according to the procedure in the flowchart illustrated in FIG. 40 or FIG. 44 to be displayed in full screen on the UI unit 106, for example (step S22). Displaying this menu screen as the top screen is an example of "prioritized display" according to the present invention. Next, the controller 101 judges whether or not an operation of selecting a menu item included on the display menu screen has been received (step S23). For example, the controller 101 receives an operation of selecting a menu item with an operation of using a finger to touch the display position of a menu item on the UI unit 106, or an operation of using operable elements to move a cursor to a menu item and confirm the selection, for example.

If "Yes" is judged in step S23, the controller 101 calls the function corresponding to the selected menu item (step S24). Subsequently, the controller 101 causes a screen related to the called function to be displayed on the UI unit 106, or executes a process for realizing the function. In the case of conducting user authentication, the controller 101 conducts user authentication before calling the function. Also, in the case of receiving an operation of selecting the menu item Ma5 on the library menu screen Ga, the controller 101 causes the UI unit 106 to display the standard function menu screen Gb, whereas in the case of receiving an operation of selecting the menu item Mb5 on the standard function menu screen Gb, the controller 101 causes the UI unit 106 to display the library menu screen Ga.

Figure 46:
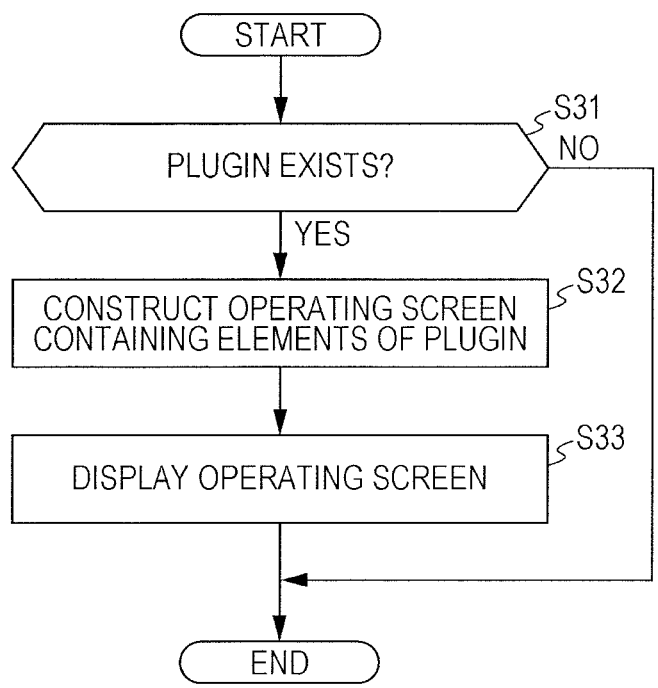
FIG. 46 is a flowchart illustrating operation of an image processing device.

If the user selects the menu item Ma4 corresponding to the document duplication function included on the library menu screen Ga, the controller 101 of the image processing device 100 executes the command associated with the menu item Ma4, and conducts the operations illustrated in FIG. 46. FIG. 46 is a flowchart illustrating operations related to the document duplication function conducted by the image processing device 100. First, the controller 101 judges whether or not a plugin related to the document duplication function exists (step S31). The plugin in the present exemplary modification is a plugin that expands the copy function as a standard function. The plugin includes information about the method of embedding a menu item, and specifically includes display data (for example, information about a display element, label, icon, and display position) and the function to call (such as a mathematical function or URL). In addition, information for replacing a display element for a standard function (for example, the title) may also be included as display data.

Figure 47A:
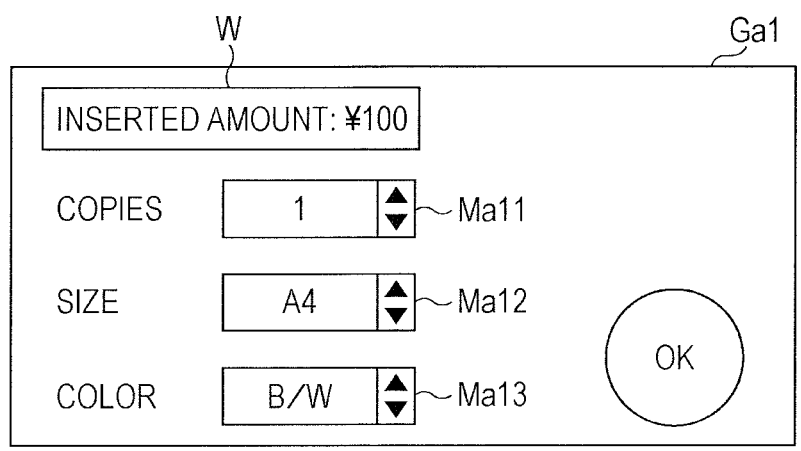
FIGS. 47A and 47B are diagrams illustrating a document duplication screen and a copy screen.

In the case of judging that a plugin exists (step S31; Yes), the controller 101 constructs an operating screen for the document duplication function by embedding the plugin elements into the operating screen of the copy function (step S32). Herein, the controller 101 executes "Libcopy_coinkit.zip" as the plugin, and constructs the operating screen for the document duplication function. Subsequently, the controller 101 causes the UI unit 106 to display the constructed operating screen (step S33). FIG. 47A is a diagram illustrating a document duplication screen Ga1 illustrating an operating screen for the document duplication function.

Figure 47B:
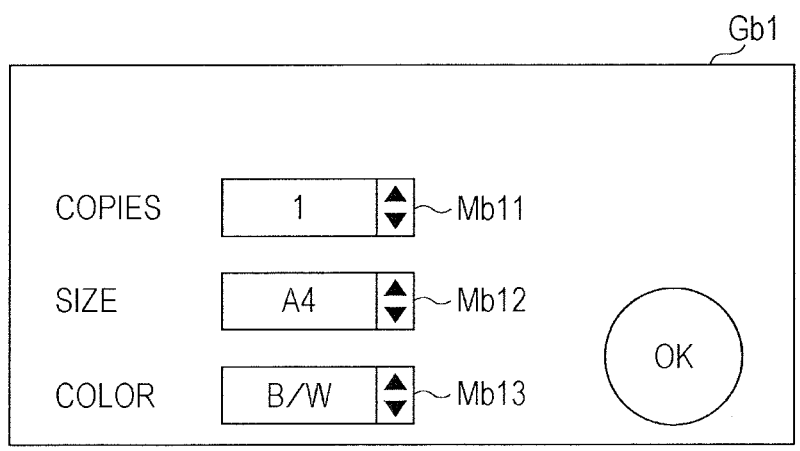

As illustrated in FIG. 47A, the document duplication screen Ga1 includes a menu item Ma11 for specifying the number of copies, a menu item Ma12 for specifying the size of the copy paper, and a menu item Ma13 for specifying the colors to use for copying. The menu items Ma11 to Ma13 are respectively shared in common with a menu item Mb11 for specifying the number of copies, a menu item Mb12 for specifying the size of the copy paper, and a menu item Mb13 for specifying the colors to use for copying, which are included on a copy screen Gb1 illustrating an operating screen for the copy function illustrated in FIG. 47B.

The controller 101 displays on the document duplication screen Ga1 a window W (widget) indicating a usage fee for using the document duplication function, to be inserted by the user. In addition, the controller 101 recognizes the amount of funds inserted by the user, and determines whether or not the amount has reached a prescribed usage fee. In other words, when calling the document duplication function, the controller 101 calls the copy function while also expanding the copy function with the plugin. If the user selects the OK button on the document duplication screen Ga1, the controller 101 conducts the same process as when realizing the copy function, and applies control for duplicating a book.

Figure 52:
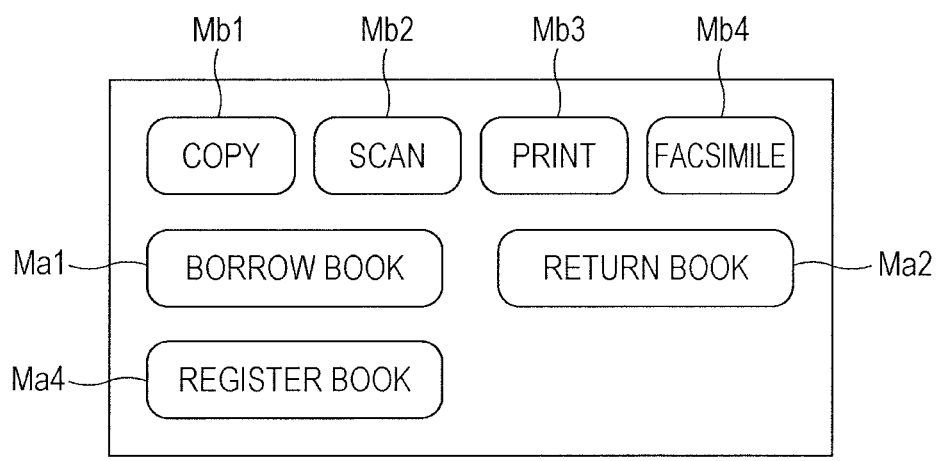
FIG. 52 is a diagram illustrating a menu screen.

According to the present exemplary modification described above, the number of menu items arranged on a single screen is reduced compared to the case of displaying the menu items Ma1, Ma2 and Ma4 corresponding to additional functions on a menu screen that includes the menu items Mb1 to Mb4 corresponding to standard functions, as illustrated in FIG. 52, for example. Furthermore, in the present exemplary modification, the menu screens are divided into menu items corresponding to standard functions and menu items corresponding to additional functions. For this reason, a user who is provided with additional functions of the image processing device 100 may simply perform an operation of selecting a menu item included on a menu screen Ga displayed as the top screen, while a user provided with standard functions may simply perform an operation of selecting a menu item displayed on a standard function menu screen Gb.

Thus, according to the image processing device 100, users of individual functions among additional functions and standard functions may operate menus easily, and particularly, users of additional functions may operate menus easily. Also, for users of additional functions, there is a lower possibility of making an incorrect operation of mistakenly selecting a menu item corresponding to a standard function. In addition, by having the image processing device 100 call a standard function of the device itself to realize an additional function and additionally expand the standard function, a standard function may be used to execute a variety of processes related to an additional function.

Exemplary Modification 13

Other Functions of Image Processing Device (Part 2)

Figure 48:
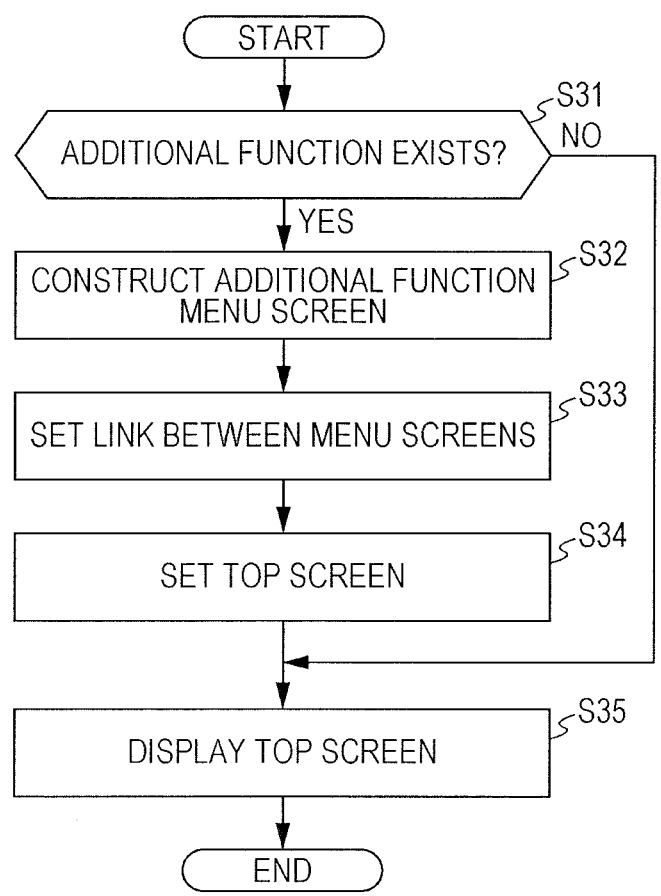
FIG. 48 is a flowchart illustrating operation of an image processing device.

The image processing device 100 according to exemplary modification 10 discussed earlier divides the menu screens between additional functions related to library management, and standard functions, but in the present exemplary modification, the menu screens are divided according to the user to whom the functions are provided. FIG. 48 is a flowchart illustrating operations of an image processing device 100 after the additional application 102B is installed. First, the controller 101 judges whether or not there is an additional function, according to the same method as step S1 (step S31). If "Yes" is judged in step S31, the controller 101 constructs an additional function menu screen (step S32). At this point, the controller 101 constructs a menu screen using an additional function configuration file and a menu configuration file (see FIGS. 49A and 49B) acquired on the basis of the additional application 102B.

As illustrated in FIG. 49A, the additional function configuration file F1a is a file associating a menu item corresponding to an additional function with a label, a type, a URL/command, and a plugin. Herein, menu items corresponding to additional functions are divided on the basis of the attributes of the user to be provided with the function into "library service", which indicates a library-related service for general users, and "librarian function", which indicates a menu item exclusively for librarians. The respective information in type, URL/command, and plugin are the same as the exemplary modification discussed earlier.

As illustrated in FIG. 49B, in the menu configuration file F2, each menu is associated with a role and a link. Menu indicates an attribute of any of librarian service, librarian function, and standard function, which indicate a menu of additional functions specified in the additional function configuration file F1a. Role indicates the role assumed by the user who is provided with the functions, and herein includes "none", which indicates that no particular role is specified (general user), a "librarian" who conducts book management, and a "user of standard functions" who uses the standard functions. Link indicates links set on the menu screen. Herein, "librarian functions" and "standard functions" are associated with "library services". This means that on a menu screen corresponding to "library services" for general users, links for transitioning to a menu screen corresponding to "librarian functions" and a menu screen corresponding to "standard functions" are set.

Also, "copy", "scan", "print", "facsimile", and "logout" are associated with "librarian functions". This means that on the menu screen corresponding to "librarian functions" exclusively for librarians, links are set for transitioning to copy, scan, print, facsimile, and logout screens (for example, operating screens). Also, "copy", "scan", "print", and "facsimile" are associated with "standard functions". This means that on the menu screen corresponding to "standard functions" for users of standard functions, links are set for transitioning to screens (for example, operating screens) corresponding to each of the functions of copy, scan, print, and facsimile.

Figure 50A:
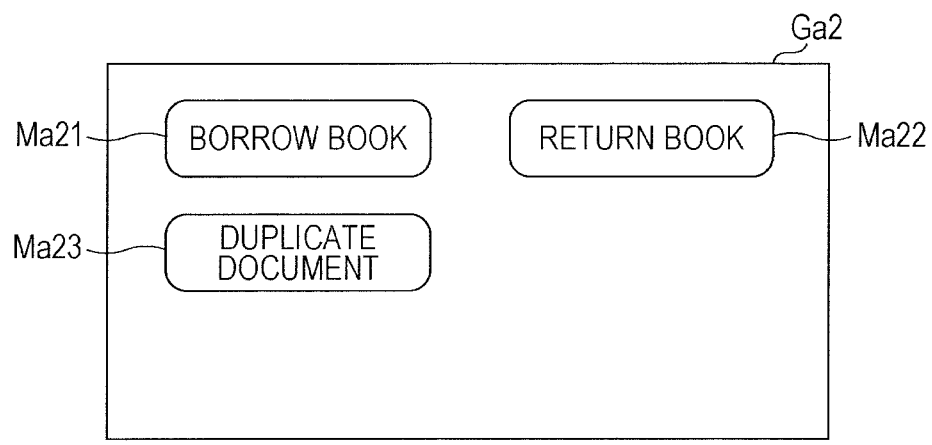
FIGS. 50A and 50B are diagrams illustrating a library service screen and a librarian function screen.
Figure 50B:
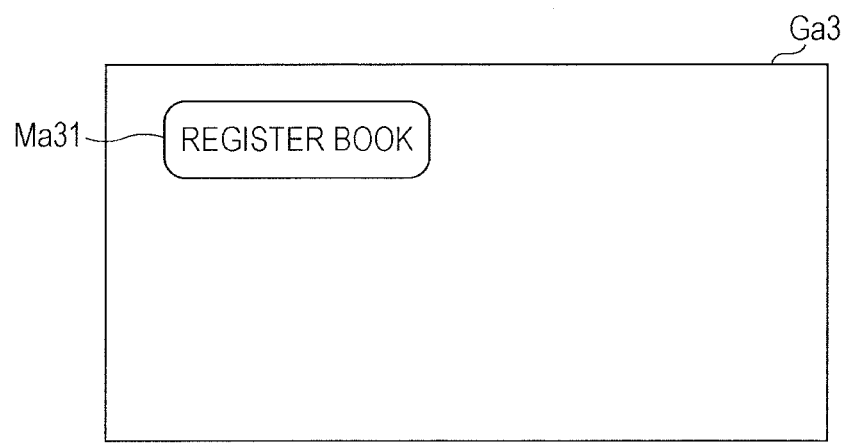

In the case of using the additional function configuration file F1a and the menu configuration file F2 illustrated in FIGS. 49A and 49B, the library services screen Ga2 and the librarian functions screen Ga3 are constructed. As illustrated in FIGS. 50A and 50B, on the library services screen Ga2 corresponding to library services (an example of the second menu screen), a menu item Ma21 corresponding to the borrow function, a menu item Ma22 corresponding to the return function, and a menu item M23 corresponding to the document duplication function are arranged. The menu items Ma21 to Ma23 are the same menu items as the menu items Ma1, Ma2, and Ma3, respectively. On the librarian functions screen Ga3 corresponding to library services for librarians (an example of the second menu screen), a menu item Ma31 corresponding to the registration function is arranged. The menu item M31 is the same menu item as the menu item Ma4.

Figure 51A:
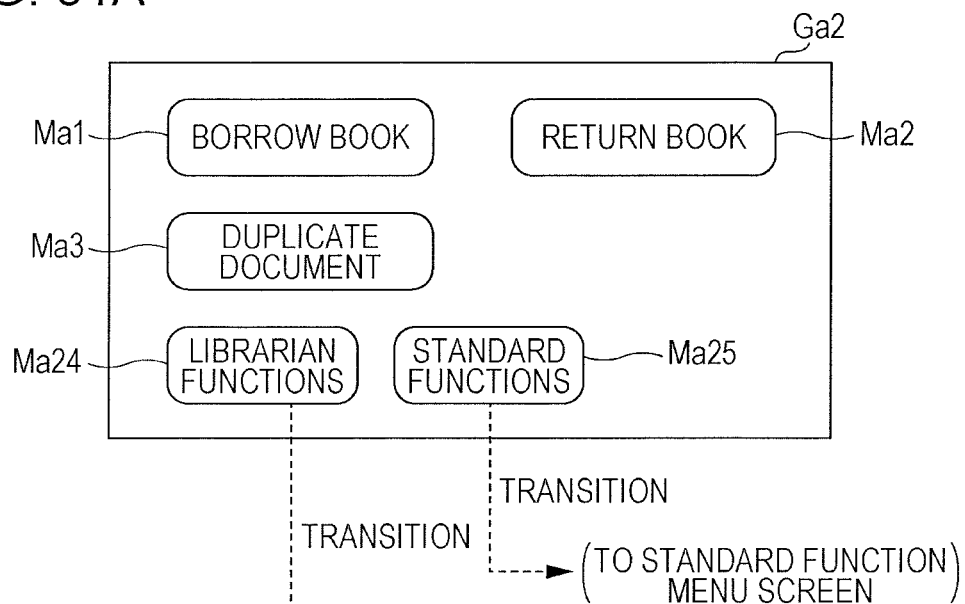
FIGS. 51A and 51B are diagrams illustrating a library service screen and a librarian function screen.
Figure 51B:
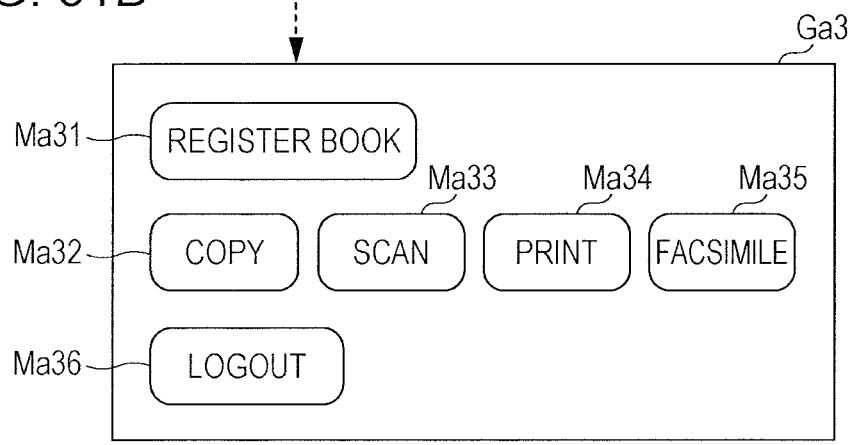

Next, the controller 101 sets a link between the menu screens (step S33). As illustrated in FIGS. 51A and 51B, the controller 101 places on the library services screen Ga2 a menu item Ma24 associated with a URL for transitioning to the librarian functions screen Ga3, and a menu item Ma25 associated with a URL for transitioning to the standard function menu screen Gb. In addition, the controller 101 places on the librarian functions screen Ga3 a menu item Ma32 corresponding to the copy function, a menu item Ma33 corresponding to the scan function, a menu item Ma34 corresponding to the print function, a menu item Ma35 corresponding to the facsimile function, and a menu item Ma36 for logging out. The menu items Ma32 to Ma35 are the same menu items as the menu items Mb11 to Mb14, respectively.

Note that for librarian functions provided to librarians only, the authentication screen Gc (see FIG. 39B) is displayed, and after successful user authentication, the librarian functions screen Ga3 is displayed. Also, for standard functions provided only to users of standard functions, the authentication screen Gc is likewise displayed, and after successful standard function user authentication, the standard function menu screen Gb is displayed. The standard function menu screen Gb may be the same as the screen described in FIG. 39A.

Next, the controller 101 sets the top screen (step S34) according to the procedure described in steps S4 and S5 (for example, steps S11 to S15) described in the present exemplary modification, for example, and causes the UI unit 106 to display the set top screen (step S35). If a top screen is not specified, the controller 101 sets the library services screen Ga2 that includes menu items for which user authentication is not conducted to the top screen, and prioritizes display over the librarian functions screen Ga3.

According to the present exemplary modification described above, in addition to the operational effects described in exemplary modification 10 discussed earlier, the following operational effects are exhibited. In the image processing device 100, among menu screens related to library management, display of the library services screen Ga2 for which user authentication is not conducted is prioritized over the librarian functions screen Ga3. For this reason, for general users, who may be more numerous than librarians, a menu related to library services becomes easier to operate. Also, in the image processing device 100, since the menu screens are divided according to the users of each function, each user is able to more easily operate menu items corresponding to functions used by that user.

Exemplary Modification 14

Menu Screens

Among additional function menu screens, the image processing device 100 may also set to the top screen a menu screen for which user authentication is conducted rather than a menu screen for which user authentication is not conducted. For example, when there are many users to be authenticated, such as when the image processing device 100 is installed in an office, setting a menu screen for which user authentication is conducted to the top screen conceivably may enable easier menu operation for most users. In addition, the image processing device 100 may also set a standard function menu screen to the top screen, thereby prioritizing display over an additional function menu screen.

Exemplary Modification 15

Prioritized Display

In the exemplary modification discussed above, the image processing device 100 sets an additional function menu screen to the top screen for display, as an example of "prioritized display". Consequently, the display of the additional function menu screen is prioritized over a standard function menu screen. However, the mode of prioritized display is not limited to setting a top screen. For example, the image processing device 100 may prioritize the display of a menu screen with prioritized display over another menu screen by displaying the menu screen with prioritized display with less operation by a user (for example, with a fewer number of operations on operable elements) compared to the other menu screen.

In addition, when placing an additional function menu screen and a standard function menu screen on the same level of a hierarchy, display may be prioritized by displaying the menu screen with prioritized display earlier than another menu screen. In this case, while the menu screen with prioritized display is being displayed, when the image processing device 100 receives an operation of moving the display area of the menu screen, such as a click operation on the UI unit 106, the display is switched to the other menu screen, or some other menu screen.

In addition, the image processing device 100 may also be configured to prioritize the display of a menu screen with prioritized display over another menu screen by prohibiting the display of the other menu screen, for example. Also, in the case of prioritizing the display of an additional function menu screen while also prohibiting the display of a standard function menu screen, configuration information related to the prioritized display of the menu screen may also be included in the additional function configuration file F1 or F1a.

Also, when it is not desirable to transition from a menu screen with prioritized display to another menu screen, the image processing device 100 may be configured to not set links between the menu screens as described in steps S3 and S33, or not display links between the menu screens. The image processing device 100 may also using information about user authentication as a condition of whether or not to set or displays links between menu screens. In other words, the image processing device 100 controls whether or not to transition from an additional function menu screen with prioritized display to another menu screen, depending on the user authentication status. Information about authentication refers to information indicating whether or not user authentication was conducted, or a user who was successfully authenticated (for example, the role assumed by the user), for example.

In addition, the image processing device 100 may also display menu screens at the same time, with the additional function menu screen at a larger size than the standard function menu screen. In this case, when the image processing device 100 receives an operation of selecting the standard function menu screen, rather than receiving an operation of selecting a menu item included on the additional function menu screen, the image processing device 100 displays the standard function menu screen at a larger size than the additional function menu screen. In other words, in the image processing device 100, the specific method of prioritizing the display of a menu screen and the specific operations performed by a user to change the display of a menu screen is not particularly limited. In addition, the method of displaying a menu screen and menu items included on such a menu screen is not particularly limited.

Exemplary Modification 16

User Authentication

User authentication is not limited to being conducted before displaying a menu screen including menu items of functions for which authentication is conducted, and may also be conducted after a menu item of a function for which authentication is conducted is selected. In addition, user authentication is not limited to the example of being conducted per menu item or per menu screen, and user authentication may also be conducted per multiple menu items or multiple menu screens. For example, a single authentication may be used to complete authentication for using standard functions and authentication for using additional functions. In addition, user authentication is not limited to authentication according to an ID and a password, and various authentication technologies are applicable, such as an IC card storing user information, biometric authentication conducted using biometric information such a fingerprint, and facial authentication that captures an image of a user's face and recognizes the face from the captured image.

Exemplary Modification 17

Transmitting and Receiving Data

In the exemplary embodiments discussed above, the process of transmitting an HTTP request to a URL may also be transmitted as a multipart request, for example, and the format of transmitting and receiving data is not particularly limited.

Exemplary Modification 18

Configuration/Operation

Some of the configuration or operation described in the foregoing exemplary embodiment and exemplary modifications may also be omitted. For example, the configuration and operation related to features such as the expansion of standard functions and user authentication may be omitted. In addition, the order in which the image processing device 100 conducts the processes described with reference to the flowcharts may also be changed. For example, in the case of judging that an additional function exists in step S1 of FIG. 9 (step S1; Yes), the image processing device 100 conducts the processing in steps S4 and S5 to control whether or not to set an additional function menu screen to the top screen, and after that, conducts the processing in steps S2 and S3 to construct the additional function menu screen and set links between the menu screens. In addition, the image processing device 100 may also conduct the processing in step S4 to judge whether or not to set an additional function menu screen to the top screen, then conduct the processing in steps S2 and S3 to construct an additional function menu screen and set links between the menu screens, and after that, in the case of judging "Yes" in step S4, set the additional function menu screen to the top screen.

Exemplary Modification 19

Second Function and the Like

In the exemplary embodiment discussed in the foregoing, a second function according to an exemplary embodiment of the present invention is a function for using the image processing device 100 for book management, but the second function is not limited thereto. For example, an exemplary embodiment of the present invention may also be applied to the addition of a function that manages data related to affairs conducted by a business, or the addition of some other function. It is sufficient for the second function according to an exemplary embodiment of the present invention to be a function for using an information processing device for a specific application, and the specific application may be an application for crime prevention, an application for managing work attendance, an application for inventory management, or the like.

In addition, the second function according to an exemplary embodiment of the present invention is not limited to being a function added to an information processing device. The second function according to an exemplary embodiment of the present invention may also be a function preinstalled in an information processing device, for example. In this case, the information processing device may control the display so that, among menu items corresponding to multiple preinstalled functions, the display of a menu item corresponding to a specific function is prioritized. As an example, the image processing device 100 according to the exemplary embodiment discussed in the foregoing may also include functions for library management as standard functions.

The second function according to an exemplary embodiment of the present invention may also be a function added by a program other than an application program. The first function according to an exemplary embodiment of the present invention is not limited to the copy function, scan function, print function, or facsimile function, and may also be another function. An information processing device according to an exemplary embodiment of the present invention is not limited to an image forming device, and may also be an information processing device other than an image forming device, such as a smartphone or mobile phone, a tablet computer, a notebook PC, or a handheld game console.

Exemplary Modification 20

Agent of Processing and Functions

The agent of the processing in the flowcharts of FIGS. 10, 11, and 34 discussed earlier is not limited to the example cited in the foregoing exemplary embodiment. For example, the processing in step S103 and step S104 may also be conducted by the image processing device 100 rather than the server device 200. In addition, the units illustrated in FIG. 4 and the like may also be realized by different devices from the foregoing exemplary embodiment and exemplary modifications. For example, the display control unit 160 may be provided in the server device 200, and the server device 200 may carry out control causing the screen illustrated in FIG. 8 and the like to be displayed on the image processing device 100.

In addition, the acquisition unit 152, the conversion unit 153, the generation unit 154, the computation unit 155, the selection unit 156, the information acquisition unit 157, and the output unit 158 may be provided in the server device 200, and image forming data may be output from the server device 200 to the image processing device 100. In addition, the specifying unit 254 may also be provided in the information processing device 110 illustrated in FIG. 1. Furthermore, all of the units illustrated in FIG. 4 and the like may be provided in a single device (for example, the image processing device 100). In addition, a smartphone, tablet, or personal computer may be equipped with the display control unit 160 and the receiving unit 161, and be used as an interface for the user. As above, the units realized in the information processing system 1000 may be realized by various devices.

Exemplary Modification 21

Categories of Invention

Besides devices such as an image processing device, a server device, an information processing device, and a bibliographic information storage device, an exemplary embodiment of the present invention may also be treated as other devices that realize the units discussed in the foregoing, and may also be treated as a system, such as an information processing system provided with these devices. Note that herein, a system also encompasses the realization of the units discussed in the foregoing with a single device. In addition, an exemplary embodiment of the present invention may also be treated as an information processing method for realizing processing carried out by these devices, or as a program for causing a computer controlling these devices to function. The program may be provided in the form of a recording medium such as an optical disc with the program stored thereon, and may also be provided in a form such as causing a computer to download the program via a network such as the Internet, and install and make the program available for use.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A system comprising:
  a storage configured to store label information used for book management, the label information being obtained based on information for specifying a publication;
  a display controller configured to use at least one hardware processor to cause a display to display a screen for receiving a user operation conducted after the label information is obtained but before a label image expressing the label information is formed on a medium; and an output unit configured to use the at least one hardware processor to respond to an instruction based on the user operation received while the screen is displayed, and output data for forming the label image on a medium, wherein the label information includes category information expressing a book category conforming to rules used for the book management, wherein the display controller is configured to cause display of the screen for receiving a first operation of correcting the obtained category information as the user operation, and wherein the system is configured to minimize wasteful consumption of the medium due to forming a label image having category information that is to be corrected.

2. The system according to claim 1, wherein
the storage is configured to store the category information corrected by the first operation as the label information.

3. The system according to claim 2, wherein
in response to output of at least one instance of the data being available, the display controller is configured to cause display of the screen for receiving a second operation of giving an instruction to start formation of the label image on a medium as the user operation, and
in response to the second operation being performed, the output unit is configured to output the data for forming the label image not yet formed on a medium.

4. The system according to claim 3, wherein
in response to a number of the label image not yet formed on a medium exceeding a threshold, the output unit is configured to output the data even if the second operation is not performed.

5. The system according to claim 4, wherein
the display controller is configured to cause display of a number of the label image not yet formed on a medium, or cause display of the number per type of the label image.

6. The system according to claim 5, wherein
in response to an image former unit that forms the label image being in a specific state, the output unit is configured to avoid outputting the data even if a number of the label image not yet formed on a medium exceeds the threshold.

7. The system according to claim 4, wherein
in response to an image former that forms the label image being in a specific state, the output unit is configured to avoid outputting the data even if a number of the label image not yet formed on a medium exceeds the threshold.

8. The system according to claim 1, wherein
when output of at least one instance of the data is available, the display controller is configured to cause display of the screen for receiving a second operation of giving an instruction to start formation of the label image on a medium as the user operation, and
when the second operation is performed, the output unit is configured to output the data for forming the label image not yet formed on a medium.

9. The system according to claim 8, wherein
in response to a number of the label image not yet formed on a medium exceeding a threshold, the output unit is configured to output the data even if the second operation is not performed.

10. The system according to claim 9, wherein
the display controller is configured to cause display of a number of the label image not yet formed on a medium, or cause display of the number per type of the label image.

11. The system according to claim 10, wherein
in response to an image former that forms the label image being in a specific state, the output unit is configured to avoid outputting the data even if a number of the label image not yet formed on a medium exceeds the threshold.

12. The system according to claim 9, wherein
in response to an image former that forms the label image being in a specific state, the output unit is configured to avoid ouputting the data even if a number of the label image not yet formed on a medium exceeds the threshold.

13. The system according to claim 8, wherein
in response to a specific time occurring, the output unit is configured to output the data, even if the second operation is not performed.

14. A method comprising:
storing label information used for book management, the label information being obtained based on information for specifying a publication;
causing a display unit to display a screen for receiving a user operation conducted after the label information is obtained but before a label image expressing the label information is formed on a medium; and
responding to an instruction based on the user operation received while the screen is displayed, and outputting data for forming the label image on a medium,
wherein the label information includes category information expressing a book category conforming to rules used for the book management,
wherein the causing the display unit to display the screen for receiving the user operation comprises causing display of the screen for receiving a first operation of correcting the obtained category information as the user operation, and
wherein wasteful consumption of the medium due to forming a label image having category information that is to be corrected is minimized.

15. A non-transitory computer readable medium storing a program causing a computer to execute a process, the process comprising:
storing label information used for book management, the label information being obtained based on information for specifying a publication;
causing a display unit to display a screen for receiving a user operation conducted after the label information is obtained but before a label image expressing the label information is formed on a medium; and
responding to an instruction based on the user operation received while the screen is displayed, and outputting data for forming the label image on a medium,
wherein the label information includes category information expressing a book category conforming to rules used for the book management,
wherein the causing the display unit to display the screen for receiving the user operation comprises causing display of the screen for receiving a first operation of correcting the obtained category information as the user operation, and
wherein wasteful consumption of the medium due to forming a label image having category information that is to be corrected is minimized.

16. A system comprising:
a storage configured to store label information including category information expressing a book category, the label information being obtained by receiving from a database that stores information for specifying a publication and the category information expressing the book category and that is provided separately from the storage, in response to sending the information for specifying the publication to the database via Internet;
a display controller configured to use at least one hardware processor to cause a display to display a screen for receiving a user operation conducted after the label information is obtained but before a label image expressing the label information is formed on a medium; and
an output unit configured to use the at least one hardware processor to respond to an instruction based on the user operation received while the screen is displayed, and output data for forming the label image on a medium,
wherein the system is configured to minimize wasteful consumption of the medium due to forming a label image having category information that is to be corrected.

* * * * *

UNITED STATES PATENT AND TRADEMARK OFFICE
CERTIFICATE OF CORRECTION

PATENT NO.       : 9,531,894 B2                                  Page 1 of 1
APPLICATION NO.  : 14/729869
DATED            : December 27, 2016
INVENTOR(S)      : Takeshi Takei et al.

It is certified that error appears in the above-identified patent and that said Letters Patent is hereby corrected as shown below:

On the Title Page

After "(65) Prior Publication Data US 2016/0182741 A1 June 23, 2016" Please insert:
--(30) Foreign Application Priority Data
December 17, 2014     (JP)..............................2014-255279--

Signed and Sealed this
Eleventh Day of July, 2017

Joseph Matal
*Performing the Functions and Duties of the*
*Under Secretary of Commerce for Intellectual Property and*
*Director of the United States Patent and Trademark Office*